(12) United States Patent
Roth et al.

(10) Patent No.: US 8,646,924 B2
(45) Date of Patent: Feb. 11, 2014

(54) REARVIEW DEVICE MOUNTING ASSEMBLY WITH ROTATABLE SUPPORT

(75) Inventors: Mark R. Roth, Coloma, MI (US); Peter N. Rizk, Holland, MI (US); Danny L. Minikey, Jr., Fenwick, MI (US); Kenneth R. Filipiak, West Olive, MI (US); Darin D. Tuttle, Byron Center, MI (US); Kent H. Frye, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 10 days.

(21) Appl. No.: 13/405,697

(22) Filed: Feb. 27, 2012

(65) Prior Publication Data
US 2012/0218656 A1 Aug. 30, 2012

Related U.S. Application Data

(60) Provisional application No. 61/521,437, filed on Aug. 9, 2011, provisional application No. 61/447,472, filed on Feb. 28, 2011.

(51) Int. Cl.
*G02B 7/182* (2006.01)
(52) U.S. Cl.
USPC ............................................. 359/872
(58) Field of Classification Search
USPC ............. 33/333, 355 R, 356, 355; 340/440, 340/693.5, 438; 359/872, 871, 881, 873, 359/874, 838, 841, 843, 844; 248/481–487, 248/548–549
See application file for complete search history.

(56) References Cited

U.S. PATENT DOCUMENTS

| 4,668,059 A | * | 5/1987 | Ohyama ..................... 248/549 |
| 5,096,287 A | | 3/1992 | Kakinami et al. |
| 5,439,305 A | | 8/1995 | Santo |
| 5,504,478 A | | 4/1996 | Knapp |
| 5,537,003 A | | 7/1996 | Bechtel et al. |
| 5,666,028 A | | 9/1997 | Bechtel et al. |
| 5,796,094 A | | 8/1998 | Schofield et al. |
| 5,971,553 A | | 10/1999 | Durnwald |
| 6,008,486 A | | 12/1999 | Stam et al. |

(Continued)

FOREIGN PATENT DOCUMENTS

| CN | 201457300 U | 5/2010 |
| EP | 0937601 A2 | 8/1999 |

(Continued)

OTHER PUBLICATIONS

The International Search Report and the Written Opinion of the International Searching Authority, or the Declaration, Pages: All, Date: Jun. 28, 2012.

*Primary Examiner* — Stephone B Allen
*Assistant Examiner* — Tamara Y Washington
(74) *Attorney, Agent, or Firm* — Price Heneveld LLP; Scott P. Ryan

(57) ABSTRACT

A rearview device mounting assembly including a mount configured to be operably coupled to a windshield. A first support extends downward from the mount. A second support is rotatably connected with the first support and is rotatable about a first axis of rotation. The second support includes a carrier that extends substantially orthogonal to the first axis of rotation. A rearview device assembly is operably connected to the carrier. The rearview device assembly is substantially vertically rotatable about the carrier and substantially horizontally rotatable about the first support.

19 Claims, 33 Drawing Sheets

(56) References Cited

U.S. PATENT DOCUMENTS

| | | |
|---|---|---|
| 6,087,953 A | 7/2000 | DeLine et al. |
| 6,102,546 A | 8/2000 | Carter |
| 6,130,421 A | 10/2000 | Bechtel et al. |
| 6,130,448 A | 10/2000 | Bauer et al. |
| 6,140,933 A | 10/2000 | Bugno et al. |
| 6,172,613 B1 | 1/2001 | DeLine et al. |
| 6,222,460 B1 | 4/2001 | DeLine et al. |
| 6,313,457 B1 | 11/2001 | Bauer et al. |
| 6,326,900 B2 | 12/2001 | DeLine et al. |
| 6,359,274 B1 | 3/2002 | Nixon et al. |
| 6,366,213 B2 | 4/2002 | DeLine et al. |
| 6,367,939 B1 | 4/2002 | Carter et al. |
| 6,396,446 B1 | 5/2002 | Walstra et al. |
| 6,403,942 B1 | 6/2002 | Stam |
| 6,420,800 B1 | 7/2002 | LeVesque et al. |
| 6,431,712 B1 | 8/2002 | Turnbull |
| 6,465,963 B1 | 10/2002 | Turnbull et al. |
| 6,471,362 B1 | 10/2002 | Carter et al. |
| 6,483,438 B2 | 11/2002 | DeLine et al. |
| D470,089 S | 2/2003 | Hook et al. |
| 6,539,306 B2 | 3/2003 | Turnbull |
| 6,593,565 B2 | 7/2003 | Heslin et al. |
| 6,614,911 B1 | 9/2003 | Watson et al. |
| 6,617,564 B2 | 9/2003 | Ockerse et al. |
| 6,621,616 B1 | 9/2003 | Bauer et al. |
| 6,631,316 B2 | 10/2003 | Stam et al. |
| 6,642,851 B2 | 11/2003 | Deline et al. |
| 6,653,831 B2 | 11/2003 | Friend et al. |
| 6,670,207 B1 | 12/2003 | Roberts |
| 6,679,608 B2 | 1/2004 | Bechtel et al. |
| 6,696,935 B2 | 2/2004 | Bonardi et al. |
| 6,774,810 B2 | 8/2004 | DeLine et al. |
| 6,774,988 B2 | 8/2004 | Stam et al. |
| 6,861,809 B2 | 3/2005 | Stam |
| 6,963,437 B2 | 11/2005 | Bauer et al. |
| 6,980,092 B2 | 12/2005 | Turnbull et al. |
| 7,004,593 B2 * | 2/2006 | Weller et al. .................. 359/872 |
| 7,012,543 B2 | 3/2006 | DeLine et al. |
| 7,019,275 B2 | 3/2006 | Stam et al. |
| 7,023,379 B2 | 4/2006 | Turnbull |
| 7,064,882 B2 | 6/2006 | Tonar et al. |
| 7,118,931 B2 | 10/2006 | Roberts |
| 7,120,261 B1 | 10/2006 | Turnbull et al. |
| 7,149,627 B2 | 12/2006 | Ockerse et al. |
| 7,266,204 B2 | 9/2007 | Watson et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,327,226 B2 | 2/2008 | Turnbull et al. |
| 7,349,143 B2 | 3/2008 | Tonar et al. |
| 7,372,611 B2 | 5/2008 | Tonar et al. |
| 7,379,225 B2 | 5/2008 | Tonar et al. |
| 7,404,655 B2 | 7/2008 | Walser et al. |
| 7,417,221 B2 | 8/2008 | Creswick et al. |
| 7,423,821 B2 | 9/2008 | Bechtel et al. |
| 7,447,320 B2 | 11/2008 | Bryson et al. |
| 7,452,113 B2 | 11/2008 | Newton et al. |
| 7,468,651 B2 | 12/2008 | DeLine et al. |
| 7,477,439 B2 | 1/2009 | Tonar et al. |
| 7,488,083 B2 | 2/2009 | Hoek et al. |
| 7,488,099 B2 | 2/2009 | Fogg et al. |
| 7,511,872 B2 | 3/2009 | Tonar et al. |
| 7,543,946 B2 | 6/2009 | Ockerse et al. |
| 7,565,006 B2 | 7/2009 | Stam et al. |
| 7,567,291 B2 | 7/2009 | Bechtel et al. |
| 7,570,413 B2 | 8/2009 | Tonar et al. |
| 7,602,542 B2 | 10/2009 | Tonar et al. |
| 7,612,929 B2 | 11/2009 | Tonar et al. |
| 7,667,579 B2 | 2/2010 | DeLine et al. |
| 7,683,326 B2 | 3/2010 | Stam et al. |
| 7,700,906 B2 | 4/2010 | Stam et al. |
| 7,719,750 B2 | 5/2010 | Tonar et al. |
| 7,728,721 B2 | 6/2010 | Schofield et al. |
| 7,746,535 B2 | 6/2010 | Kelley et al. |
| 7,881,839 B2 | 2/2011 | Stam et al. |
| 7,887,204 B2 | 2/2011 | Zhao |
| 7,888,629 B2 | 2/2011 | Heslin et al. |
| 7,978,393 B2 | 7/2011 | Tonar et al. |
| 8,004,741 B2 | 8/2011 | Tonar et al. |
| 8,070,329 B1 | 12/2011 | Bechtel et al. |
| 8,144,223 B2 | 3/2012 | Van Blerkom et al. |
| 8,169,684 B2 | 5/2012 | Bugno et al. |
| 2004/0164228 A1 | 8/2004 | Fogg et al. |
| 2004/0201483 A1 | 10/2004 | Stam et al. |
| 2004/0230358 A1 | 11/2004 | Stam et al. |
| 2005/0152054 A1 | 7/2005 | Rumsey et al. |
| 2006/0016965 A1 | 1/2006 | Stam et al. |
| 2006/0106518 A1 | 5/2006 | Stam et al. |
| 2007/0041110 A1 | 2/2007 | Hoek et al. |
| 2007/0183068 A1 * | 8/2007 | Kozlowski .................. 359/877 |
| 2007/0291962 A1 | 12/2007 | Watson et al. |
| 2008/0049848 A1 | 2/2008 | Turnbull et al. |
| 2009/0010494 A1 | 1/2009 | Bechtel et al. |
| 2009/0046870 A1 | 2/2009 | Turnbull |
| 2009/0097674 A1 | 4/2009 | Watson et al. |
| 2009/0190015 A1 | 7/2009 | Bechtel et al. |
| 2009/0303566 A1 | 12/2009 | Tonar et al. |
| 2010/0073480 A1 | 3/2010 | Hoek et al. |
| 2010/0117815 A1 | 5/2010 | DeLine et al. |
| 2010/0124339 A1 | 5/2010 | Turnbull et al. |
| 2010/0150374 A1 | 6/2010 | Bryson et al. |
| 2010/0187407 A1 | 7/2010 | Bechtel et al. |
| 2010/0195226 A1 | 8/2010 | Heslin et al. |
| 2010/0246017 A1 | 9/2010 | Tonar et al. |
| 2010/0321328 A1 | 12/2010 | Chang et al. |
| 2010/0321758 A1 | 12/2010 | Bugno et al. |
| 2011/0317242 A1 | 12/2011 | Tonar et al. |
| 2012/0027241 A1 | 2/2012 | Turnbull et al. |

FOREIGN PATENT DOCUMENTS

| | | |
|---|---|---|
| EP | 1731365 A1 | 12/2006 |
| JP | 2002504038 A | 2/2002 |
| KR | 20080048574 A | 6/2008 |
| RU | 2381629 C2 | 2/2010 |
| WO | 2004005073 A2 | 1/2004 |

* cited by examiner

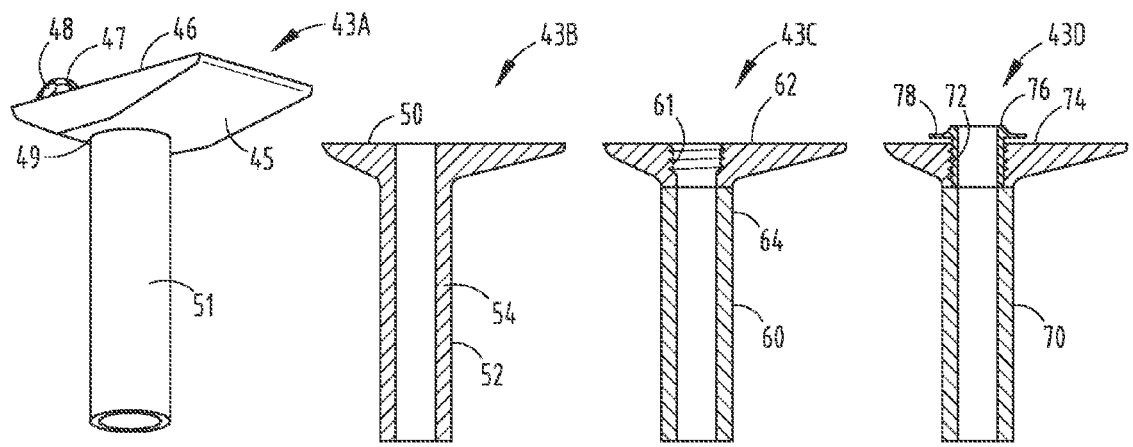
FIG. 7  FIG. 8  FIG. 9  FIG. 10
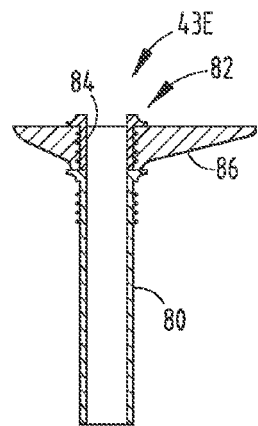 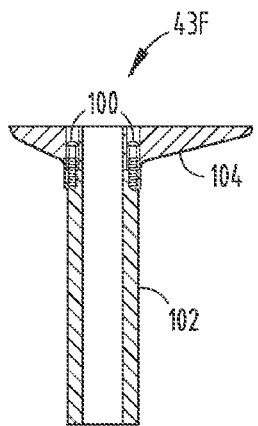 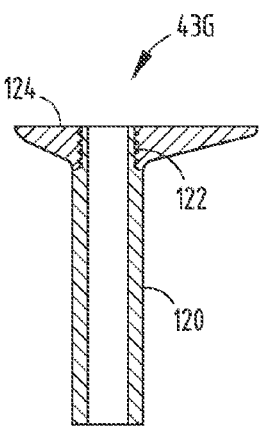 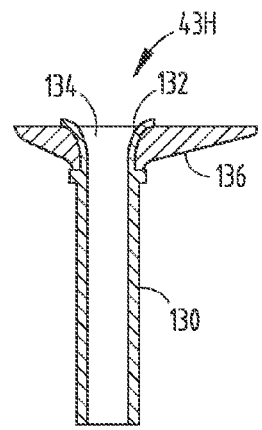
FIG. 11  FIG. 12  FIG. 13  FIG. 14
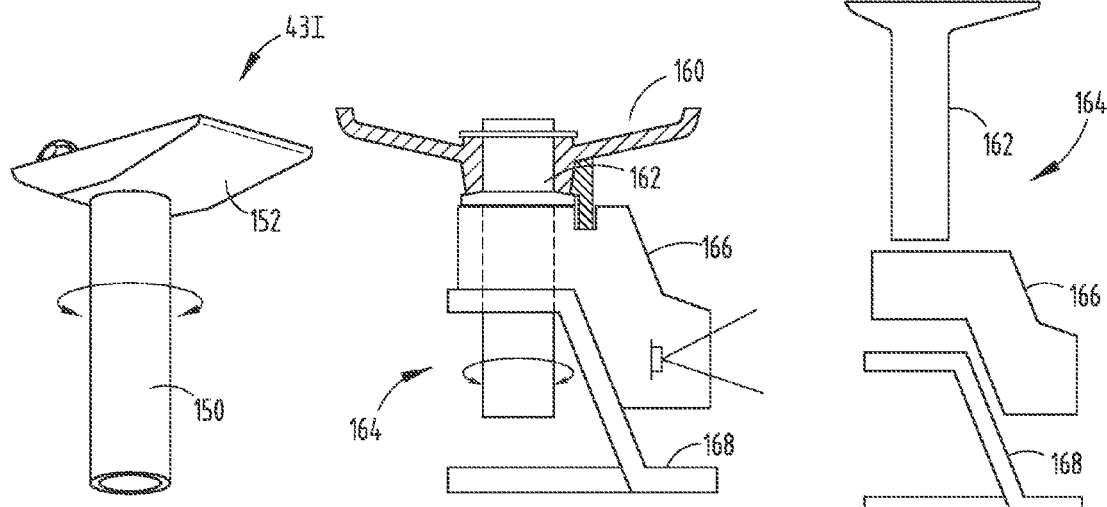
FIG. 15  FIG. 16  FIG. 17

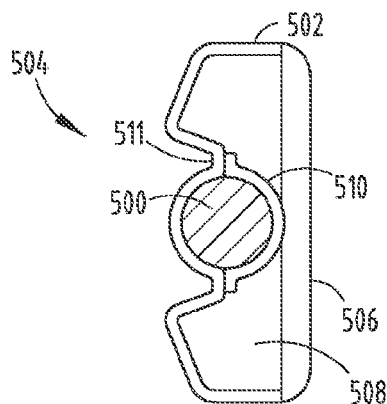
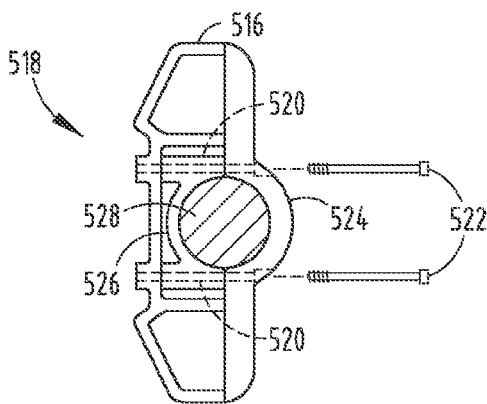
FIG. 47A  FIG. 47B
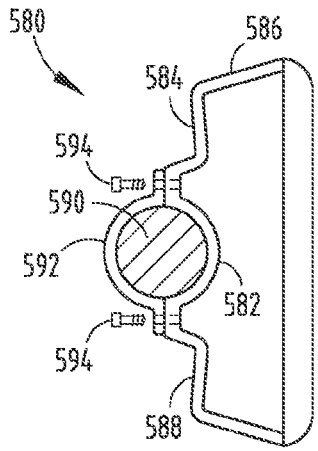
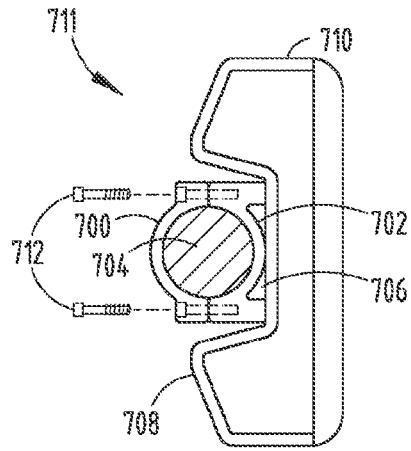
FIG. 48  FIG. 49
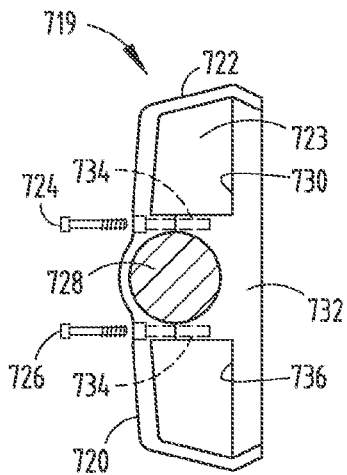
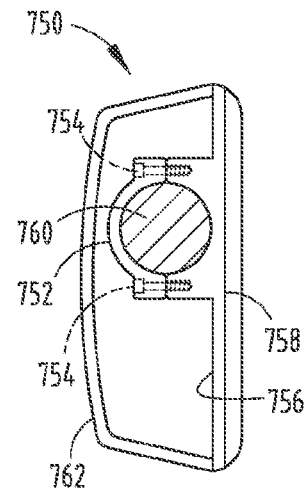
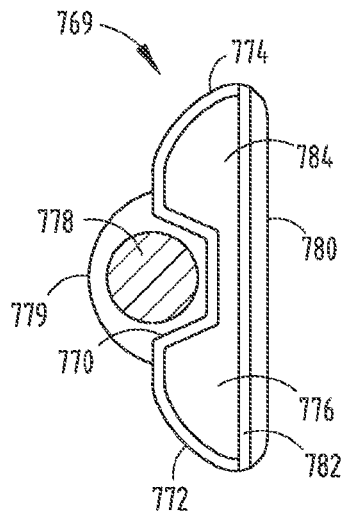
FIG. 50  FIG. 51  FIG. 52

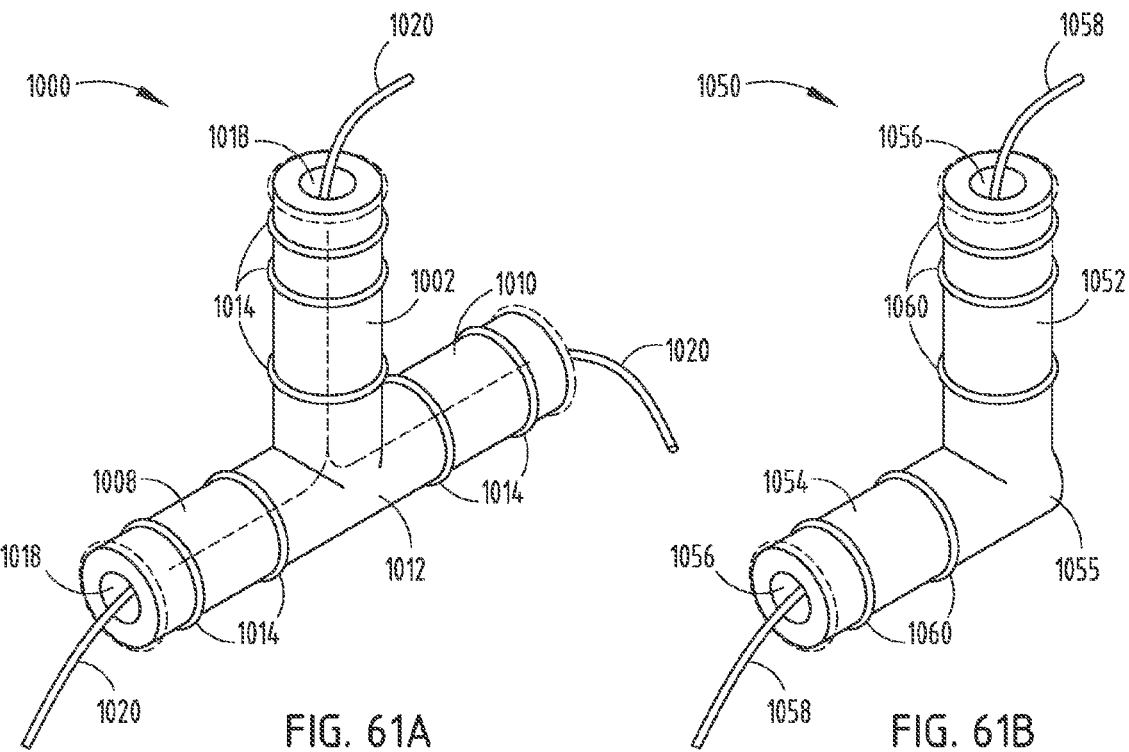
FIG. 61A
FIG. 61B
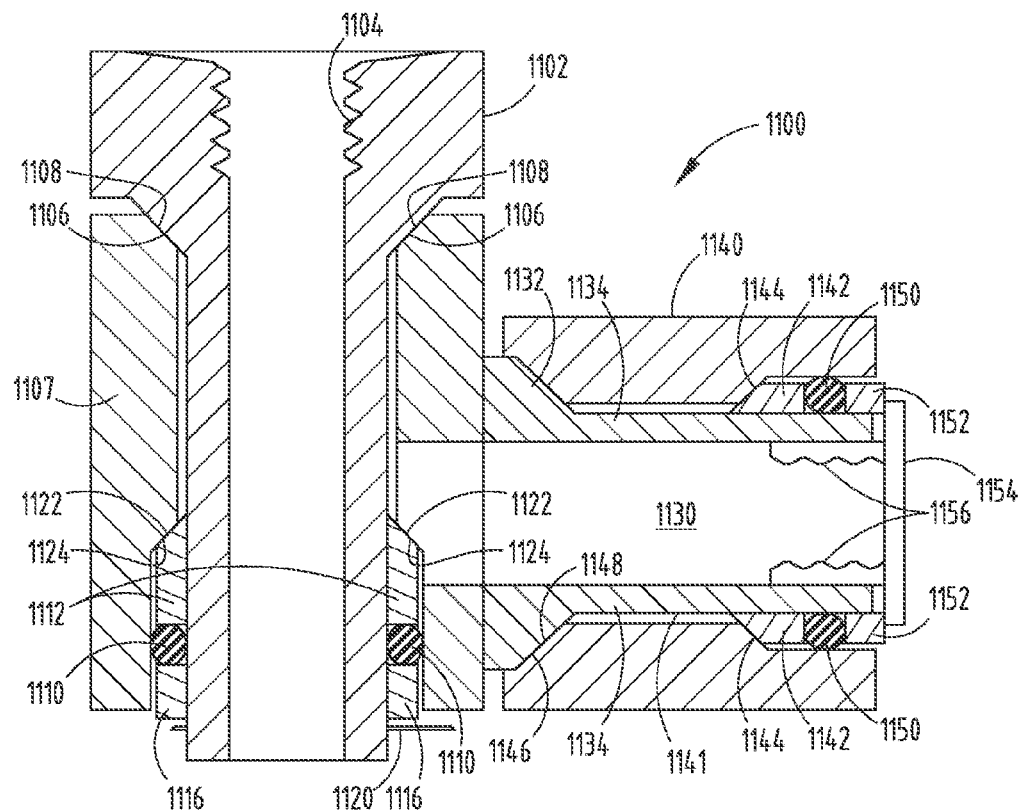
FIG. 61C

REARVIEW DEVICE MOUNTING ASSEMBLY WITH ROTATABLE SUPPORT

CROSS-REFERENCE TO RELATED APPLICATIONS

This application claims priority to and the benefit under 35 U.S.C. §119(e) of U.S. Provisional Patent Application No. 61/521,437, filed on Aug. 9, 2011, entitled "REARVIEW DEVICE SUPPORT ASSEMBLY," and U.S. Provisional Patent Application No. 61/447,472, filed on Feb. 28, 2011, entitled "REARVIEW DEVICE SUPPORT ASSEMBLY," the entire disclosures of which are hereby incorporated herein by reference.

BACKGROUND OF THE INVENTION

The present invention generally relates to a rearview device support assembly, and more specifically, to a rearview device support assembly configured to support a variety of devices in a static position, while maintaining movability of a rearview device.

SUMMARY OF THE INVENTION

One aspect of the present invention includes a rearview device mounting assembly having a mount configured to be operably coupled to a vehicle. A first support extends downward from the mount. A second support is rotatably connected with the first support and is rotatable about a first axis of rotation. The second support includes a carrier that extends substantially orthogonal to the first axis of rotation. A rearview device assembly is operably connected to the carrier. The rearview device assembly is substantially vertically rotatable about the carrier and substantially horizontally rotatable about the first support.

Another aspect of the present invention includes a rearview device mounting assembly having a first support. A second support is operably connected with the first support and is rotatable about a first axis of rotation. The second support includes a carrier and a coupler that is rotatable relative to the carrier in a second axis of rotation substantially perpendicular to the first axis of rotation. A rearview device assembly is operably connected to the coupler.

Yet another aspect of the present invention includes a rearview device mounting assembly having a first support rotatable about a substantially vertical axis. A second support is operably coupled with the first support. A carrier extends from the second support and is operably connected to a rearview device assembly. The rearview device assembly is rotatable relative to the carrier about a substantially horizontal axis.

These and other aspects, objects, and features of the present invention will be understood and appreciated by those skilled in the art upon studying the following specification, claims, and appended drawings.

BRIEF DESCRIPTION OF THE DRAWINGS

FIG. 7 is a bottom perspective view of one embodiment of a primary support and mount assembly of the present invention;

FIG. 8 is another embodiment of a primary support and mount assembly of the present invention;

FIG. 9 is another embodiment of a primary support and mount assembly of the present invention;

FIG. 10 is another embodiment of a primary support and mount assembly of the present invention;

FIG. 11 is another embodiment of a primary support and mount assembly of the present invention;

FIG. 12 is another embodiment of a primary support and mount assembly of the present invention;

FIG. 13 is another embodiment of a primary support and mount assembly of the present invention;

FIG. 14 is another embodiment of a primary support and mount assembly of the present invention;

FIG. 15 is a bottom perspective view of a primary support that is rotatable relative to a mount;

FIG. 16 is a side cross-sectional elevational view of one embodiment of a stacking arrangement of the present invention;

FIG. 17 is a side elevational exploded view of the stacking arrangement of FIG. 16;

FIG. 47A is a side cross-sectional view of a rearview device assembly that includes a front load installation;

FIG. 47B is a side cross-sectional elevational view of another embodiment of a mounting assembly including a front load installation;

FIG. 48 is a side cross-sectional view of a rearview device assembly that includes a rear load installation;

FIG. 49 is a side cross-sectional view of another embodiment of a mounting assembly including a rear load installation;

FIG. 50 is a side cross-sectional view of one embodiment of a mounting assembly for a chrome ring rearview device assembly;

FIG. 51 is a side cross-sectional view of a mounting assembly configured for a chrome ring rearview device assembly that includes a front load installation;

FIG. 52 is a side cross-sectional view of a mounting assembly configured for a chrome ring rearview device assembly that includes a rear load installation;

FIG. 61A is a front perspective view of a torque system of the present invention disposed on a secondary support having a T-shaped construction;

FIG. 61B is a front perspective view of a torque system of the present invention disposed on a secondary support having an L-shaped construction;

FIG. 61C is a cross-sectional view of another embodiment of a torque system of the present invention disposed on a secondary support having an L-shaped construction;

FIG. 71 is a top plan view of a gate for use with the prism mirror interface of FIG. 67;

FIG. 72 is a front top perspective view of one embodiment of a light sensor device housing of the present invention;

FIG. 73 is a rear top perspective view of the light sensor device housing of FIG. 72;

FIG. 74 is another rear top perspective view of the light sensor device housing of FIG. 72;

FIG. 75 is a top perspective view of another embodiment of a mounting assembly of the present invention;

FIG. 76 is a top perspective view of the mounting assembly of FIG. 75;

FIG. 77 is a front perspective view of the mounting assembly of FIG. 75;

FIG. 78 is a rear top perspective view of the mounting assembly of FIG. 75;

FIG. 79 is a front top perspective view of yet another embodiment of a mounting assembly of the present invention;

FIG. 80 is a front perspective view of the mounting assembly of FIG. 79;

FIG. 81 is a rear perspective view of the mounting assembly of FIG. 79;

FIG. 82 is a rear top perspective view of another embodiment of the mounting assembly of the present invention;

Figure 82:
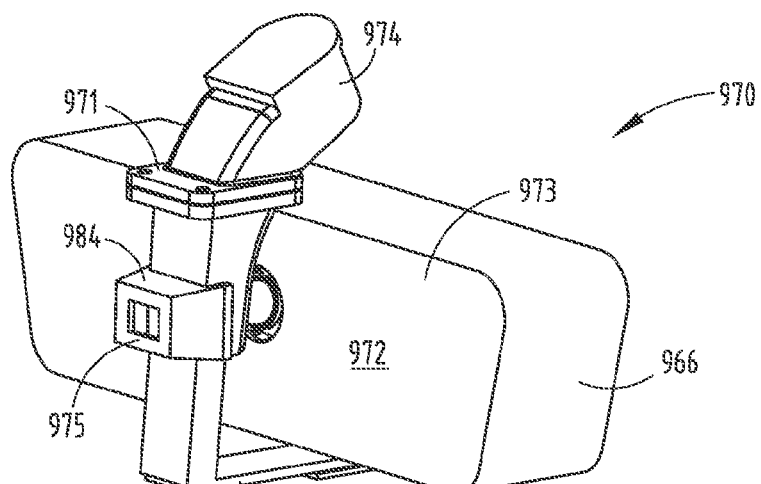
Figure 83:
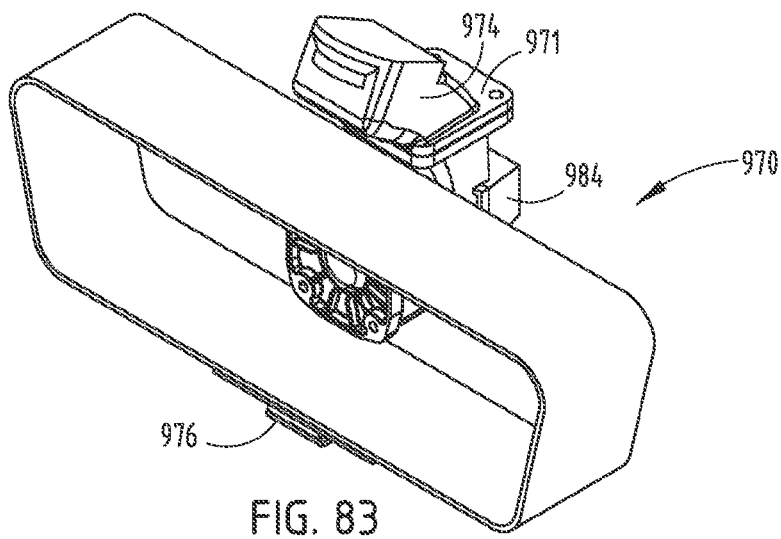
Figure 84:
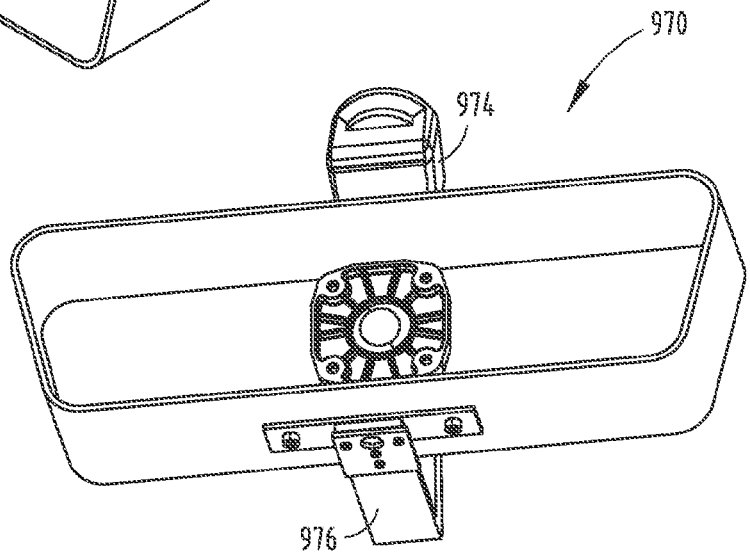
Figure 85:
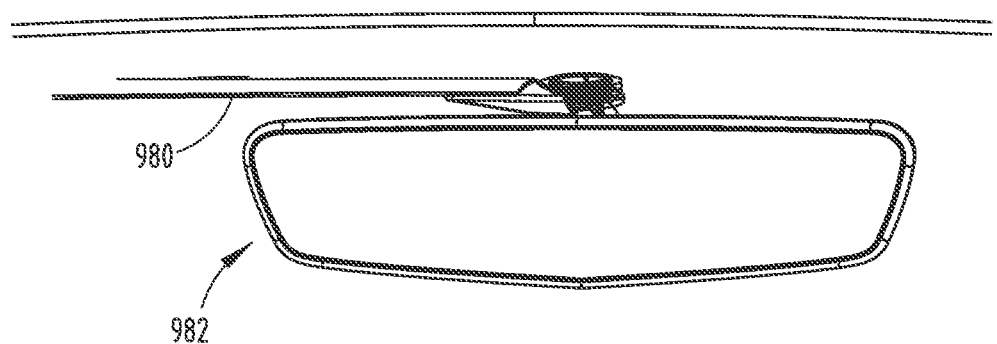
Figure 86:
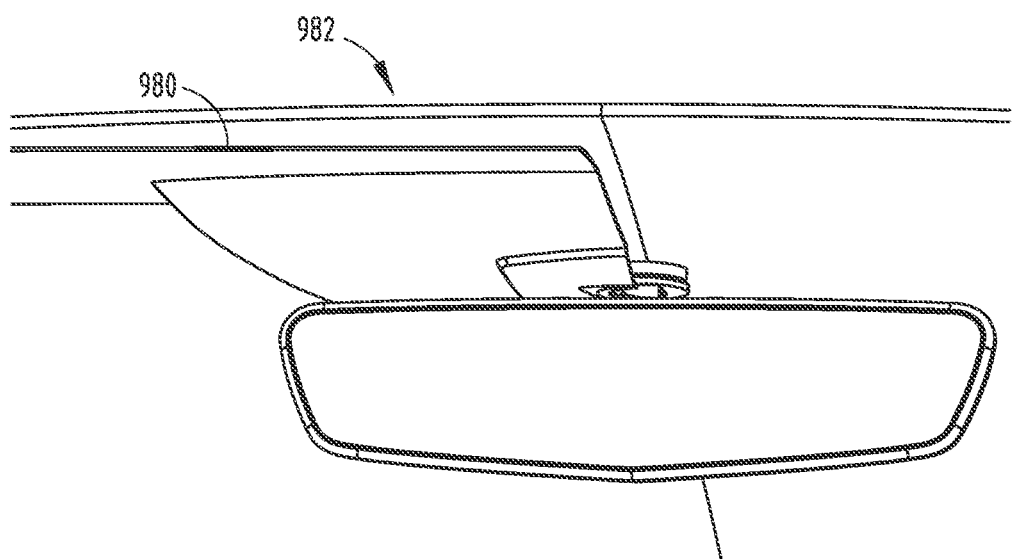

FIG. 83 is a front top perspective view of the mounting assembly of FIG. 82;

FIG. 84 is a bottom front perspective view of the mounting assembly of FIG. 82;

FIG. 85 is an enlarged front top perspective view of one embodiment of a rearview device assembly connected with a header assembly;

FIG. 86 is a top perspective view of the header assembly of FIG. 85; and

Figure 87:
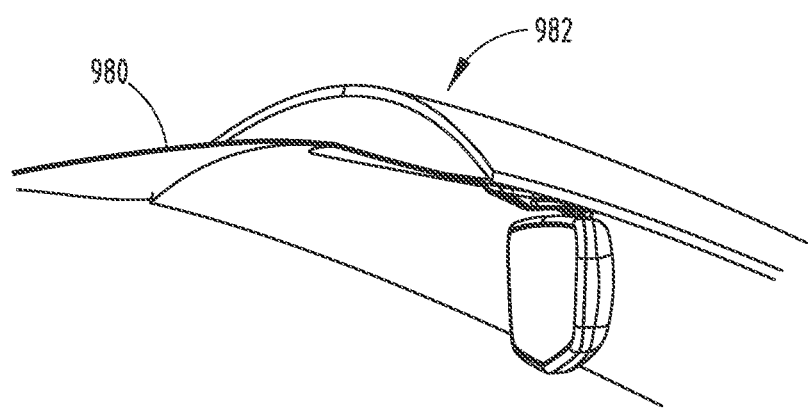

FIG. 87 is a side elevational view of the header assembly of FIG. 85.

DETAILED DESCRIPTION OF EMBODIMENTS

Figure 1:
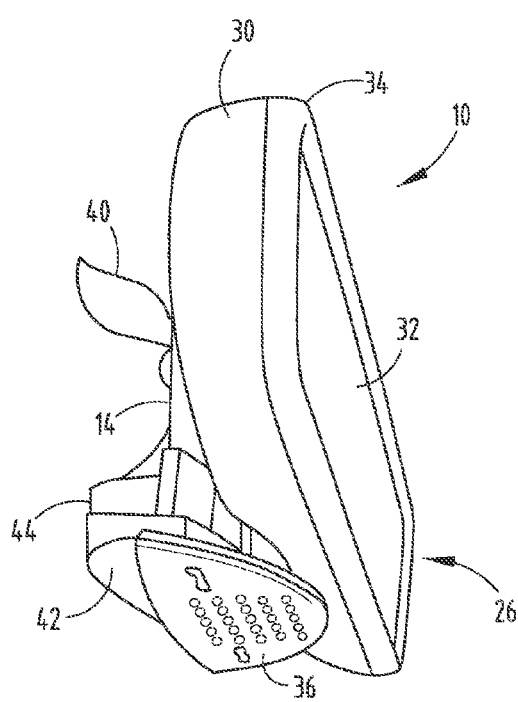
FIG. 1 is a bottom perspective view of one embodiment of a mounting assembly of the present invention.
Figure 2:
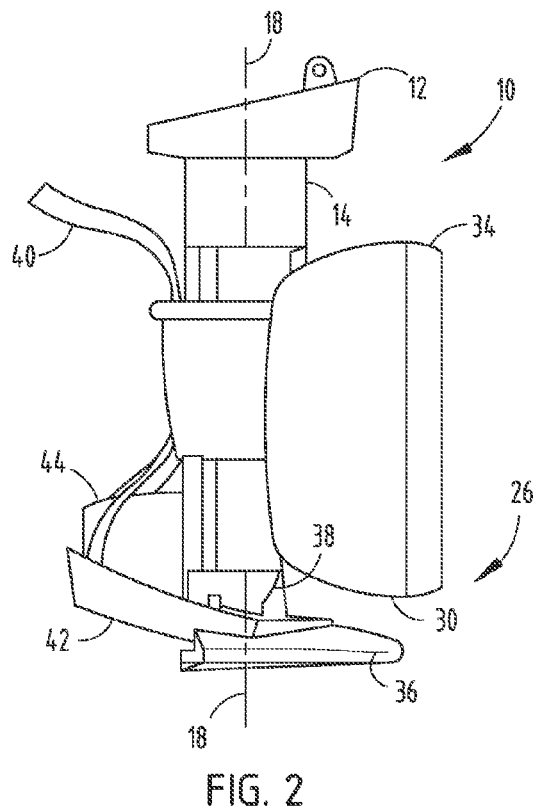
FIG. 2 is a side elevational view of the mounting assembly of FIG. 1.
Figure 3:
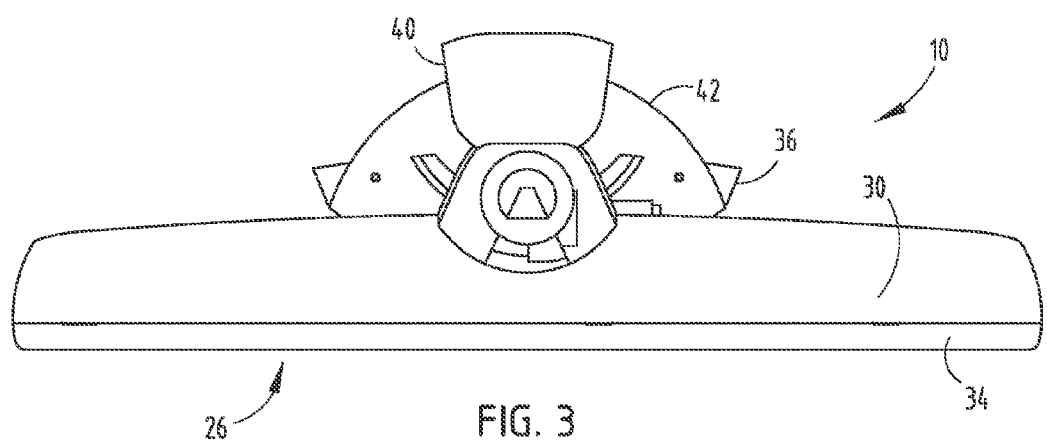
FIG. 3 is a top plan view of the mounting assembly of FIG. 1.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
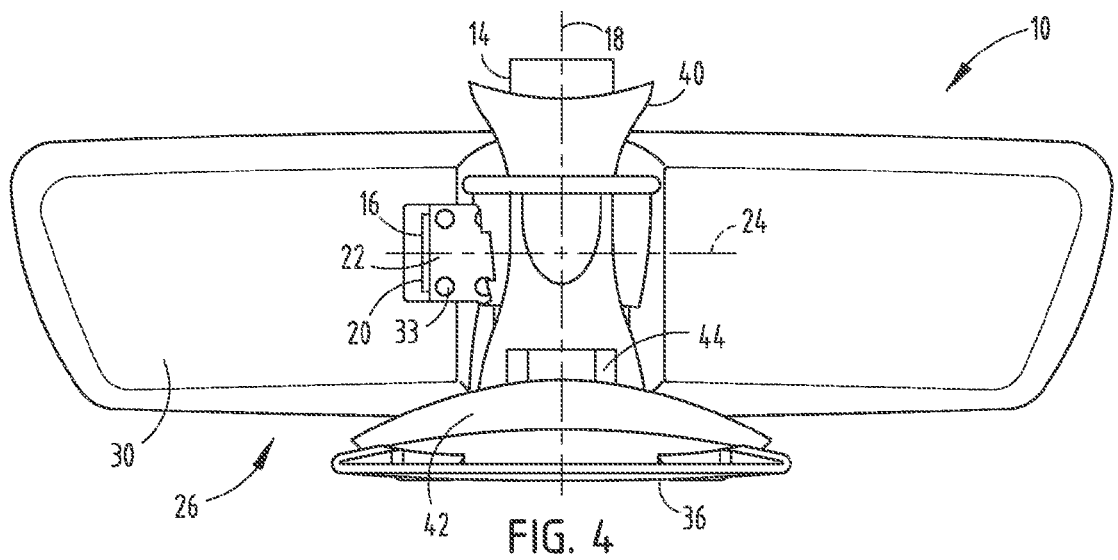
FIG. 4 is a rear elevational view of the mounting assembly of FIG. 1.
Figure 5:
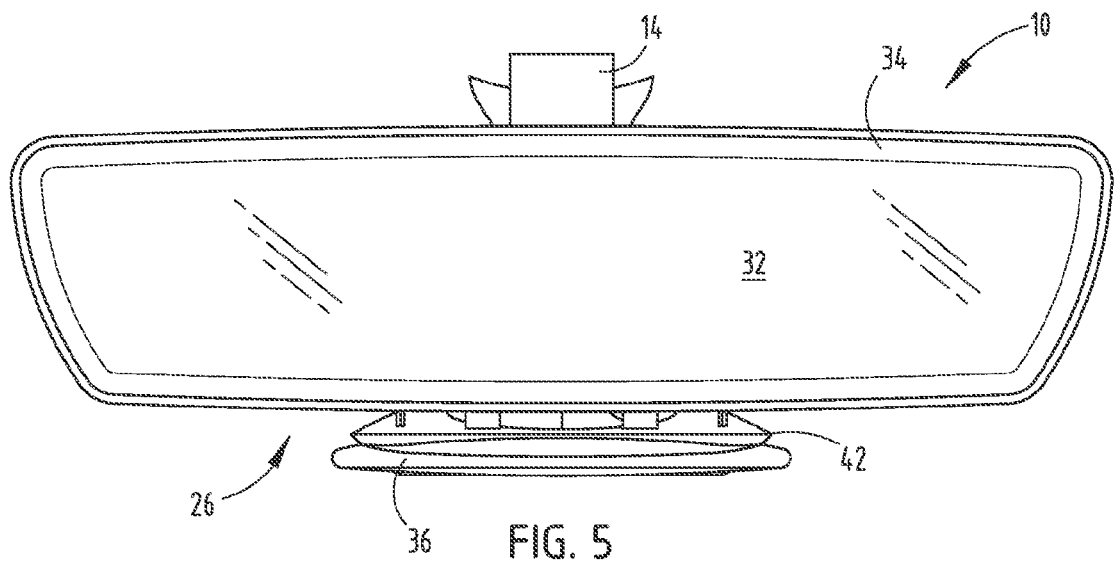
FIG. 5 is a front elevational view of the mounting assembly of FIG. 1.
Figure 6:
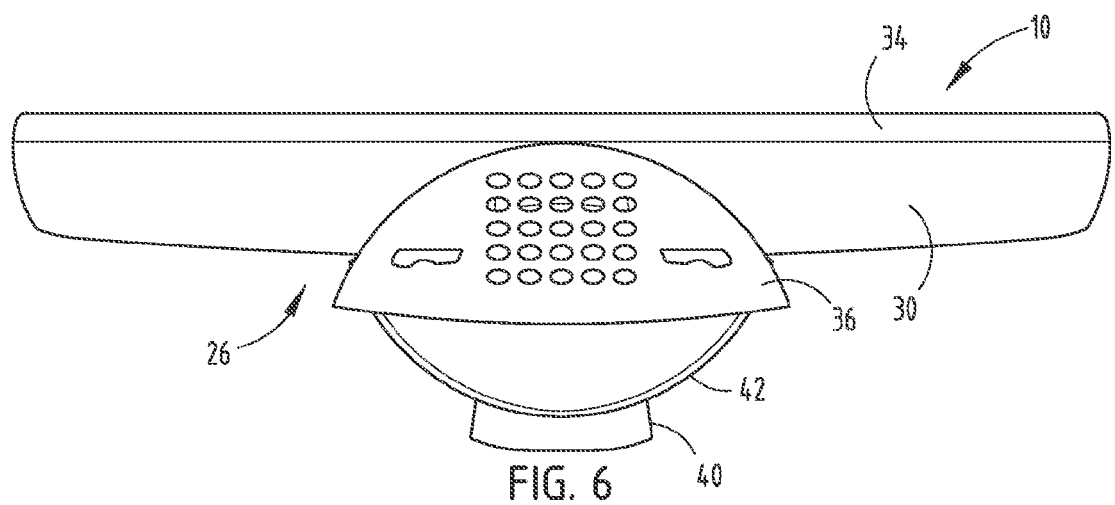
FIG. 6 is a bottom plan view of the mounting assembly of FIG. 1.

FIGS. 1, 2, and 4 illustrate a rearview device mounting assembly 10 including a mount 12. A first, main, or primary support 14 is operably connected to the mount 12. A second or secondary support 16 is operably connected with the primary support 14 and is rotatable about a first axis of rotation 18. The secondary support 16 includes a carrier 20 and a coupler 22 that is rotatable relative to the carrier 20 in a second axis of rotation 24 substantially perpendicular to the first axis of rotation 18. A rearview device assembly 26 is operably connected to the coupler 22.

By way of explanation and not limitation, the rearview device mounting assembly 10 is configured so that rearview device assembly 26 is movably attached to the secondary support 16 of the rearview device mounting assembly 10

(e.g., rotates along a horizontal axis and/or a vertical axis), while a light sensor device (e.g., an imager), or other electrical devices, can be fixedly connected to the primary support 14, such that the light sensor device does not move when the rearview device mounting assembly 10 is moved from one position to another. Thus, as a driver of a vehicle alters the position of the rearview device mounting assembly 10, the position of the light sensor device is not altered, so that the light sensor device maintains substantially the same field of view. Accordingly, processing of the sensed light by the stationary light sensor device is not affected by the movement of the rearview device assembly 26 operably connected with the rearview device mounting assembly 10. In one embodiment, the light sensor device can be configured to detect an oncoming headlight of a vehicle and/or a taillight of a leading vehicle to control the light emitted by of the headlamps of the controlled vehicle. Thus, the light sensor device can at least partially be included in the packaging or housing of the rearview device mounting assembly 10, but the field of view of the light sensor device is not altered when the position of the rearview device mounting assembly 10 is altered.

Referring now to FIGS. 1-6, the rearview device mounting assembly 10 is generally designed to support an interior rearview mirror construction (e.g., the rearview device assembly 26) that includes a housing 30 with a reflective element 32 (FIGS. 1 and 5), such as an electrochromic element, attached thereto. The coupler 22 may be attached to the reflective element 32 by mechanical fasteners 33 (FIG. 4). A bezel 34 (FIG. 3) may also be attached with the housing 30 and may be formed in a variety of constructions, as shown in co-pending U.S. patent application Ser. No. 13/271,745, which claims priority to and the benefit of U.S. Provisional Patent Application No. 61/392,119; U.S. Patent Application Publication No. 2005/0152054, and U.S. Pat. Nos. 6,102,546 and 7,324,261.

The rearview device assembly 26 is generally described herein as a rearview device assembly for purposes of explanation and not limitation. It should be appreciated by one skilled in the art that the rearview device assembly 26 can also be an assembly having a display (e.g., an LCD display) that provides an image rearward, adjacent, or a combination thereof, to a vehicle.

Referring again to FIGS. 1 and 2, in the illustrated embodiment, a lighting system 36 adapted to accommodate one or more light sources is connected with a bottom portion 38 of the rearview device mounting assembly 10. The lighting system 36 may be configured to act as a puddle or a map light, thereby providing visibility in a cabin of a vehicle. A shroud 40 is also provided on the rearview device mounting assembly 10. The shroud 40 extends forward of the rearview device mounting assembly 10 and specifically forward of the primary support 14 to reduce visibility of the primary support 14 from outside the vehicle. A shield 42 extends above the lighting system 36, and similar to the shroud 40, acts to hide electronics from view, such as a light sensor device 44 (e.g., an imaging sensor or a camera), as shown in FIG. 2. The shield 42 also limits infiltration of ambient light and dust into the electronics.

The light sensor device 44 is described herein as an imager or a camera for purposes of explanation and not limitation. It should be appreciated by those skilled in the art that the light sensor device can be, but is not limited to, a photodiode, a phototransistor, etc., a single pixel device, a multiple pixel device, a high dynamic range camera, the like, or a combination thereof.

The electronics that are supported by the rearview device mounting assembly 10 may include microphone or telematics systems, such as those disclosed in U.S. Pat. Nos. 8,081,772; 7,447,320; 7,266,204; 7,120,261; 7,023,379; 6,980,092; 6,614,911; 6,539,306; 6,396,446; and 6,367,939; U.S. Patent Application Publication Nos. 2012/0027241; 2010/0150374; 2009/0097674; 2009/0046870; 2008/0049848; and 2007/0291962; and PCT Application No. WO 09/067,888; antenna systems, such as those disclosed in U.S. Pat. Nos. 7,327,226; 6,431,712; and 5,504,478; headlamp control electronics, such as those disclosed in U.S. Pat. Nos. 8,045,760; 7,881,839; 7,700,906; 7,567,291; 7,565,006; 7,423,821; 7,417,221; 6,861,809; 6,774,988; 6,634,316; 6,621,616; 6,465,963; 6,403,942; 6,130,448; 6,130,421; and 5,537,003; U.S. Patent Application Publication Nos. 2009/0010494; 2006/0016965; 2004/0164228; and 2004/0230358; and U.S. patent application Ser. No. 13/034,748, which claims priority to and the benefit of U.S. Provisional Patent Application No. 61/413,797; compass systems, such as those disclosed in U.S. Pat. Nos. 7,149,627; 6,653,831; and 6,140,933; vision electronics, such as those disclosed in U.S. Pat. Nos. 7,683,326; 7,567,291; 7,423,821; 7,417,221; 6,963,437; and 6,008,486; and U.S. Patent Application Publication No. 2009/0190015; moisture sensor systems, such as those disclosed in U.S. Pat. Nos. 7,543,946; 7,019,275; 6,696,935; 6,617,564; and 6,313,457; and U.S. Patent Application Publication Nos. 2010/0188540; and 2010/0187407; and active light sensor systems, such as those disclosed in U.S. Pat. Nos. 7,543,946 and 6,359,274.

Primary Support

Referring to FIGS. 7-14, various embodiments of mount/primary support interface constructions 43A-43I are shown. As shown in FIG. 7, one embodiment of a mount/primary support 43A includes a mount 45 having a substantially planar top portion 46 with knob-like members 47 extending up from the planar top portion 46. The knob-like members 47 include an aperture 48 adapted to receive a rod and spring assembly for connection to a connector disposed on a windshield of a vehicle or a header assembly. The mount 45 is configured to define a large aperture 49 adapted to receive a primary support 51. The primary support 51 may be connected with the mount 45 in a variety of manners.

Figure 8A:
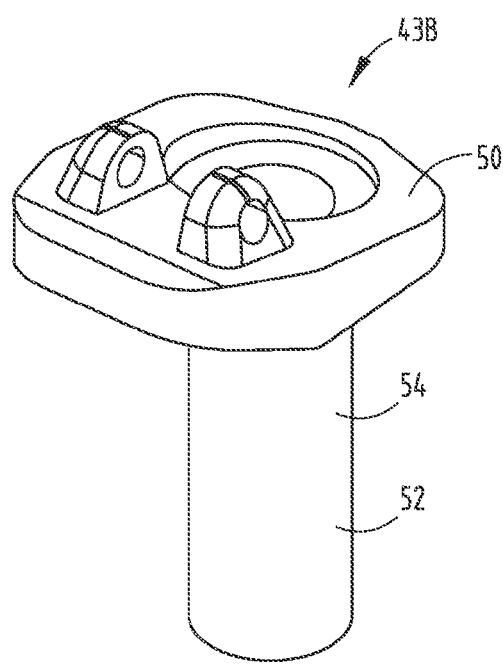
FIG. 8A is a top perspective view of the primary support and mount assembly of FIG. 8.
Figure 8B:
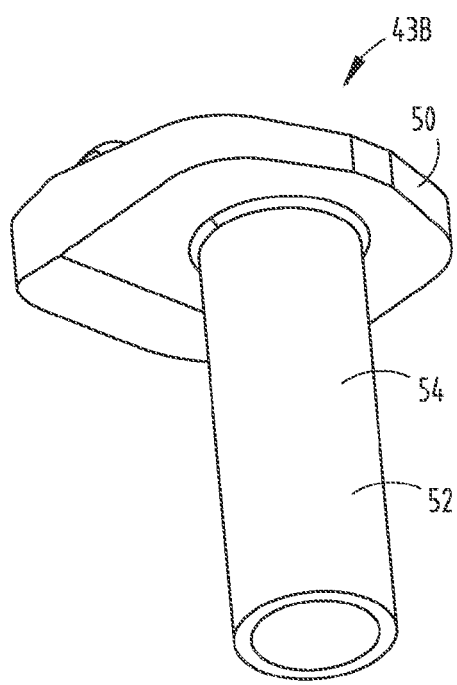
FIG. 8B is a bottom perspective view of the primary support and mount assembly of FIG. 8.
Figure 9A:
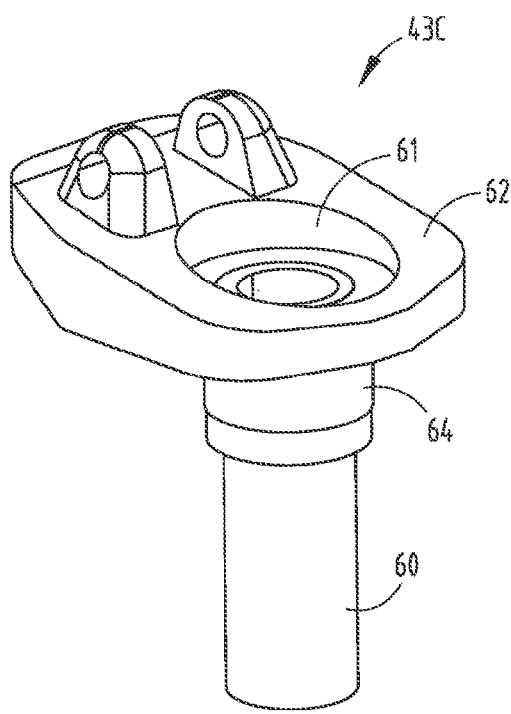
FIG. 9A is a top perspective view of the primary support and mount assembly of FIG. 9.
Figure 9B:
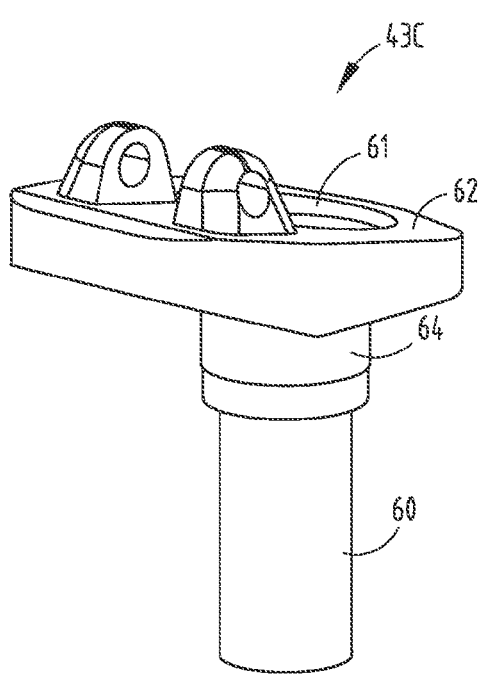
FIG. 9B is another top perspective view of the primary support and mount assembly of FIG. 9.

As shown in FIGS. 8-8B, a mount/primary support 43B includes a mount 50 and a primary support 52 that are one integral piece 54 connected with a windshield of a vehicle. In this embodiment, the primary support 52 is formed at the same time the mount 50 is formed to create the one integral piece 54 made of a single uniform material, such as steel or plastic. Alternatively, the embodiment of a mount/primary support 43C of FIGS. 9-9B illustrates a primary support 60 press-fit inside an aperture 61 defined by a mount 62 prior to installation of the mount 62 or connection of the mount 62 with a windshield of a vehicle. In this instance, the outside diameter of a top portion 64 of the primary support 60 is sized to very tightly fit inside and be retained in the aperture 61 of the mount 62. Alternatively, as shown in the embodiment of a mount/primary support 43D of FIG. 10, a primary support 70 may extend into an aperture 72 defined by a mount 74 with a top portion 76 of the primary support 70 extending above the mount 74. The top portion 76 of the primary support 70 includes small slots to accommodate a retaining ring 78 that keeps the primary support 70 in position in the aperture 72 of the mount 74. The retaining ring 78 is operably connected with the primary support 70, such that removal of the retaining ring 78 allows disconnection of the primary support 70 from the mount 74.

Figure 11A:
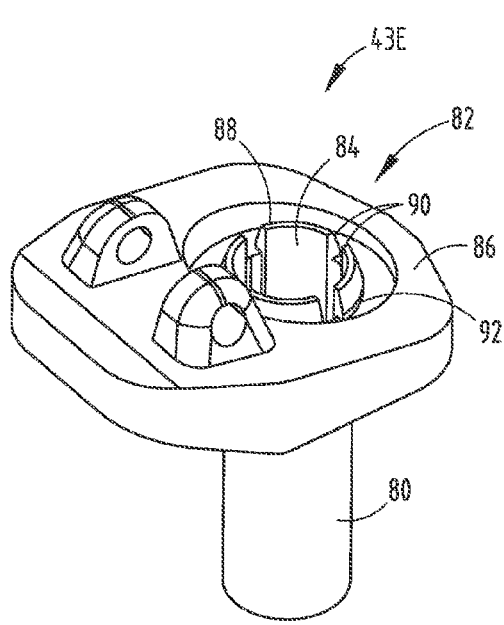
FIG. 11A is a top perspective view of the primary support and mount assembly of FIG. 11.
Figure 11B:
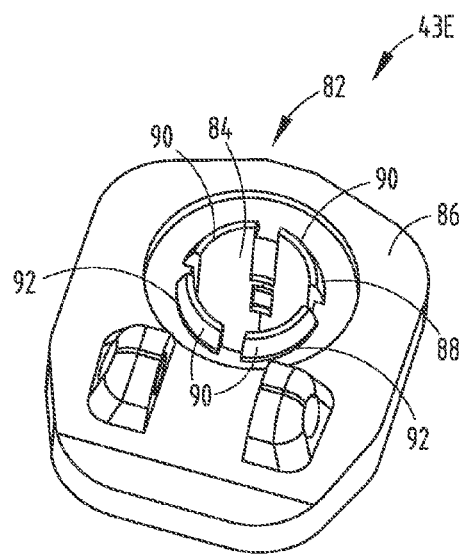
FIG. 11B is a top plan view of the primary support and mount assembly of FIG. 11.

In yet another embodiment, as shown in FIGS. 11-11B, a mount/primary support 43E includes a primary support 80 that has a snap-fit feature 82 that allows the primary support 80 to engage an aperture 84 defined by a mount 86 and snap into an attached position during assembly. In this embodiment, a top portion 88 of the primary support 80 includes at least one flexible tab 90. The tab 90 includes a ledge 92 that snaps over a portion of the mount 86 proximate the aperture 84 of the mount 86, thus creating an interference fit that prevents the primary support 80 from becoming disconnected. In the illustrated embodiment, four tabs 90 are included. However, it is contemplated that more or less tabs 90 may be present to retain the primary support 80 in position in the aperture 84 of the mount 86.

Figure 12A:
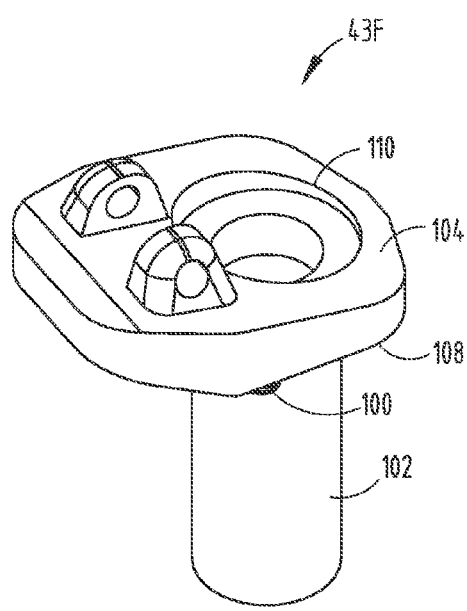
FIG. 12A is a top perspective view of the primary support and mount assembly of FIG. 12.
Figure 12B:
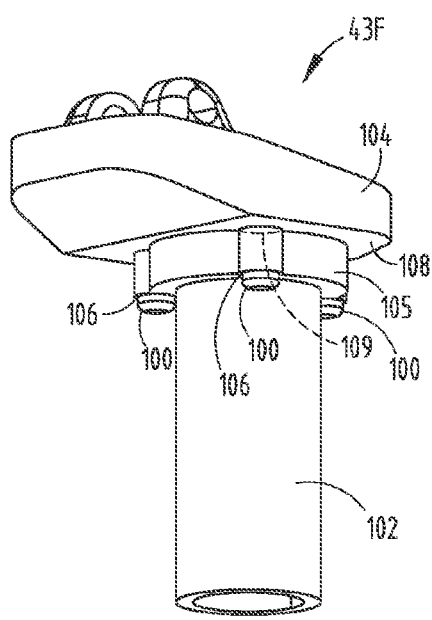
FIG. 12B is a bottom perspective view of the primary support and mount assembly of FIG. 12.
Figure 13A:
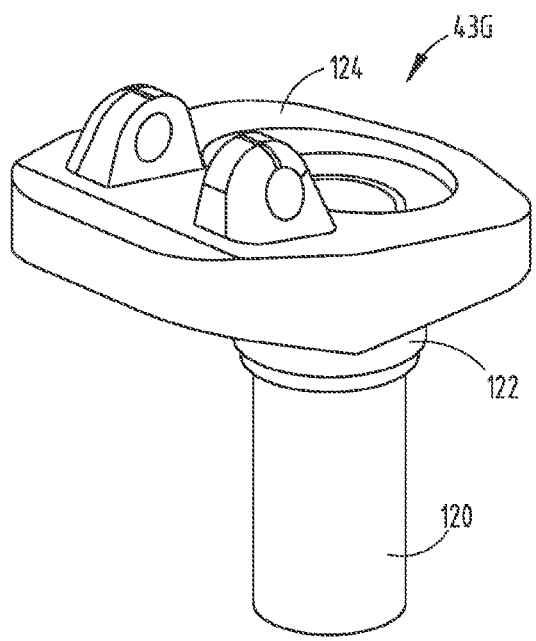
FIG. 13A is a top perspective view of the primary support and mount assembly of FIG. 13.
Figure 13B:
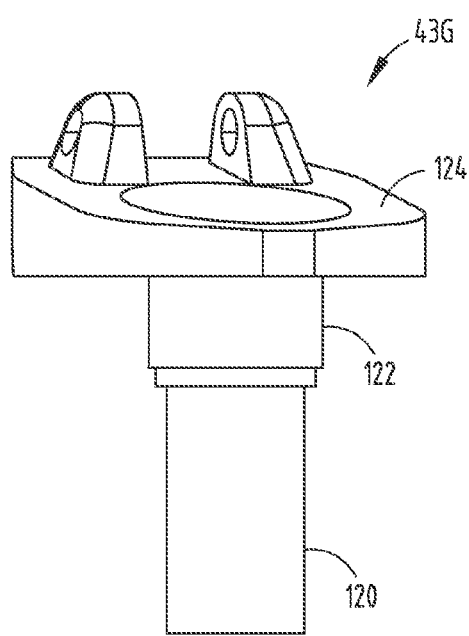
FIG. 13B is a bottom perspective view of the primary support and mount assembly of FIG. 13.

In still another embodiment, as shown in FIGS. 12-12B, a mount/primary support 43F includes one or more mechanical fasteners 100 used to connect a primary support 102 with a mount 104. In this embodiment, the primary support 102 includes a collar 105, that defines mechanical fastener receiving apertures 106. A bottom portion 108 of the mount 104 defines complementary mechanical fastener receiving apertures 109. To secure the primary support 102 to the mount 104, the primary support 102 is positioned in an aperture 110 defined by the mount 104 and the mechanical fastener receiving apertures 106 defined by the collar 105 are aligned with the mechanical fastener receiving apertures 109 defined by the mount 104. The mechanical fasteners 100 are then positioned in the mechanical fastener receiving apertures 106, 109 to secure the primary support 102 to the mount 104. Alternatively, as shown in the embodiment of FIGS. 13-13B, a mount/primary support 43G includes a primary support 120 having a threaded top portion 122 adapted to engage complementary threads in a mount 124, thereby allowing the primary support 120 to be rotated into a secure position with the mount 124. In this instance, the primary support 120 is rotated into secure engagement with the mount 124 until the primary support 120 and mount 124 are tightly connected.

Figure 14A:
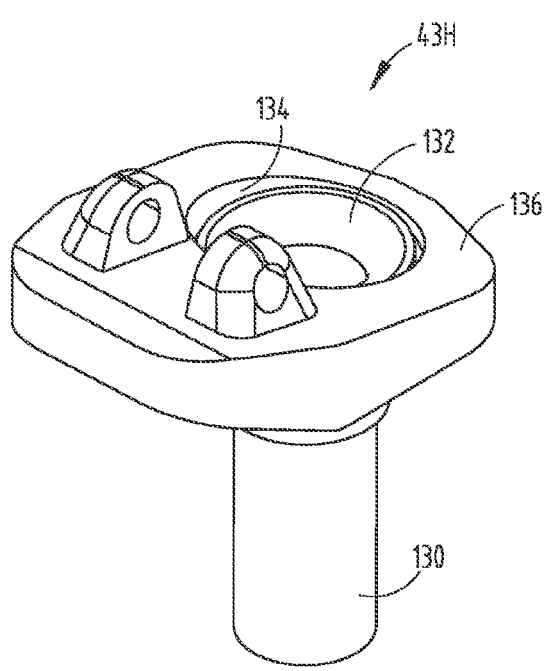
FIG. 14A is a top perspective view of the primary support and mount assembly of FIG. 14.
Figure 14B:
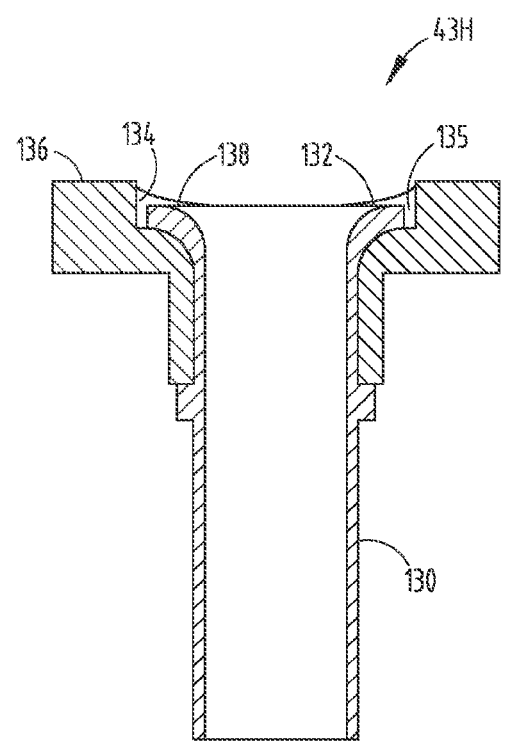
FIG. 14B is a side cross-sectional view of the primary support and mount assembly of FIG. 14.

In yet another embodiment, as shown in FIGS. 14-14B, a mount/primary support 43H includes a primary support 130 having a top portion 132 with a swagged tubing construction that allows for a curvilinear end portion 134 of the primary support 130 to engage and be held inside an aperture 135 defined by a mount 136. In this embodiment, a lip 138 formed by the curvilinear end portion 134 prevents the primary support 130 from disengaging the mount 136.

In yet another embodiment, as shown in FIG. 15, a mount/primary support 43I includes a primary support 150 secured with a mount 152, such that the primary support 150 is rotatable relative to the mount 152, rather than being fixedly attached with the mount 152 in a substantially vertical orientation. In this instance, a smooth gasket may be juxtaposed between the primary support 150 and the mount 152 to allow rotation of the primary support 150 relative to the mount 152. Alternatively, a bearing device, individual ball bearings, or other suitable device, may be positioned between the primary support 150 and the mount 152 to allow smooth rotation of the primary support 150 relative to the mount 152.

In another embodiment of the present invention, as shown in FIGS. 16 and 17, a mount 160 and a primary support 162 are configured to include a stacking feature 164, such that a first electronics system 166, such as the headlamp control system illustrated, and a second electronics system 168, such as the lighting system illustrated, can be oriented in various positions. More specifically, the primary support 162 is designed to accommodate the light sensor device above the lighting system 168 or the lighting system 168 above the headlamp control system 166. It is generally contemplated that more electronics systems may also be positionable above, between, and/or below the first and seconds electronic systems 166, 168.

Secondary Support

Regarding secondary mount constructions, it is contemplated that the secondary support may include an axis of rotation that is aligned with and orthogonal to an axis of rotation of the extension member. Alternatively, the secondary support may be offset relative to the extension member, such that the axis of rotation of the extension member and the secondary mount do not intersect orthogonally.

The embodiments of FIGS. 18-25 illustrate various embodiments of a secondary or second support that extends substantially orthogonal to a primary support. It will be understood that, for purposes of one or more embodiments described herein, the term "orthogonal" can mean that the longitudinal extent of the secondary support relative to the longitudinal extent of the primary support is approximately 90 degrees. It will also be understood that the term "substantially," as applied in one or more embodiments of this application, can be understood to mean that the longitudinal extent of the secondary support is within approximately 30 degrees of being perfectly orthogonal or perfectly aligned at a 90 degree angle relative to the longitudinal extent of the primary support. Further, it will be understood that the longitudinal extent of the primary support does not need to be completely vertically oriented, and that the primary support may be as much as approximately 30 degrees from perfect vertical alignment. Likewise, the longitudinal extent of the secondary support does not need to be parallel with the horizon or perfectly horizontal, and can be as much as approximately 30 degrees from perfect horizontal alignment.

T-Shaped Construction

Figure 18:
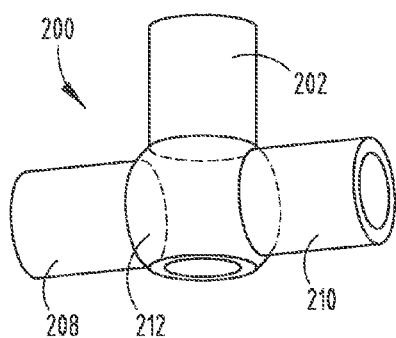
FIG. 18 is a bottom perspective view of one embodiment of a mounting assembly having a T-shaped construction.

As shown in the embodiment of FIG. 18, a secondary support 200 includes a T-shaped construction. Specifically, the secondary support 200 includes an engagement member 202 adapted to operably couple with a primary support. The secondary support 200 also includes a carrier in the form of first and second extension members 208, 210 extending in approximately opposite directions from one another. The first and second extension members 208, 210 and the engagement member 202 connect with a central hub 212. It is contemplated that the first and second extension members 208, 210 and the engagement member 202 may be connected in any of a variety of ways. For example, the first and second extension members 208, 210 and the engagement member 202 may be integral with the central hub 212, or may be welded thereto, fastened thereto, etc. The engagement member 202 extends in a direction substantially orthogonal to the first and second extension members 208, 210.

Figure 19:
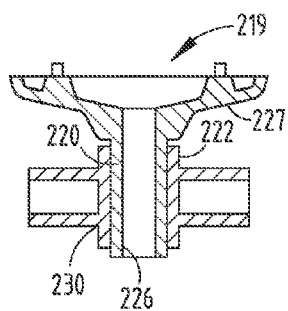
FIG. 19 is a side cross-sectional view of one embodiment of a connection arrangement of the present invention.
Figure 20:
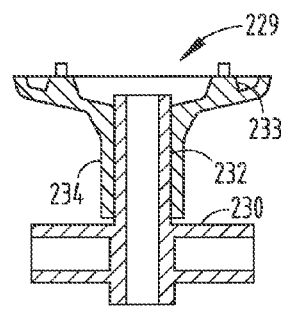
FIG. 20 is a side cross-sectional view of another embodiment of a connection arrangement of the present invention.
Figure 21:
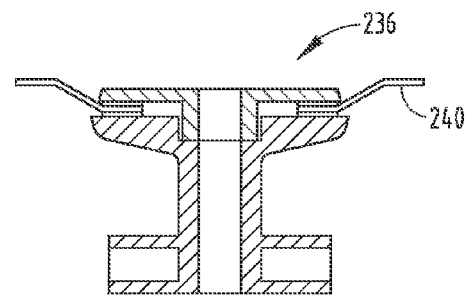
FIG. 21 is a side cross-sectional view of yet another embodiment of a connection arrangement of a mounting assembly having a T-shaped construction.
Figure 22:
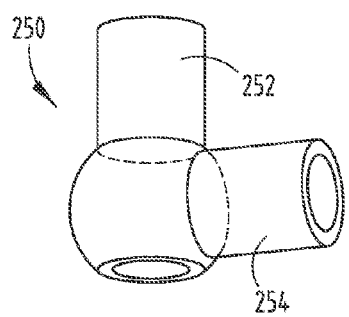
FIG. 22 is a bottom perspective view of one embodiment having a mounting assembly having an L-shaped construction.
Figure 23:
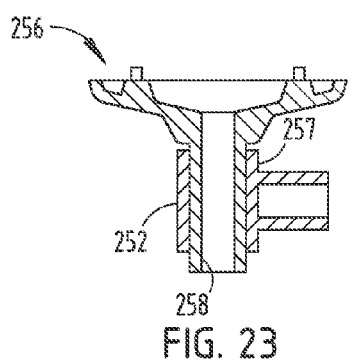
FIG. 23 is a side cross-sectional view of another embodiment of a mounting assembly having an L-shaped construction.

The secondary support may be engaged with the primary support in a variety of manners, as shown in FIGS. 19-21. In one example, as shown in FIG. 19, a mounting assembly 219 includes a secondary support 220 that includes an engagement member 222 in the form of a sleeve that wraps around and is rotatingly coupled with at least a portion of a primary support 226, allowing full rotation of the secondary support 220 around the primary support 226. The mounting assembly 219 is connected to a mount 227.

Figure 19A:
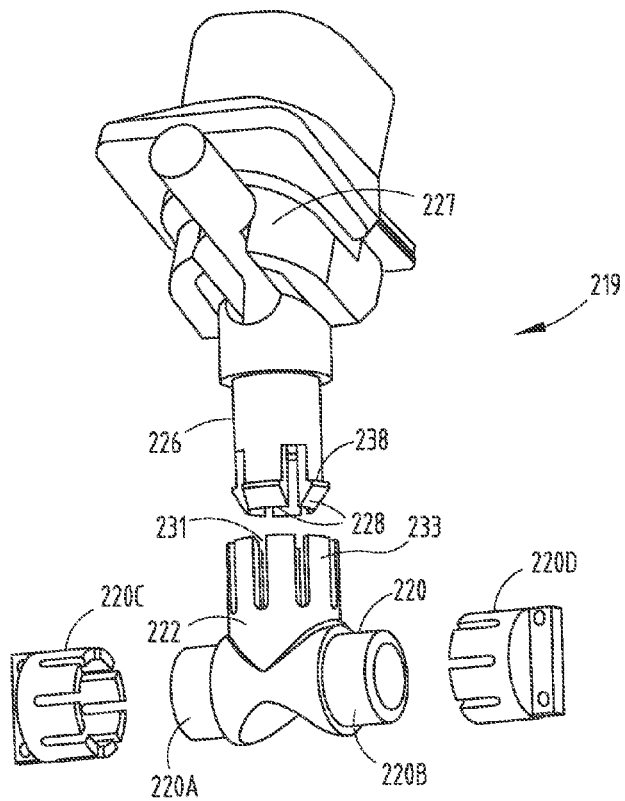
FIG. 19A is a bottom perspective view of the T-shaped construction of FIG. 19.
Figure 19B:
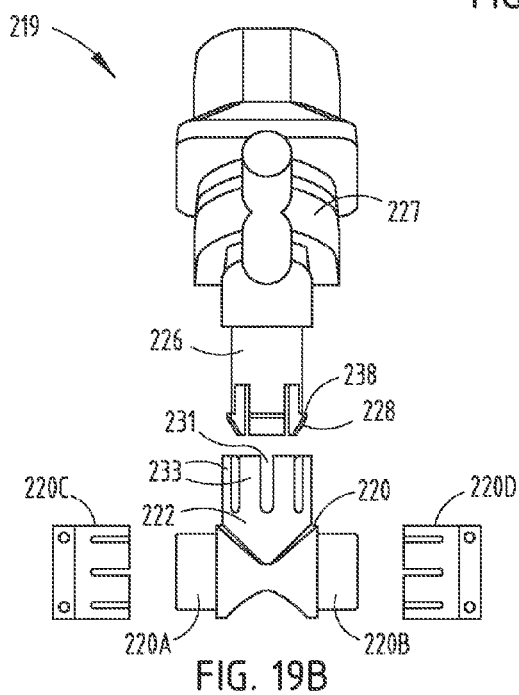
FIG. 19B is another perspective view of the T-shaped construction of FIG. 19.
Figure 19C:
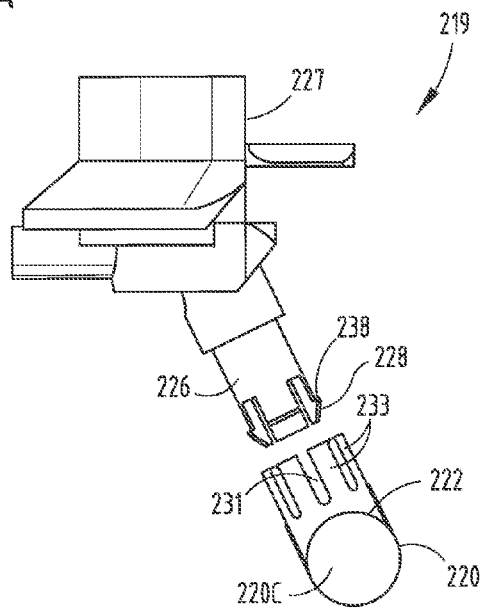
FIG. 19C is a side elevational view of the T-shaped construction of FIG. 19.

As shown in the embodiment of FIGS. 19-19C, the primary support 226 extends downward from the mount 227 and includes a plurality of tabs 228 with a shoulder 238 adapted to snap-fit engage with the secondary support 220 that defines a receiving cavity 231 disposed therein (e.g., a sleeve 233 of the engagement member 222 defines the cavity 231). The sleeve 233 of the engagement member 222 extends around the primary support 226 and is supported thereon by the plurality of tabs 228 of the primary support 226. The plurality of tabs 228 have a snap-fit construction that allows for a positive engagement of the plurality of tabs 228 in the sleeve 233 of the engagement member 222. This construction allows the secondary support 220 to rotate around the primary support 226 in a substantially horizontal plane of rotation. First and second extension members 220A and 220B of the secondary support 220 extend orthogonally from the engagement member 222 in opposite directions from one another. The first and second extension members 220A and 220B include rotatable couplings 220C and 220D that are rotatably secured with the first and second extension members 220A and 220B and adapted for fixed connection with a rear portion of a housing on a rearview device assembly. Thus, the couplings 220C and 220D are rotatable around the extension members 220A and 220B in a substantially vertical plane of rotation.

In another embodiment, as shown in FIG. 20, a mounting assembly 229 includes a secondary support 230 having an engagement member 232 in the form of a post that is adapted to engage and be disposed inside a primary support 234 connected to a mount 233. The engagement member 232 may connect with and be supported inside the primary support 234 in any of a variety of mechanical manners similar to those methods discussed herein with respect to FIGS. 7-14 and as understood by one having ordinary skill in the art. Extension members 235 extend outwardly from the secondary support 230.

Figure 20A:
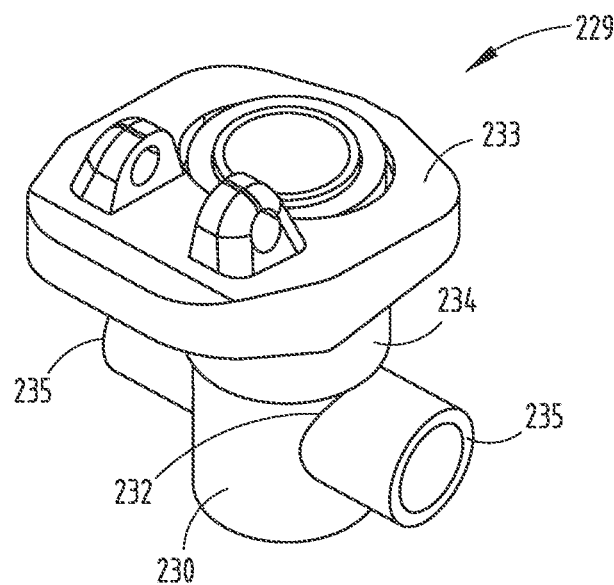
FIG. 20A is a top perspective view of the T-shaped construction of FIG. 20.
Figure 20B:
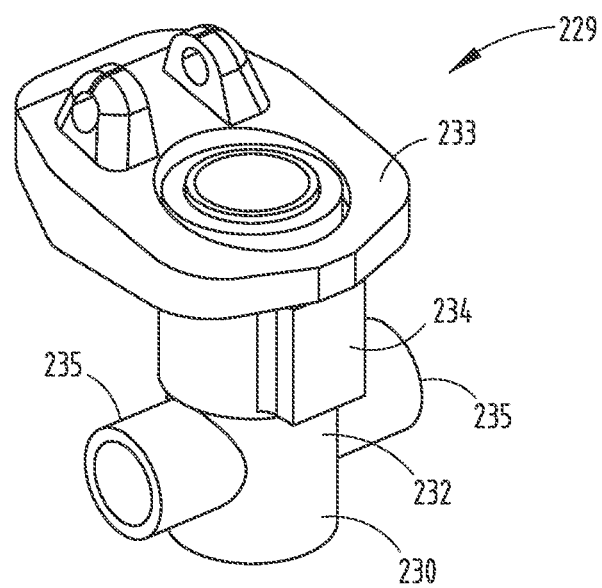
FIG. 20B is a front perspective view of the T-shaped construction of FIG. 20.
Figure 26:
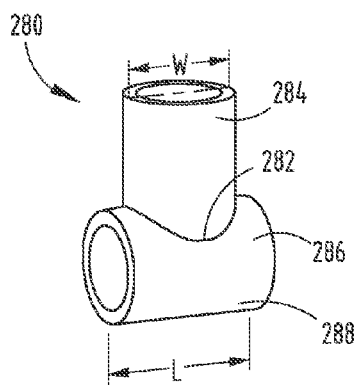
FIG. 26 is a side cross-sectional view of one embodiment of a mounting assembly having an I-shaped construction.

In the illustrated embodiment of FIGS. 20A and 20B, the extension member 232 is disposed inside the primary support 234 and press-fit such that the extension member 232 is fixedly attached with the primary support 234. It should be understood that the extension member 232 may be rotatable relative to the primary support 234, or the primary support 234 and the extension member 232 may be rigidly attached. In the latter example, the primary support 234 will be rotatably attached to a mount.

Referring now to FIG. 21, a mounting assembly 236 is illustrated, which is operably connected with and supported on a header assembly 240, which extends from a portion of a roof of a vehicle. In this way, the mounting assembly 236 is not connected with the windshield of the vehicle, but rather with the header assembly 240. The header assembly construction is disclosed in greater detail herein, which includes a description of the header assembly of FIGS. 85-87.

L-Shaped Construction

Figure 24:
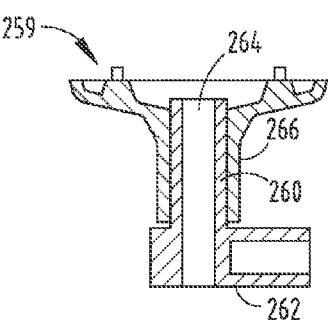
FIG. 24 is a side cross-sectional view of yet another embodiment of a mounting assembly having an L-shaped construction.
Figure 25:
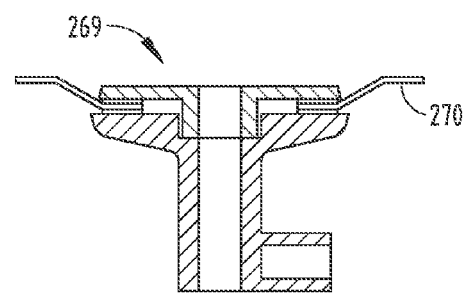
FIG. 25 is a side cross-sectional view of yet another embodiment of a mounting assembly having an L-shaped construction.

Referring now to FIGS. 22-25, in another embodiment, a secondary support 250 has an L-shaped construction that includes an engagement member 252 and a carrier in the form of an extension member 254 extending substantially orthogonally from the engagement member 252. Similar to FIGS. 19-21 discussed herein, in the illustrated embodiment of FIG. 23, a mounting assembly 256 is mounted such that the engagement member 252 forms a sleeve 257 (FIG. 23) that extends around a primary support 258 and is rotatably coupled therewith. Alternatively, as shown in the embodiment of FIG. 24, a mounting assembly 259 includes an engagement member 260 of a secondary support 262 adapted to be received inside an internal region 264 formed in a primary support 266. Specifically, the primary support 266 defines a hollow elongate tube configured to receive the engagement member 260 of the secondary support 262. The secondary support 262 is secured to the primary support 266 by any of a number of conventional manners of attachment as understood by one having ordinary skill in the art.

Referring again to FIGS. 22-25, a mounting assembly 269 is illustrated, which may be connected with a header assembly 270 (FIG. 25), such that the entire mounting assembly 269 is not connected with a windshield of a vehicle, but rather is attached to the header assembly 270, which connects with the roof of the vehicle. The mounting assembly 269 may be connected with the header assembly 270 in a variety of manners including press-fit, snap-fit, mechanical fasteners, etc., as understood by one having ordinary skill in the art. Header assembly constructions are disclosed in greater detail herein and shown in FIGS. 85-87.

I-Shaped Construction

In yet another embodiment, as shown in FIGS. 26-29, a mounting assembly 280 includes a secondary support 282 having an I-shaped construction with a carrier in the form of an extension member 288 and an engagement member 284 extending from a top side 286 of the adjacent extension member 288. In this embodiment, the width W of the engagement member 284 is approximately equal to the length L of the extension member 288. The engagement member 284 is adapted for engagement with a primary support and is secured with a mount on a vehicle windshield or a header assembly.

Figure 27:
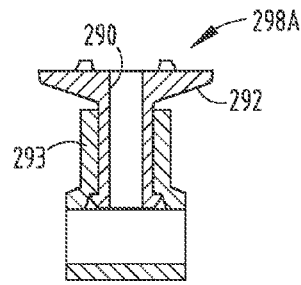
FIG. 27 is a side cross-sectional view of yet another embodiment of a mounting assembly having an I-shaped construction.
Figure 28:
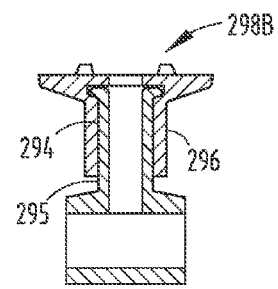
FIG. 28 is a side cross-sectional view of still another embodiment of a mounting assembly having an I-shaped construction.
Figure 29:
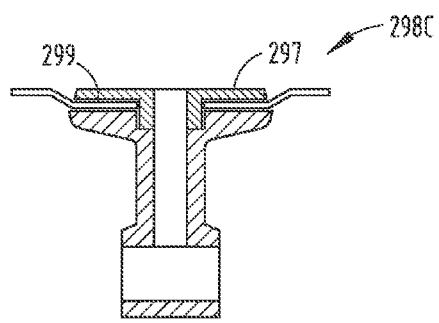
FIG. 29 is a side cross-sectional view of still another embodiment of a mounting assembly having an I-shaped construction.

As shown in FIG. 27, one embodiment of a mounting assembly 298A includes an engagement member 293 that forms a sleeve and is rotatably coupled with an outer periphery of a primary support 290 that is connected with a mount 292. Alternatively, as shown in FIG. 28, another embodiment of a mounting assembly 298B includes an engagement member 295 in the form of a post and extends inside an inner portion 294 of a primary support 296 in rotatable engagement therewith. In yet another embodiment of a mounting assembly 298C, as shown in FIG. 29, a mount 297 of the mounting assembly 298C is I-shaped and connected to a header assembly 299 rather than to a windshield of a vehicle, which is disclosed in greater detail herein and shown in FIGS. 85-87.

It will be understood that the I-shaped and L-shaped constructions discussed herein provide additional room inside the rearview device assembly 26 for positioning of additional mechanical or electrical components (e.g., an RCD display).

Closed Y-Shaped Construction

Figure 30A:
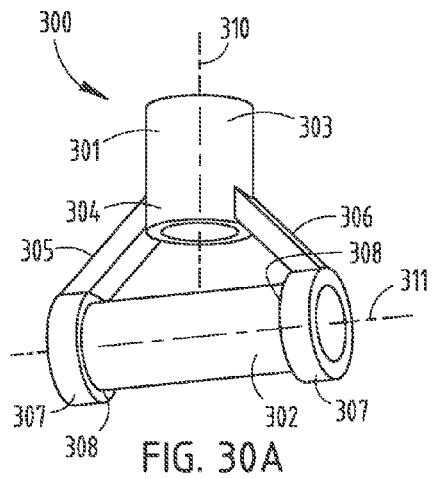
FIG. 30A is a bottom perspective view of one embodiment of a mounting assembly having a closed Y-shaped construction.
Figure 30B:
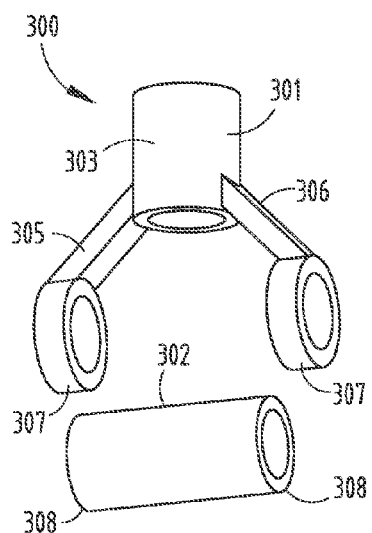
FIG. 30B is a bottom perspective exploded view of the mounting assembly of FIG. 30A.
Figure 31:
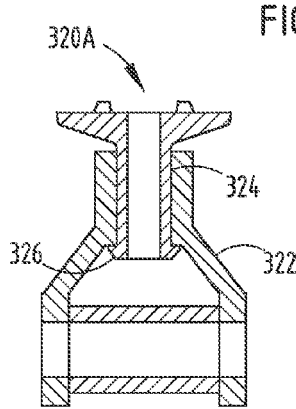
FIG. 31 is a side cross-sectional view of one embodiment of a mounting assembly having a closed Y-shaped construction.

Referring to the embodiment of FIGS. 30A-33, a mounting assembly 300 includes a secondary support 301 having an engagement member 303 that is oriented in a spaced relation from an extension member 302, thereby forming a closed Y-shaped construction. A bottom portion 304 of the engagement member 303 includes first and second angled arms 305, 306 that include receiving rings 307 designed to engage outside edges 308 of the extension member 302. It is contemplated that the first and second angled arms 305, 306 of the engagement member 303 may be angled downward to the extension member 302 and also angled forward or rearward, such that an axis of rotation 310 extending through a central portion of the engagement member 303 does not intersect an axis of rotation that extends through a central portion of the extension member 302. Alternatively, as shown in FIGS. 30A and 30B, the first and second angled arms 305, 306 may be angled downward from the engagement member 303 and horizontally aligned with the longitudinal extent of the extension member 302, such that an axis of rotation 311 that extends through the extension member 302 intersects with the axis of rotation 310 of the engagement member 303 at a substantially orthogonal angle thereto. The secondary support 301 may be connected with the rings 307 of the first and second angled arms 305, 306 in any of a variety of mechanical manners, as understood by one having ordinary skill in the art, including a press-fit connection, an adhesive connection, a snap connection, a welded connection, etc. Furthermore, the first and second angled arms 305, 306 may be solid, hollow, etc.

Figure 32:
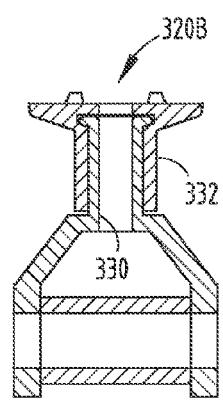
FIG. 32 is a side cross-sectional view of another embodiment of a mounting assembly having a closed Y-shaped construction.
Figure 33:
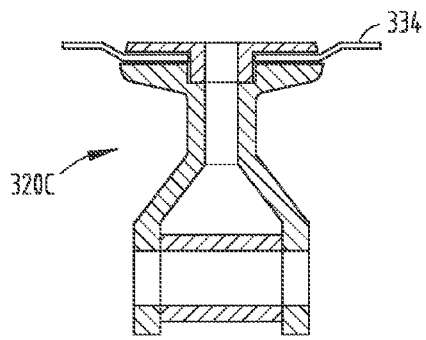
FIG. 33 is a side cross-sectional view of yet another embodiment of a mounting assembly having a closed Y-shaped construction.

Referring again to FIGS. 30A-33, another embodiment of a mounting assembly 320A of the present invention includes a closed Y-shaped construction with a secondary support 322 that includes an engagement member 324 shaped like a sleeve, which engages a primary support 326 by extending around an outer circumference of the primary support 326 in a rotatable fashion, such that the engagement member 324, and consequently the secondary support 322, are rotatable in a horizontal plane relative to the primary support 326. Alternatively, as shown in FIG. 32, a mounting assembly 320B includes an engagement member 330 may be a post that is received inside a primary support 332 in rotatable relation therewith. Additionally, as shown in the embodiment of FIG. 33, it is contemplated that the Y-shaped construction can be connected with a header assembly 334 in a fashion similar to that disclosed herein and shown in FIGS. 85-87.

Figure 34A:
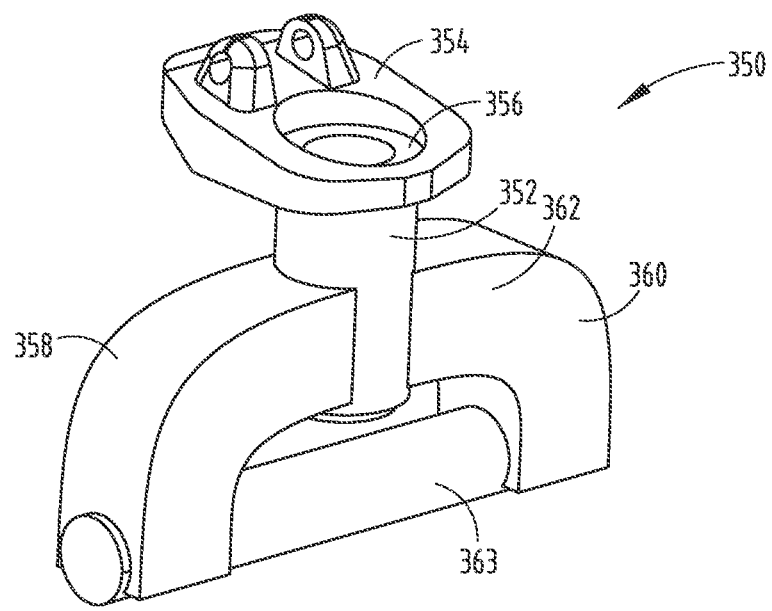
FIG. 34A is a top perspective view of a mounting assembly having a closed Y-shaped construction.
Figure 34B:
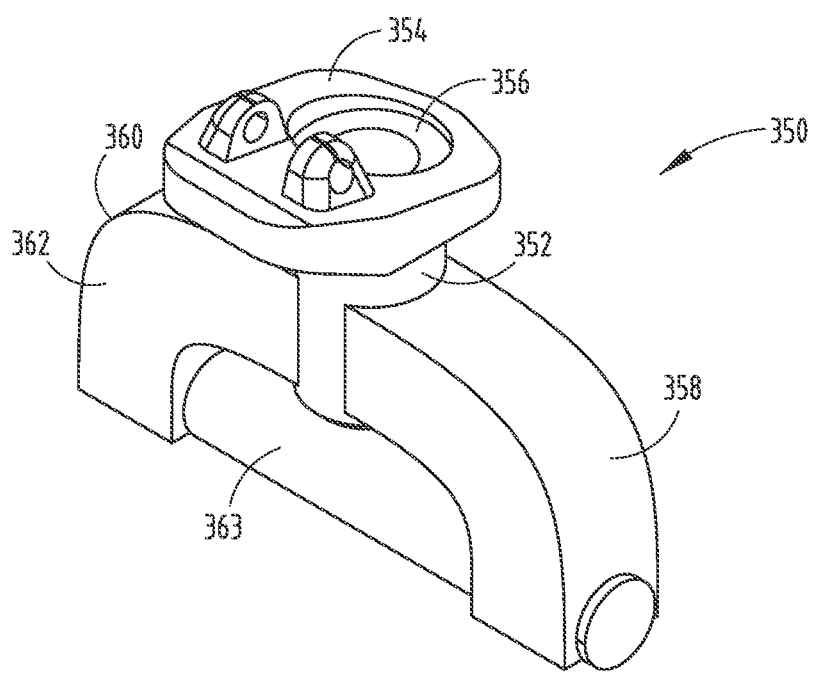
FIG. 34B is a front perspective view of the mounting assembly of FIG. 34A.
Figure 35:
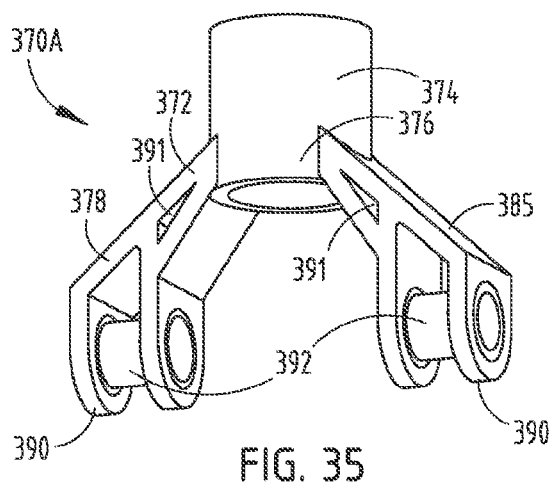
FIG. 35 is a front elevational view of one embodiment of a mounting assembly having an open Y-shaped construction.
Figure 36:
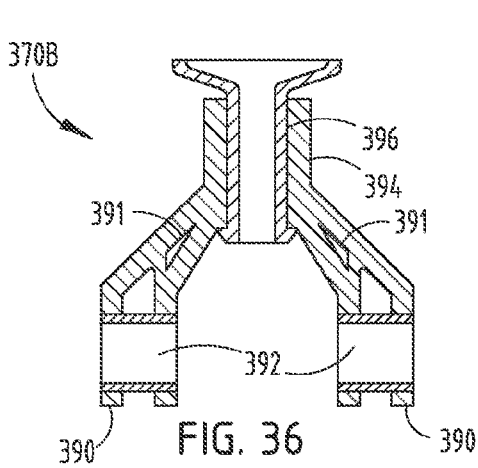
FIG. 36 is a side cross-sectional view of another embodiment of a mounting assembly having an open Y-shaped construction.
Figure 37:
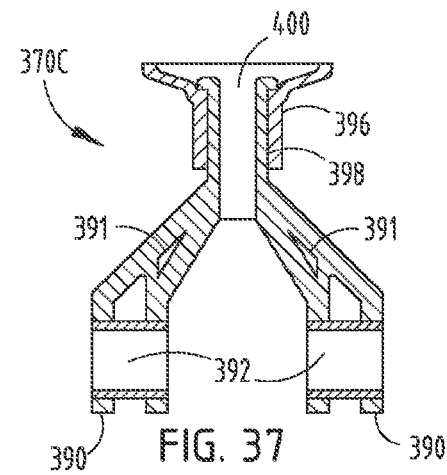
FIG. 37 is a side cross-sectional view of yet another embodiment of a mounting assembly having an open Y-shaped construction.
Figure 38:
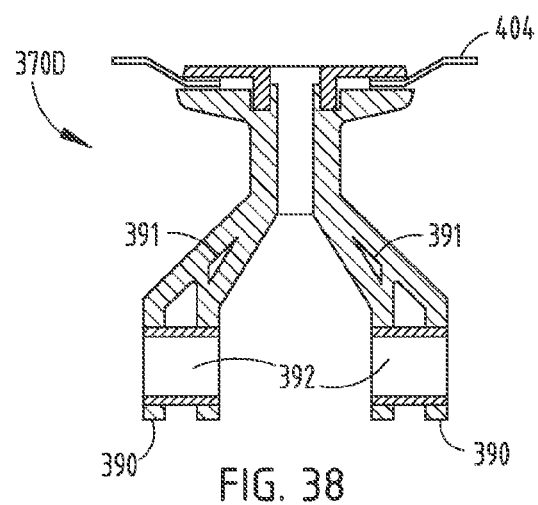
FIG. 38 is a side cross-sectional view of still another embodiment of a mounting assembly having an open Y-shaped construction.

In another embodiment, as shown in FIGS. 34A and 34B, a mounting assembly 350 having a closed Y-shaped construction includes a primary support 352 that is fixedly attached with a mount 354 at a top portion 356 of the primary support 352. A secondary support 362 includes first and second opposing arms 358, 360 that extend upward and connect with opposing sides of the primary support 352. In this embodiment, the primary support 352 rotates relative to the mount 354 and connects directly with the first and second opposing arms 358, 360, which are in turn operably connected with an extension member 363. In this embodiment, the first and second opposing arms 358, 360 include an arcuate shape rather than a linear shape, as discussed herein.

Open Y-shaped Construction

In yet another embodiment of the present invention, as shown in FIGS. 35-38, mounting assemblies 370A-370D are shown having an open Y-shaped construction including a secondary support 372 with an engagement member 374. The engagement member 374 includes a lower portion 376 with first and second downwardly extending arms 378, 380 that terminate at receiving rings 390. The first and second downwardly extending arms 378, 380 include cutouts 391 for reduced weight of the overall mounting assembly 370A. The rings 390 define holes 392 for receiving transversely extending pegs that extend from a rear portion of a rearview device housing. The mounting assembly 370B has the engagement member 374 in the form of a sleeve 394 (FIG. 36) that is adapted for engagement around at least a portion of an outer circumference of a primary support 396, while mounting assembly 370C has a post 398 (FIG. 37) adapted for insertion into a hollow portion 400 defined by the primary support 396. In addition, the mounting assembly 370D is shown mounted to a header assembly 404 that is operably connected with a vehicle, but separate from the windshield of the vehicle, as shown in FIGS. 38 and 85-87, and discussed in more detail herein.

Figure 39:
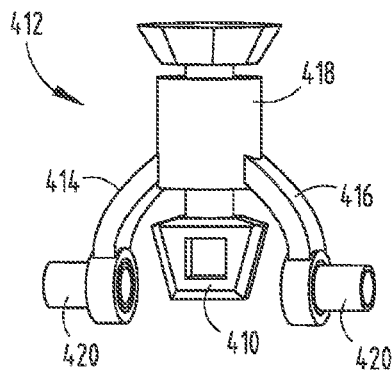
FIG. 39 is a rear elevational view of one embodiment of a mounting assembly including a light sensor device.
Figure 40:
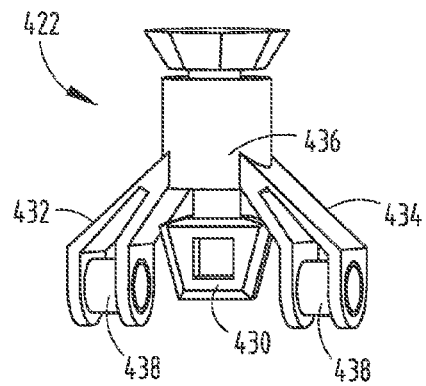
FIG. 40 is a rear elevational view of another embodiment of a mounting assembly including a light sensor device.

It is contemplated that one or more light sensor devices 410, such as a camera system, illustrated in FIG. 39, may be operably coupled with a mounting assembly 412. For example, as shown in FIG. 39, the light sensor device 410 is disposed between first and second arms 414, 416 of a secondary support 418 having an open Y-shaped construction. In the illustrated embodiment, each of the first and second arms 414, 416 includes pin members 420 adapted to engage apertures defined in a rear portion or a top portion of a housing of a rearview device assembly. Alternatively, as shown in a mounting assembly 422 illustrated in FIG. 40, a light sensor device 430 may be disposed between first and second arms 432, 434 of a secondary support 436, wherein the first and second arms 432, 434 include rings 438 at distal ends thereof to receive pin members that extend from a top wall or a rear wall of a housing of a rearview device assembly.

Half Y-Shaped Construction

Figure 41:
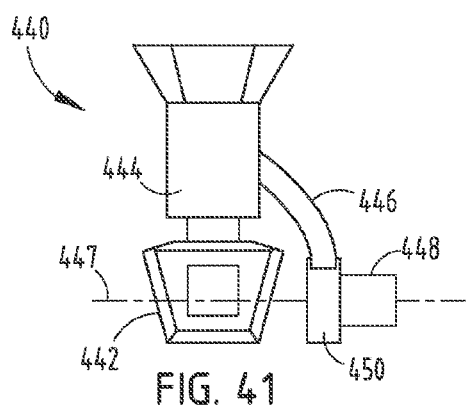
FIG. 41 is a rear elevational view of another embodiment of a mounting assembly including a light sensor device.
Figure 42:
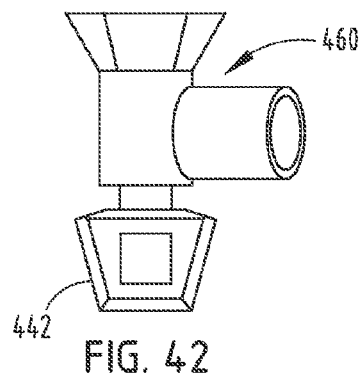
FIG. 42 is a rear elevational view of yet another embodiment of a mounting assembly including a light sensor device.
Figure 43:
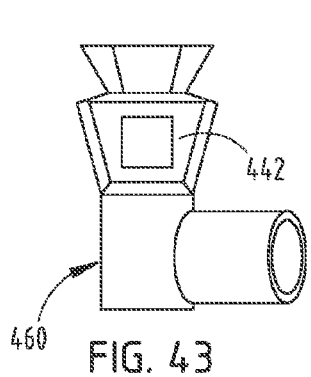
FIG. 43 is a rear elevational view of the mounting assembly of FIG. 42, with the light sensor device disposed above the mounting assembly.
Figure 44:
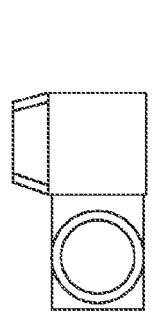
FIG. 44 is a top perspective view of the mounting assembly of FIG. 43.
Figure 45:
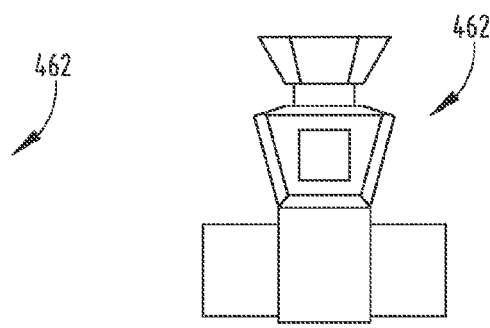
FIG. 45 is a rear elevational view of another embodiment of a mounting assembly that includes a light sensor device.

In yet another alternative embodiment of a mounting assembly 440, with a half Y-shaped construction, as shown in FIG. 41, a light sensor device 442 may be operably coupled below a secondary support 444. The secondary support 444 includes only one arm 446 with a pivot pin disposed at a distal end 450 of the arm 446 or with a pivot aperture 448 defined by the distal end 450 of the arm 446. It is contemplated that the mounting assembly 440 may pivot about an axis 447 disposed above, below, or through the light sensor device 442. Alternatively, as shown in the embodiment of FIG. 42, the light sensor device 442 may be disposed below a mounting assembly 460 having an L-shaped construction. As illustrated in FIG. 43, it is also contemplated that the light sensor device 442 may be disposed above the mounting assembly 460. Further, it is contemplated that the same light sensor device 442 may be utilized in a T-shaped mounting assembly 462, as shown in FIGS. 44 and 45, or any other mounting assembly discussed herein.

Torque Setting Systems

Referring now to FIGS. 46A-46J, various torque setting systems may be implemented with the various embodiments of a rearview device mounting assembly that are discussed herein. The torque setting systems allow the manufacturer or end user to adjust the amount of torque needed to adjust a rearview device horizontally as well as vertically.

Figure 46A:
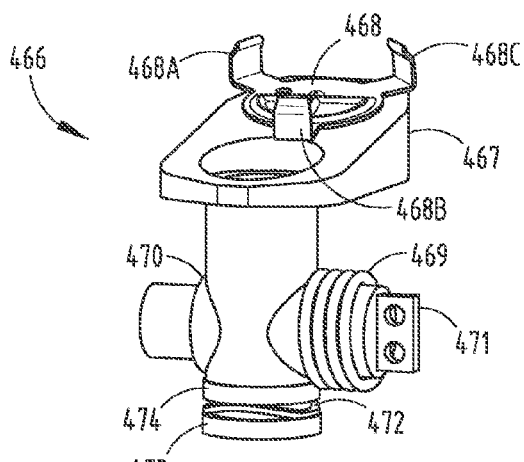
FIG. 46A is a top perspective view of one embodiment of a torque adjustment device disposed on a mounting assembly of the present invention.
Figure 46B:
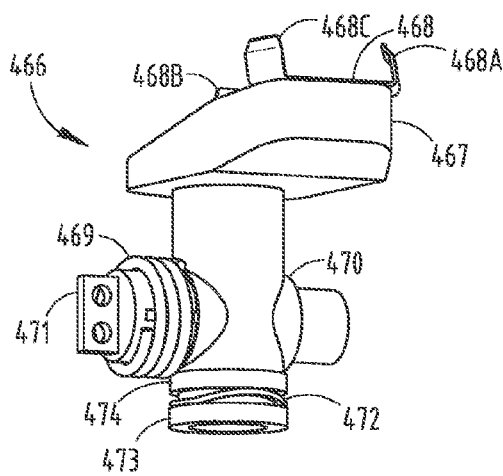
FIG. 46B is a side perspective view of the torque adjustment device of FIG. 46A.

Referring specifically to the embodiment illustrated in FIGS. 46A and 46B, a mounting assembly 466 includes a mount 467 with a three-legged interface 468 having legs 468A, 468B, and 468C adapted for connection with a support base on a vehicle windshield. The legs 468A, 468B, and 468C are spring-biased to snap into connection with the support base and maintain a secure connection. A torsion spring 469 is positioned over a secondary support 470 of the mounting assembly 466. The torsion spring 469 applies pressure, or cinches down on, a coupler 471 positioned over the secondary support 470. The coupler 471 is connected with a rearview device assembly. Thus, when the coupler 471 is rotated, the rearview device assembly rotates. Different torsion springs 469 having different tension/compression characteristics can be positioned over the coupler 471 to change the desired torque of the coupler 471 relative to the secondary support 470, which, in turn, effects the effort by a user to rotate a rearview device assembly downward or upward.

Referring again to the embodiment of FIGS. 46A and 46B, a wave washer 472 is positioned at a lower portion of the mounting assembly 466. The wave washer 472 applies pressure against a primary support 473 that extends downward from the mount 467, and also applies pressure against an engagement member 474 of the secondary support 470. The engagement member 474 is a sleeve that fits around the primary support 473. The amount of pressure applied is directly associated with the torque needed to rotate the mounting assembly 466 horizontally. Different wave washers 472 having different tension/compression characteristics can be positioned between the primary support 473 and the secondary support 470 to change the desired torque necessary to rotate the secondary support 470 relative to the primary support 473, which, in turn, effects the effort by a user to laterally rotate a rearview device assembly that is connected with the mounting assembly 466.

Figure 46C:
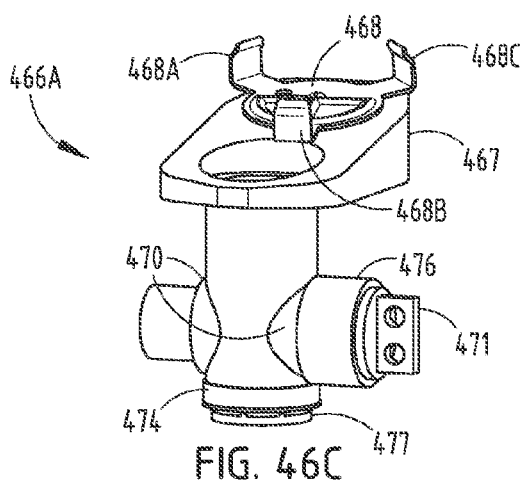
FIG. 46C is a top perspective view of another embodiment of a torque adjustment device disposed on a mounting assembly of the present invention.
Figure 46D:
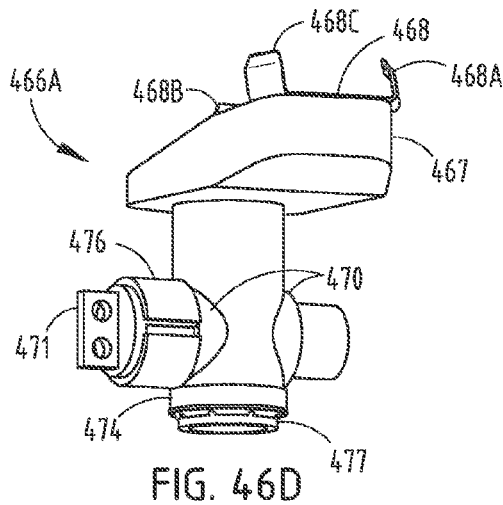
FIG. 46D is a side perspective view of the torque adjustment device of FIG. 46C.

The embodiment of a mounting assembly 466A, as illustrated in FIGS. 46C and 46D, is similar to that of FIGS. 46A and 46B, but includes a torsion ring 476 that fits over the coupler 471 instead of the torsion spring 469. The torsion ring 476 applies pressure over the coupler 471 disposed on the secondary support 470. The coupler 471 is connected with a rearview device assembly. Thus, when the coupler 471 is rotated, the rearview device assembly rotates. Different torsion rings 476 having different tension/compression characteristics can be positioned over the coupler 471 to change the desired torque of the coupler 471 relative to the secondary support 470, which, in turn, effects the effort by a user to rotate a rearview device assembly downward or upward.

Referring again to the embodiment of FIGS. 46C and 46D, a spring-biased retainer ring 477 is positioned at a lower portion of the mounting assembly 466A. The spring-biased retainer ring 477 applies pressure against the primary support 473 and against the engagement member 474 (which, in this embodiment is in the form of a sleeve) of the secondary support 470. The amount of pressure applied is directly associated with the torque needed to rotate the mounting assembly 466A horizontally. Different spring-biased retainer rings 477 that have different tension/compression characteristics or that are made with high friction or low friction materials can be positioned against the primary support 473 and the secondary support 470 to change the desired torque necessary to rotate the secondary support 470 relative to the primary support 473, which, in turn, effects the effort by a user to laterally rotate a rearview device assembly that is connected with the mounting assembly 466A. It is contemplated that many different grades of high friction or low friction materials, such as polyoxymethylene (e.g., acetal, DuPont™ Delrin® 500), nylon, polyphenylene oxide-poly styrene (PPO), SABIC Noryl®, polypropylene, polyetheretherketone, polyamide-imide, polyetherimide (SABIC Ultem®), or other engineered resins and materials (i.e., clutch plate material), can be used with varying mechanical and processing parameters in any of the embodiments discussed herein. However, further grades have improved wear resistance. Notably, the co-efficient of friction can be decreased with the addition of lubricants and/or Teflon® PTFE. Additionally, friction hinges or torque inserts commercially available from companies, such as Reell Precision Manufacturing Corporation, Hanaya, and others, may be incorporated into the construction to provide rotational torque control on one or both of the first axis of rotation and the second axis of rotation.

Figure 46E:
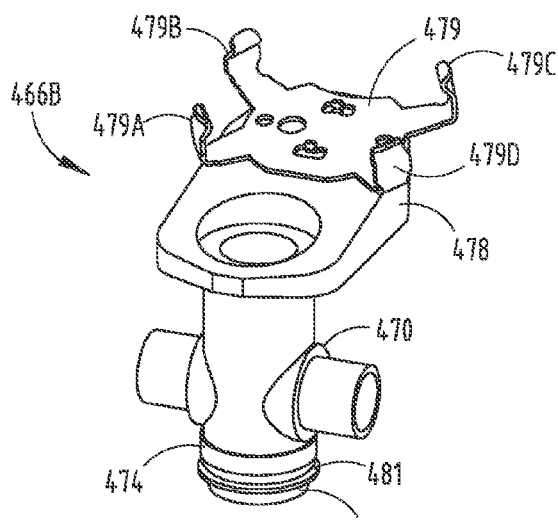
FIG. 46E is a top perspective view of yet another embodiment of a torque adjustment device disposed on a mounting assembly of the present invention.
Figure 46F:
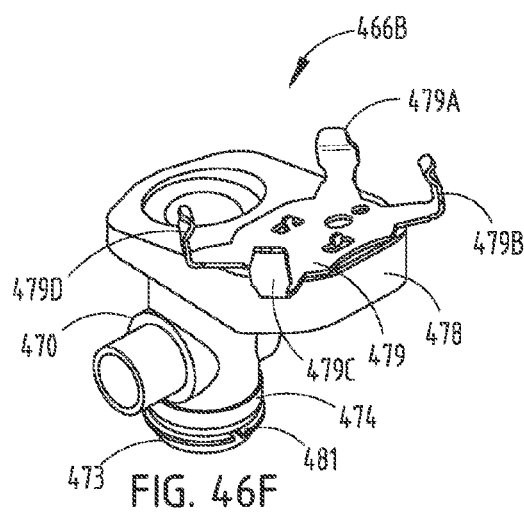
FIG. 46F is a side perspective view of the torque adjustment device of FIG. 46E.

Referring now to the illustrated embodiment of FIGS. 46E and 46F, a mounting assembly 466B includes a mount 478 with a four-legged interface 479 having legs 479A, 479B, 479C and 479D adapted for connection with a support base on a vehicle windshield. The legs 479A, 479B, 479C, and 479D are spring-biased to snap into connection with the support base and maintain a secure connection. The mounting assembly 466B also includes an O-ring 481 positioned between the primary support 473 and the engagement member 474 of the secondary support 470. The engagement member 474 is a sleeve that fits around the primary support 473. The O-ring 481 is made of a material that applies frictional resistance against the primary support 473 and the engagement member 474 as the primary support 473 and the engagement member 474 rotate relative to one another. The more frictional resistance the O-ring 481 applies, the higher the torque needed to rotate the mounting assembly 466B horizontally. Different O-rings 481 having different frictional resistance properties can be positioned between the primary support 473 and the secondary support 470 to change the desired torque necessary to rotate the secondary support 470 relative to the primary support 473, which, in turn, effects the effort by a user to laterally rotate a rearview device assembly that is connected with the mounting assembly 466B. It is also contemplated that no O-ring 481 may be present, and that the desired torque between the primary support 473 and the secondary support 470 is developed by providing a tight fit between the primary support 473 and the secondary support 470, wherein one or both of the primary support 473 and the secondary support 470 include a textured surface with a heightened coefficient of friction. Alternatively, an interference fit arrangement may be disposed between the primary support 473 and the secondary support 470. Specifically, spaced smooth or abrupt engagement surfaces may be disposed on one or both of the primary support 473 and the secondary support 470 that provide for incremental torque changes as the secondary support 470 rotates relative to the primary support 473.

Figure 46G:
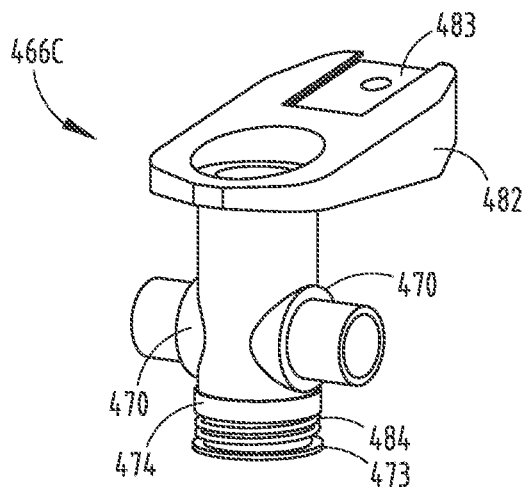
FIG. 46G is a top perspective view of still another embodiment of a torque adjustment device disposed on a mounting assembly of the present invention.
Figure 46H:
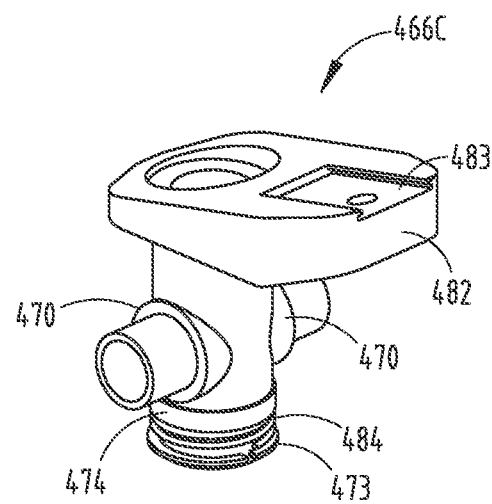
FIG. 46H is a side perspective view of the torque adjustment device of FIG. 46G.

As shown in the embodiment of FIGS. 46G and 46H, a mounting assembly 466C includes a mount 482 having an engagement recess 483 adapted for connection with a support base on a vehicle windshield. The mounting assembly 466C also includes a compression spring 484 positioned at a lower portion of the mounting assembly 466C. The compression spring 484 applies pressure against the primary support 473 that extends downward from the mount 482, and also applies pressure against the engagement member 474 of the secondary support 470. The engagement member 474 is a sleeve that wraps around the primary support 473. The amount of pressure applied by the compression spring 484 is directly associated with the torque needed to rotate the mounting assembly 466C horizontally. Different compression springs 484 having different tension/compression characteristics can be positioned between the primary support 473 and the secondary support 470 to change the desired torque necessary to rotate the secondary support 470 relative to the primary support 473, which, in turn, effects the effort by a user to laterally rotate a rearview device assembly that is connected with the mounting assembly 466C.

Figure 46I:
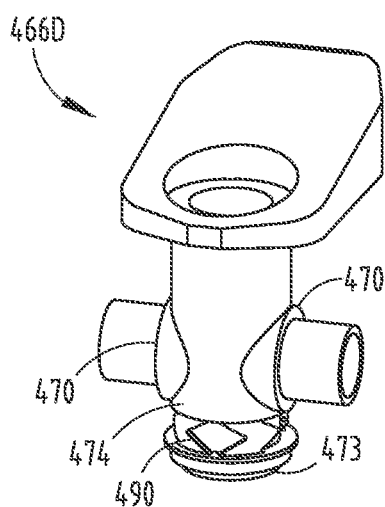
FIG. 46I is a top perspective view of yet another embodiment of a torque adjustment device disposed on a mounting assembly of the present invention.
Figure 46J:
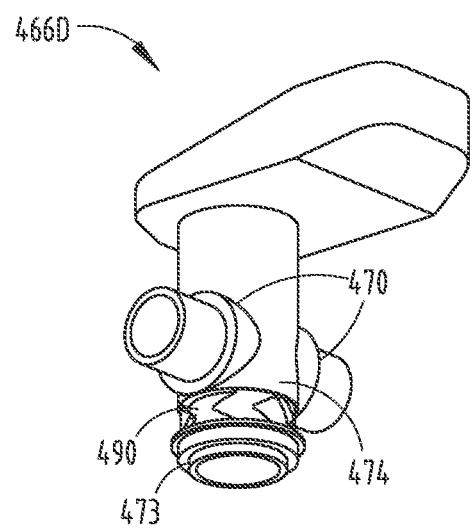
FIG. 46J is a bottom perspective view of the torque adjustment device of FIG. 46I.

Referring now to the embodiment of FIGS. 46I and 46J, a mounting assembly 466D includes a molded spring system 490 disposed at a lower portion of the mounting assembly 466D. The molded spring system 490 is formed as part of the secondary support 470 and applies pressure against the primary support 473 that is positioned inside the engagement member 474 of the secondary support 470. The engagement member 474, as well as the molded spring system 490, form a sleeve that wraps around the primary support 473. The amount of pressure applied by the molded spring system 490 is directly associated with the torque needed to rotate the mounting assembly 466D horizontally. The size and shape of the molded spring system 490 that is formed in the engagement member 474 can be modified to change the desired torque necessary to rotate the secondary support 470 relative to the primary support 473, which, in turn, effects the effort by a user to laterally rotate a rearview device assembly that is connected with the mounting assembly 466D. In addition, the engagement member 474 of the secondary support 470, as well as the molded spring system 490, can be made of different materials that have different coefficients of friction. The molded spring system 490 may also be installed on the secondary support 470.

Mount-to-Device Interface

Referring now to FIGS. 46-52, a secondary support may attach to a housing of a rearview device assembly in a variety of ways. Specifically, the secondary support may engage the rearview device housing through a front portion of the rearview device housing, constituting a front load installation. Alternatively, a mounting assembly may be connected at a rear portion of the rearview device housing, constituting a rear load installation. In a rear load installation, the secondary support is frequently connected to a rear portion of the rearview device housing, as shown in FIGS. 48 and 49. The mounting assemblies discussed herein are also designed for use with mirror housings for prism-type rearview device assemblies, as well as more advanced electrochromic (EC) mirror assemblies, and other rearview devices.

Front Load Installation

Referring now to the embodiment of FIG. 47A, a secondary support 500 may engage a housing 502 of a rearview device assembly 504 by first being inserted through a front portion 506 of the housing 502 and into a recess 508. A coupler in the form of a bearing cap 510 is then placed over the secondary support 500 and snugly secured to a rear wall 511 of the housing 502 with mechanical fasteners. As a result, an inside surface of the bearing cap 510 and the secondary support 500 are rotatably coupled, such that the rearview device assembly 504 may rotate about a substantially horizontal axis between raised and lowered positions.

In another embodiment, as shown in FIG. 47B, a housing 516 of a rearview device assembly 518 defines fastener apertures 520 adapted to receive mechanical fasteners 522. Couplers, such as inner and outer bearing caps 524, 526, are secured around a secondary support 528 and positioned adjacent to the housing 516. The mechanical fasteners 522 are then extended through the inner and outer bearing caps 524, 526 and into the housing 516 of the rearview device assembly 518. The mechanical fasteners 522 can be tightened or loosened to change the torque and frictional resistance between the bearing caps 524, 526 and the secondary support 528.

Figure 47C:
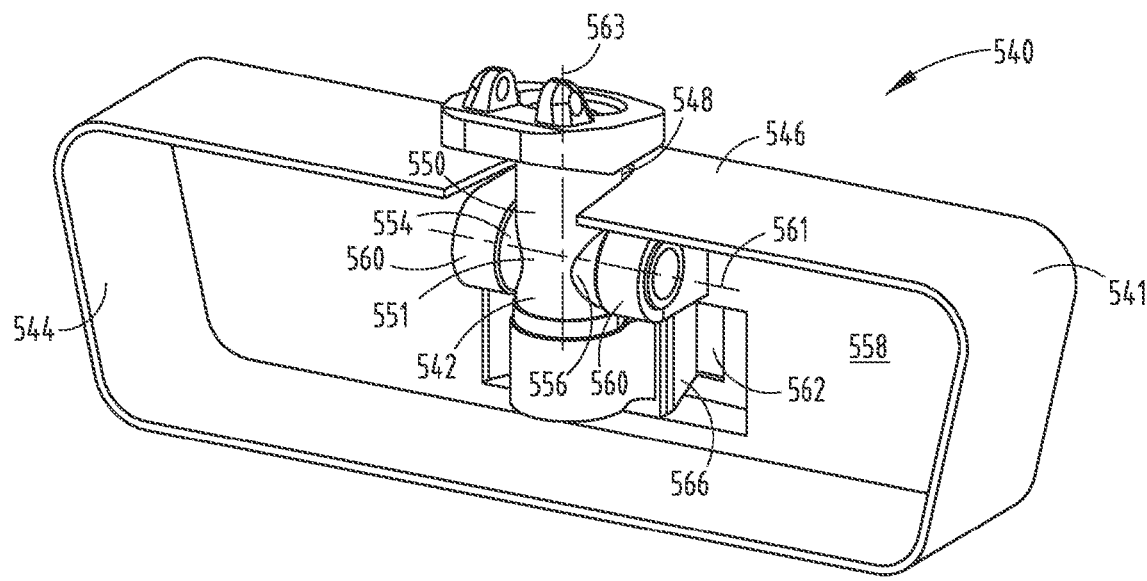
FIG. 47C is a front perspective view of another embodiment of a mounting assembly that includes a front load installation.
Figure 47D:
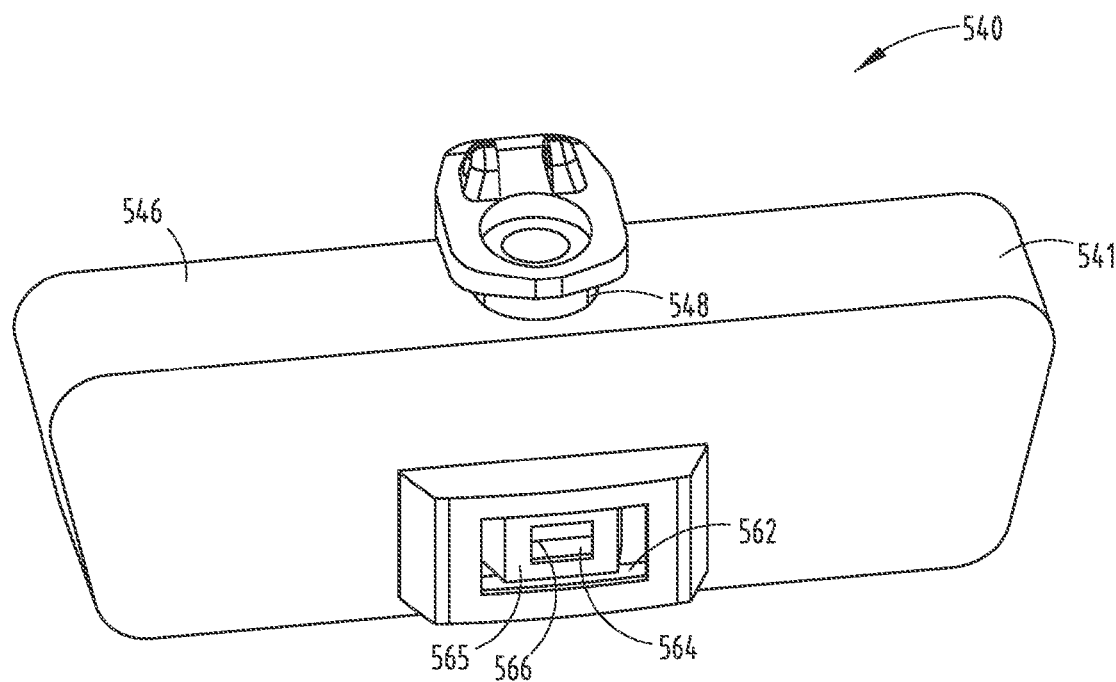
FIG. 47D is a top perspective view of the mounting assembly of FIG. 47C.

Referring now to the embodiment shown in FIGS. 47C and 47D, one example of a mounting assembly 540 used in a rearview device assembly 541 and having a front load installation is illustrated, which includes a secondary support 542 having a T-construction. As illustrated, a housing 544 includes a top portion 546 with a slot 548 adapted to receive a primary support 550 and possibly an engagement member 551, which extends upwardly from the secondary support 542 and engages the primary support 550. A carrier in the form of first and second extension members 554, 556 extends on opposite sides of the engagement member 551 and is connected to a rear wall 558 of the housing 544 by couplers in the form of bearing caps 560. Accordingly, the housing 544, and consequently the rearview device assembly 541, is rotatable about a horizontal axis 561 that extends through the first and second extension members 554, 556, and also rotatable about a vertical axis 563 that extends through the primary support 550. Thus, a full range of rearview assembly device positions is available to the user when adjusting the rearview device assembly 541 inside a vehicle. The rear wall 558 of the housing 544 includes a window 562 that is larger than a window 564 of a light sensor device housing 565 disposed below the primary support 550 inside the rearview device housing 544. A light sensor device 566 is positioned inside the light sensor device housing 565. The enlarged window 562 is designed to accommodate adjustment of the rearview device assembly 541 horizontally. However, the rear wall 558 of the housing 544 does not overlap the window 562 of the light sensor device housing 565 at any angle of adjustment. It will be understood that the rearview device assembly 541 also includes other various electrical components inside the housing 544 of the rearview device assembly 541, as well as an electrochromic device assembly, which would extend generally over a forward opening of the housing 544 of the rearview device assembly 541.

Rear Load Installation

Referring now to FIG. 48, one example of a mounting assembly 580 used in a rear load installation includes a recess 582 in a rear wall 584 of a housing 586 of a rearview device assembly 588. A secondary support 590 is positioned in the recess 582 and a coupler, such as a bearing cap 592, is placed over the secondary support 590, such that the secondary support 590 is disposed between the recess 582 and the bearing cap 592. Mechanical fasteners 594 are then used to secure the bearing cap 592 to the rear wall 584 of the housing 586. The mechanical fasteners 594 can be tightened or loosened to change the torque and frictional resistance of the bearing cap 592 and the rear wall 584 of the housing 586 against the secondary support 590.

Figure 48A:
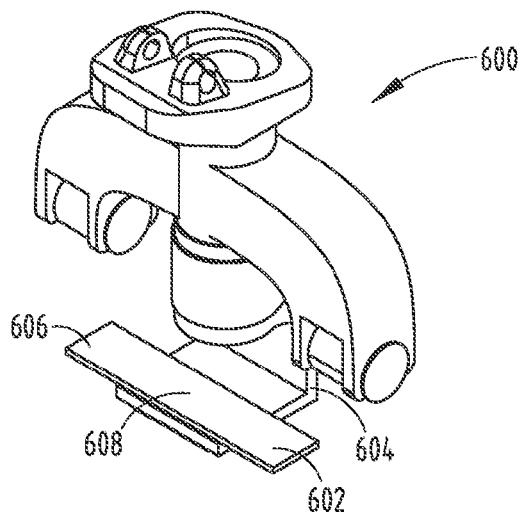
FIG. 48A is a front top perspective view of one embodiment of a mounting assembly including an accessory support.
Figure 48B:
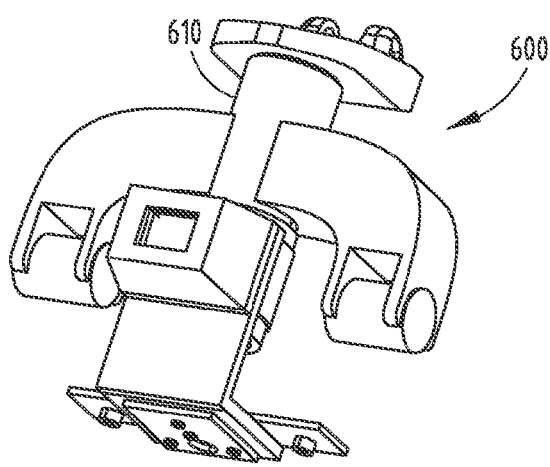
FIG. 48B is a bottom rear perspective view of the mounting assembly of FIG. 48A.

Referring now to FIGS. 48A and 48B, an illustrated mounting assembly 600 includes an open Y-shaped construction designed to support a rearview device assembly. The open Y-shaped construction illustrated is similar to that discussed herein with reference to FIGS. 35-38, but includes first and second opposing arms that are arcuate, such as those discussed herein with respect to FIGS. 34A-34C. In addition, the illustrated mounting assembly 600 can be used in a rear load installation, and includes a lower accessory support 602 adapted to support an electronics package, such as a map light, a puddle light, other electronic circuitry where it is desirable to be locked on a bottom portion of the rearview device assembly, etc. The lower accessory support 602 has a vertical connector 604 and a horizontal platform 606 to which electronics may be connected. An elongate base 608 may be positioned on the horizontal platform 606. The mounting assembly 600 illustrated in FIGS. 48A and 48B includes a secondary support 610 that connects with a rear wall of a housing of a rearview device assembly. The secondary support 610 may be attached in any of the manners discussed herein.

Figure 48C:
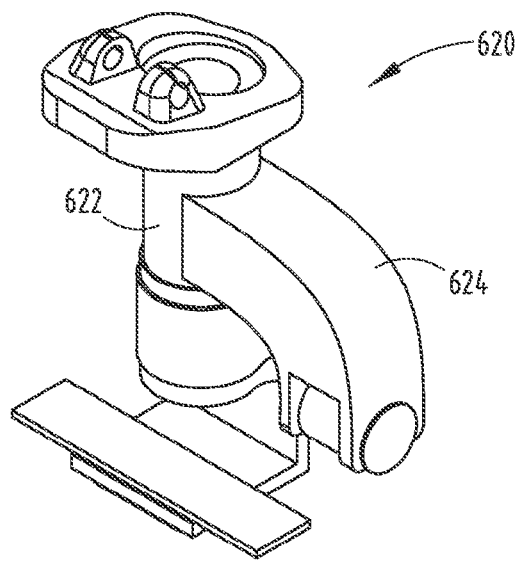
FIG. 48C is a front top perspective view of another embodiment of a mounting assembly including an accessory support.
Figure 48D:
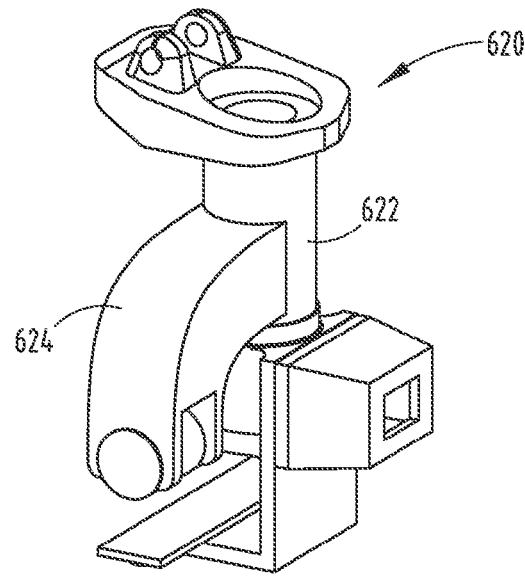
FIG. 48D is a front rear perspective view of the mounting assembly of FIG. 48C.

Referring now to FIGS. 48C and 48D, a mounting assembly 620 with a half Y-shaped construction is illustrated that includes the same physical features as the open Y-shaped construction depicted in FIGS. 48A and 48B, but includes a secondary support 622 having only one arcuate arm 624 extending downwardly. The mounting assembly 620 is designed for a rear load installation. The single arcuate arm 624 is designed to attach to a rear wall of a housing of a rearview device assembly in any of those manners described herein.

Figure 48E:
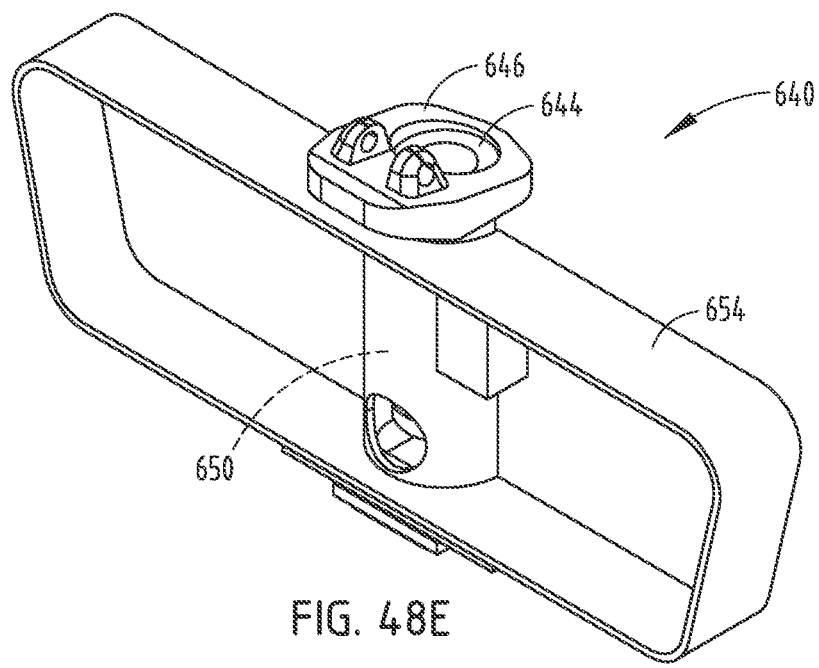
FIG. 48E is a top perspective view of another embodiment of a mounting assembly for use with a rear load installation.
Figure 48F:
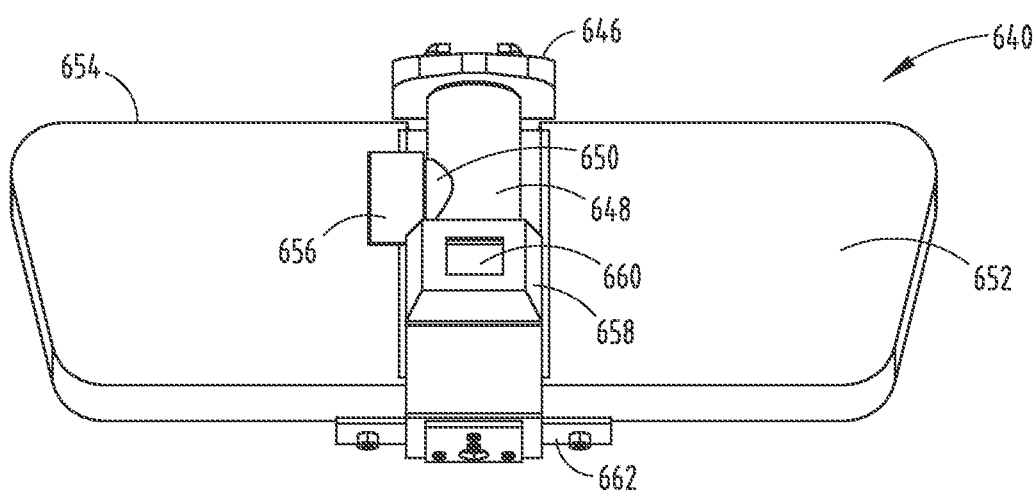
FIG. 48F is a rear bottom perspective view of the mounting assembly of FIG. 48E.

Referring now to FIGS. 48E and 48F, a mounting assembly 640 having an L-shaped construction is illustrated that is operably coupled with a rearview device assembly and designed for rear load installation. A primary support 644 extends downwardly from a mount 646 and is rotatably coupled with a secondary support 648. The secondary support 648 includes a carrier in the form of an extension member 650 that may be operably coupled with a rear wall 652 of a housing 654 by a coupler, such as a bearing cap 656. A light sensor device housing 658 with a light sensor device 660 is disposed below the primary support 644 and extension member 650. An accessory support 662 is operably connected with the secondary support 648 and extends below the light sensor device housing 658. The accessory support 662 is designed to hold one of a variety of electronics packages as understood by one having ordinary skill in the art.

Figure 48G:
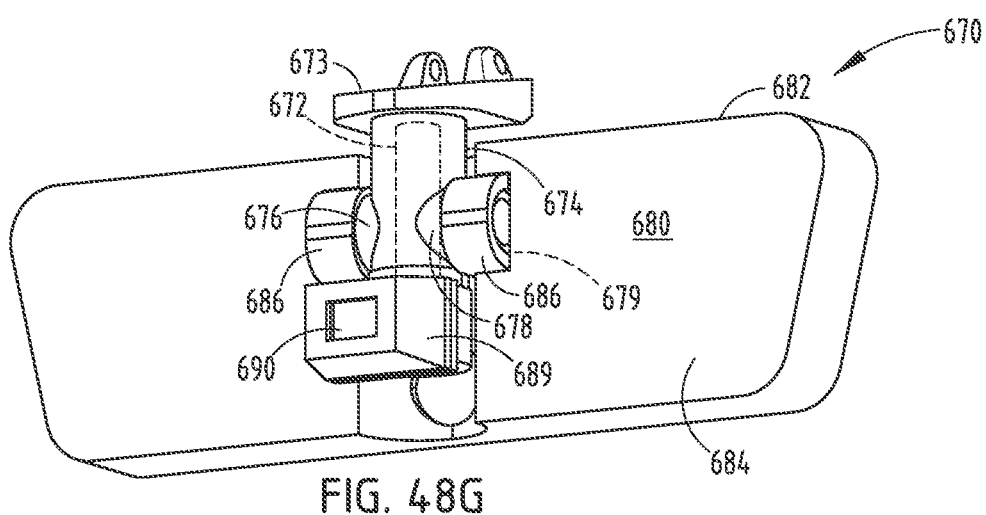
FIG. 48G is a rear perspective view of another embodiment of a mounting assembly for use in a rear load installation.

Referring now to FIG. 48G, the illustrated embodiment includes a mounting assembly 670 with a T-shaped construction. In this embodiment, a primary support 672 is connected to a mount 673, which in turn is connected to a windshield or header assembly in a vehicle. The primary support 672 is rotatably coupled with a secondary support 674. A carrier in the form of first and second extensions 676, 678 of the secondary support 674 are disposed in recesses 679 in a rear wall 680 of a housing 682 of a rearview device assembly 684 and kept in place by a coupler, such as bearing caps 686, that are fastened to the rear wall 680 of the housing 682. A light sensor device housing 689 having a light sensor device 690 disposed therein is positioned below the secondary support 674 and maintains a static or fixed position relative to the primary support 672. It is also contemplated that an accessory support may be disposed below the light sensor device housing 689.

In another embodiment, as shown in FIG. 49, couplers, such as inner and outer bearing caps 700, 702, may be positioned around a secondary support 704. The inner and outer bearing caps 700, 702, as well as the secondary support 704, are then positioned in a recess 706 in a rear wall 708 of a housing 710 of a rearview device assembly 711. Mechanical fasteners 712 are then secured through the inner and outer bearing caps 700, 702 and also into the rear wall 708 of the housing 710 of the rearview device assembly 711. The mechanical fasteners 712 may be tightened or loosened to change the torque and frictional resistance of the inner and outer bearing caps 700, 702 on the secondary support 704, thereby changing the effort needed to move the rearview device assembly 711 into proper position during use.

It is contemplated that these constructions may also be used in a chrome ring style rearview device assembly 719 (FIG. 50), such as those disclosed in U.S. Pat. Nos. 8,004,741; 7,978,393; 7,719,750; 7,612,929; 7,602,542; 7,570,413; 7,511,872; 7,477,439; 7,379,225; 7,372,611; 7,349,143; and 7,064,882; and U.S. Patent Application Publication Nos. 2010/0321758 and 2010/0246017, utilizing either a front load installation (FIG. 51) or a rear load installation (FIG. 52). As shown in the embodiment of the rearview device assembly 719 shown in FIG. 50, a rear wall 720 of a housing 722 of a rearview device assembly 723 includes a recess 724 adapted to receive a coupler, such as an outer bearing cap 726, and a secondary support 728. The recess 724 is defined by a portion of the rear wall 720 of the housing 722 and also by a carrier 730 that supports an electrochromic (EC) device assembly 732. Mechanical fasteners 734 are then used to secure the outer bearing cap 726 to a rear portion 736 of the carrier 730, thereby securing the secondary support 728 therebetween. The mechanical fasteners 734 may be tightened or loosened to change the torque and frictional resistance of the outer bearing cap 726 on the secondary support 728, thereby changing the effort needed to move the rearview device assembly 723 into proper position during use.

As shown in the embodiment of FIG. 51, in a front load installation for a rearview device assembly 750 having a chrome ring design, a bearing cap 752 is secured by mechanical fasteners 754 to a rear portion 756 of a chrome ring carrier 758, with a secondary support 760 disposed therebetween. A housing 762 is then positioned over the secondary support 760 and the bearing cap 752 on the rear portion 756 of the carrier 758. Alternatively, as shown in the embodiment of FIG. 52, a mounting assembly 769 having a rear load installation may also be utilized in which a recess 770 is formed in a rear wall 772 of a housing 774 of a rearview device assembly 776 having a chrome ring design. A secondary support 778 is then positioned in the recess 770 and a bearing cap 779 is positioned over the secondary support 778 and mechanically fastened with the rear wall 772 of the housing 774. The chrome ring rearview device assembly 776, including an EC mirror 780 and a carrier 782, are then positioned over a front portion 784 of the housing 774.

Figure 50A:
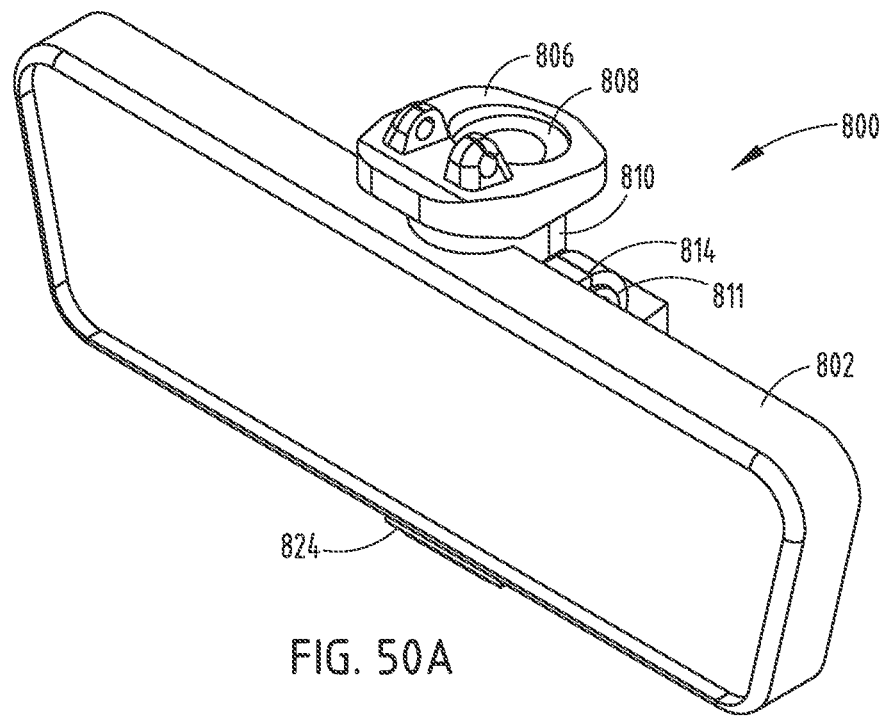
FIG. 50A is a top front perspective view of one embodiment of a mounting assembly configured for use with a chrome ring rearview device assembly.
Figure 50B:
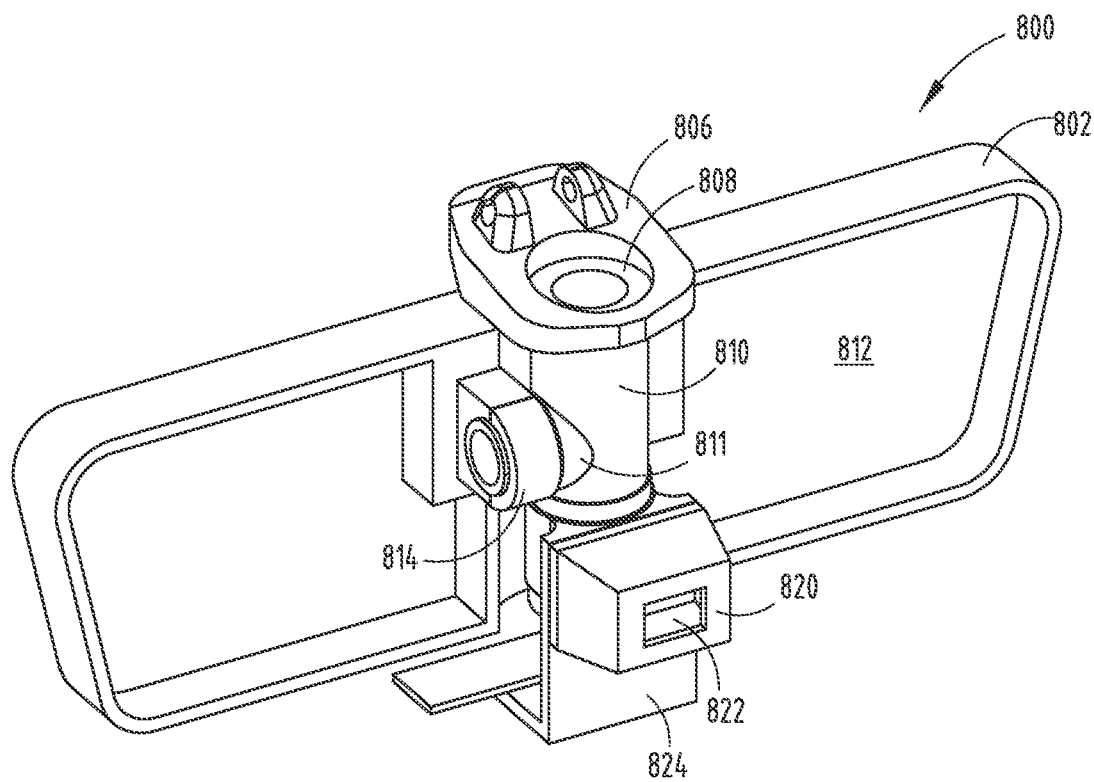
FIG. 50B is a rear top perspective view of the mounting assembly of FIG. 50A.
Figure 50C:
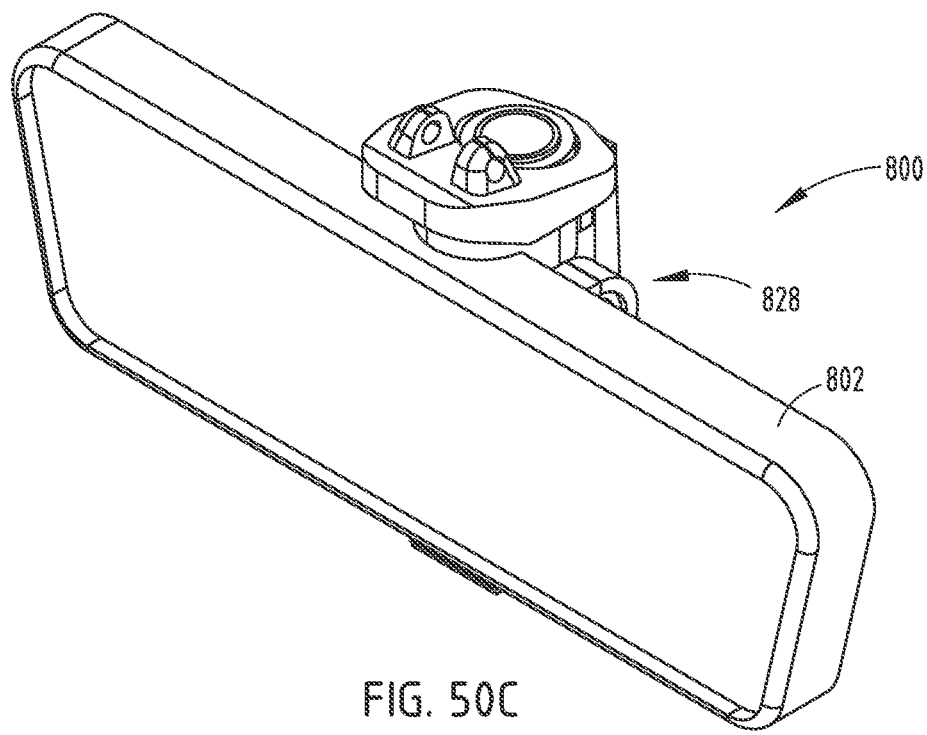
FIG. 50C is a front top perspective view of another embodiment of a mounting assembly configured for use with a chrome ring rearview device assembly.
Figure 50D:
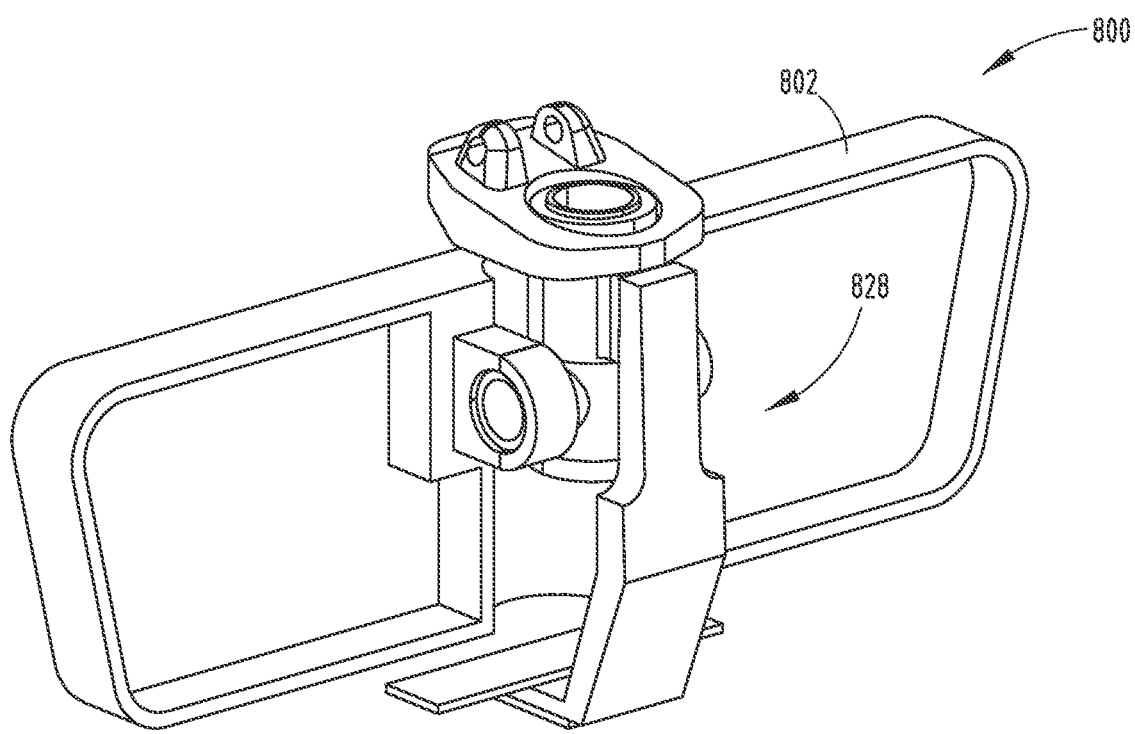
FIG. 50D is a rear top perspective view of the mounting assembly of FIG. 50C.
Figure 50E:
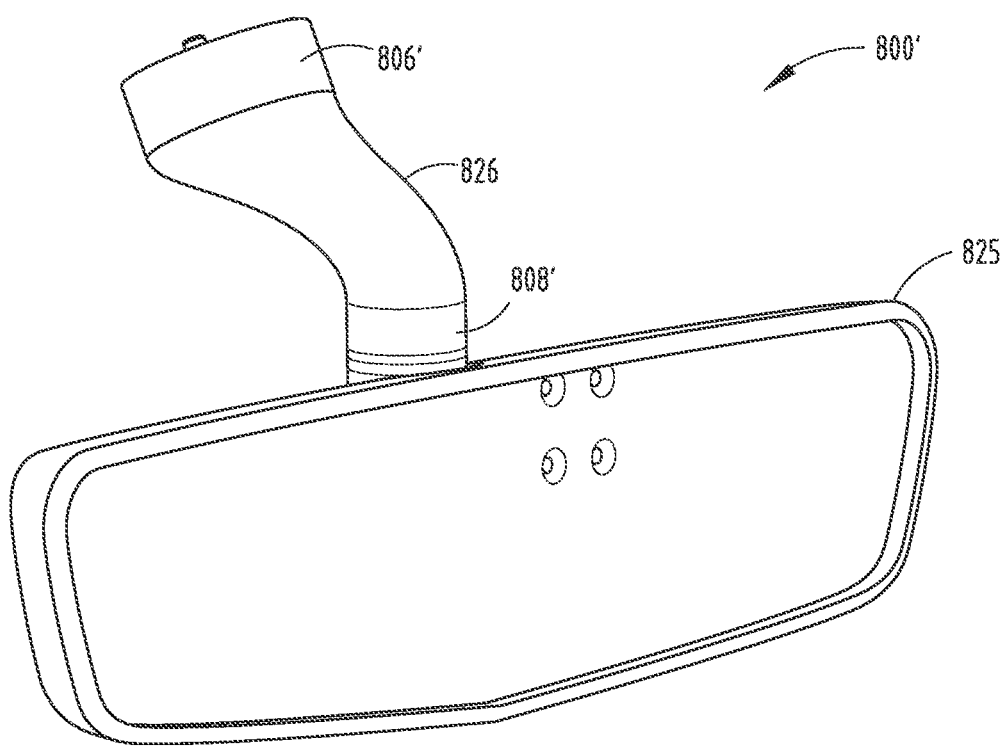
FIG. 50E is a top front perspective view of a mounting assembly with an offset extension.
Figure 50F:
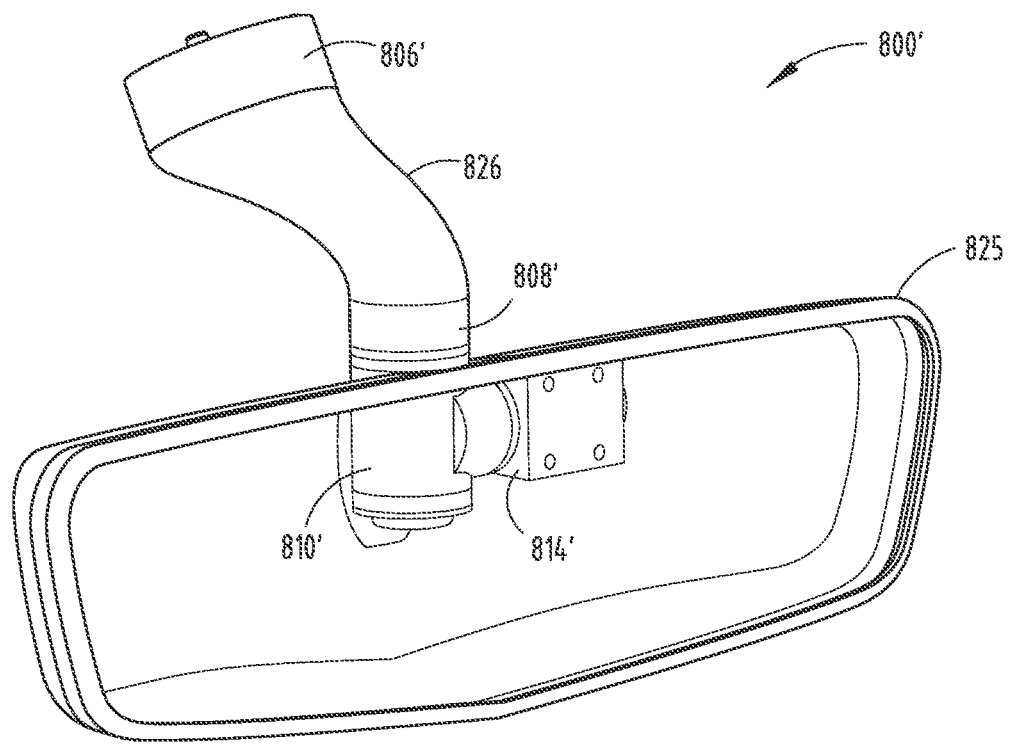
FIG. 50F is a top front perspective view of the mounting assembly of FIG. 50E with the rearview device removed.
Figure 50G:
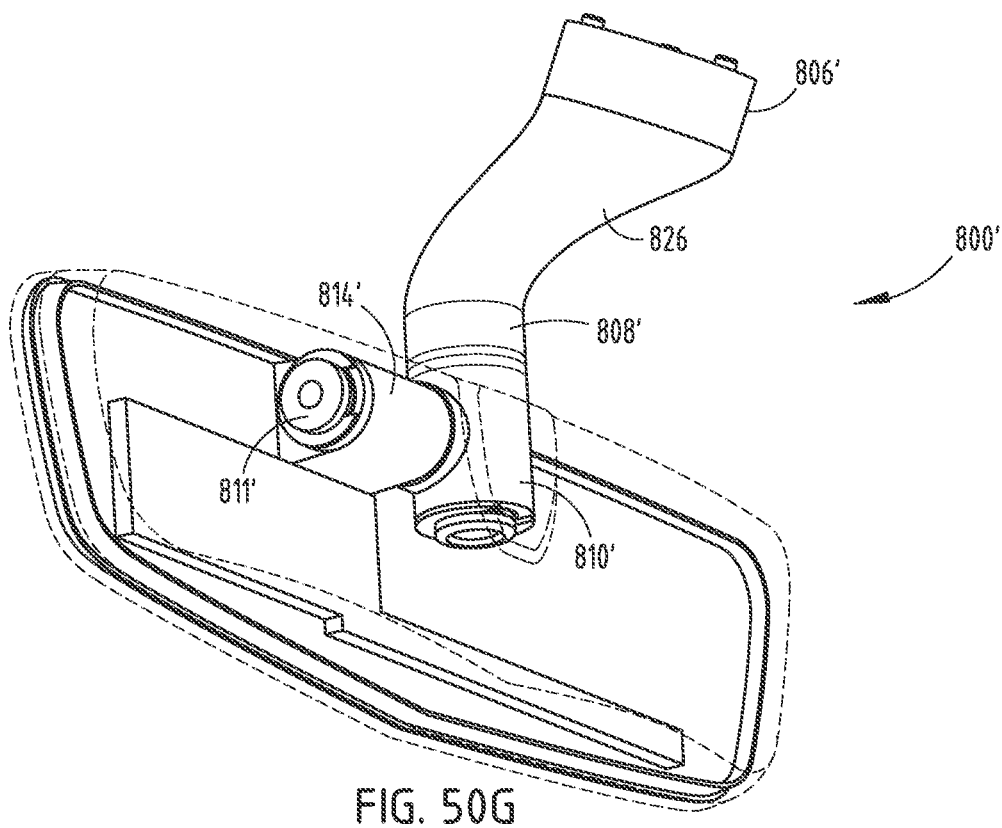
FIG. 50G is a bottom rear perspective view of the mounting assembly of FIG. 50E with the rearview device removed.
Figure 50H:
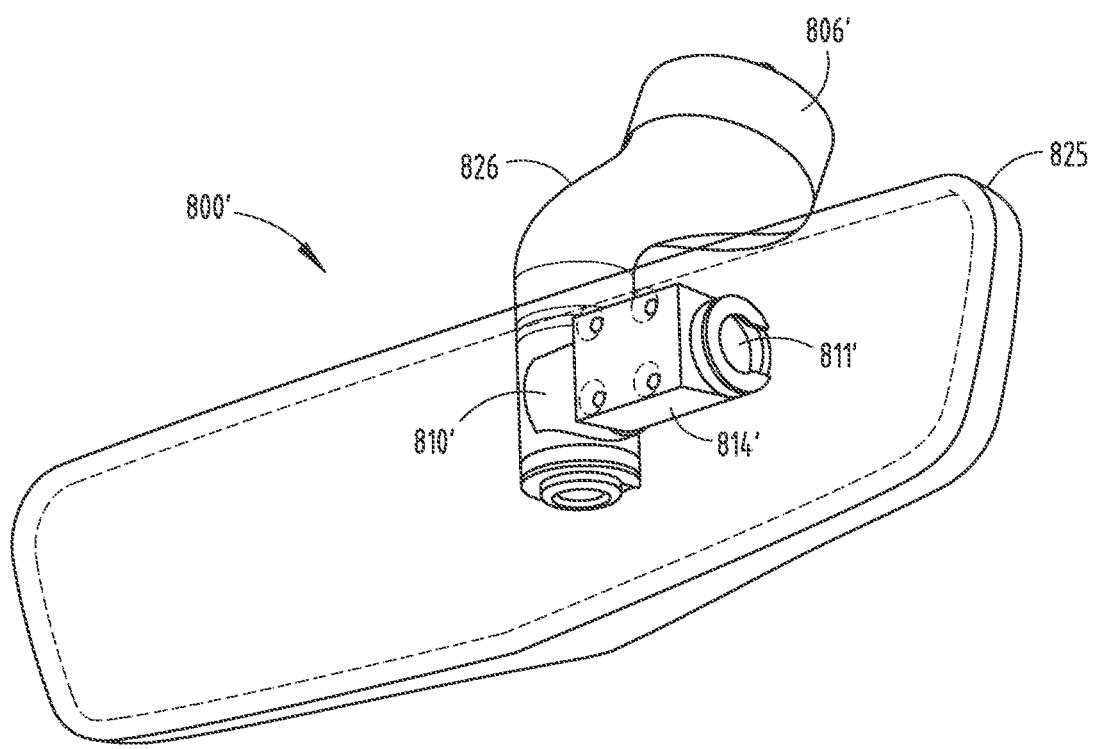
FIG. 50H is a bottom front perspective view of the mounting assembly of FIG. 50E with an offset extension.

FIGS. 50A and 50B illustrate an embodiment of a mounting assembly 800 designed for a rear load installation that is used in conjunction with a chrome ring rearview device assembly 802 that connects with the mounting assembly 800 having an L-shaped construction. In this embodiment, a mount 806 is connected to a windshield or header assembly and a primary support 808 extends downwardly therefrom. A secondary support 810 is operably coupled with the primary support 808 in rotatable relation thereto. The secondary support 810 includes a carrier, such as an extension member 811 shown, that is designed to be operably coupled with or possibly rotatably coupled with a rear wall 812 of a carrier 804 of the chrome ring rearview device assembly 802. A coupler or bearing cap 814 rotatably secures the extension member 811 to the rear wall 812 of the carrier 804. In the illustrated embodiment, a light sensor device housing 820 secures a light sensor device 822 therein and is disposed below the primary support 808, as is an accessory support 824 adapted to hold one of a variety of possible electronics packages. As shown in FIGS. 50C and 50D, it is also contemplated that a rearview device assembly 802 may be used in conjunction with a T-shaped mounting assembly 828, or other various mounting assembly constructions discussed herein.

Referring now to FIGS. 50E-50H, another embodiment of a mounting assembly 800' includes a rearview device assembly 825 that includes an offset extension 826 designed to provide an interface between a primary support 808' and the mount 806 that connects the mounting assembly 800 to the windshield or header assembly. The offset extension 826 may be of any desired construction, such as the embodiment illustrated, which includes a smooth, arcuate, and aesthetic construction. It is contemplated that any of the constructions discussed in this application may be used in conjunction with the offset extension 826 generally disclosed in FIGS. 50E-50H. The mounting assembly 800' includes an L-shaped construction with a secondary support 810' having an extension member 811' operably coupled with the primary support 808'. A coupler or a bearing cap 814' rotatably secures the extension member 811' to a rear portion of the rearview device assembly 825.

Connecting Systems

Referring now to FIGS. 53-57, it is contemplated that a variety of connecting options may be used to secure a rearview device with one of the various embodiments of a rearview device support assembly as disclosed herein. These systems may be used to complement the torsion systems discussed herein to increase or decrease the frictional resistance and torque of a mounting assembly. Torque adjustment affects the effort needed to adjust the rearview device assembly by the user. The torque may be adjusted at a coupler, such as a bearing cap, or may be adjusted by a separate torque adjustment member or a bearing member.

Figure 53:
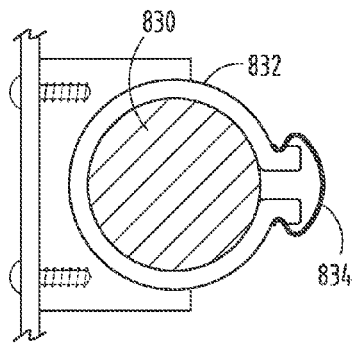
FIG. 53 is a side cross-sectional view of one embodiment of a torque system of the present invention.
Figure 54:
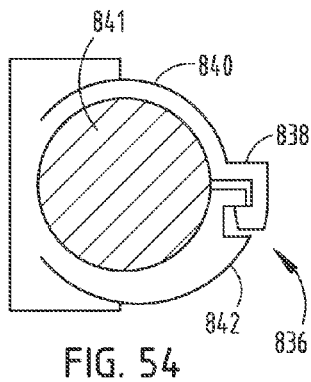
FIG. 54 is a side cross-sectional view of another embodiment of a torque system of the present invention.

As shown in the embodiment of FIG. 53, a secondary support 830 may be disposed inside a bearing member 832 that is maintained in a closed position by a spring clamp 834. Spring clamps 834 having differing levels of resiliency may be removed or added to decrease or increase the compression of the bearing member 832 on the secondary support 830. Alternatively, as shown in FIG. 54, a snap lock assembly 836 may be provided that secures a first portion 838 of a bearing member 840 against a second portion 842 of the bearing member 840 with a secondary support 841 disposed therebetween. In this condition, frictional resistance may be changed by providing a spectrum of tightly-fitting to loosely-fitting snap lock assemblies 836 on the bearing member 840.

Figure 55:
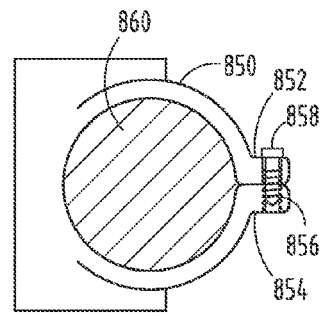
FIG. 55 is a side cross-sectional view of another embodiment of a torque system of the present invention.
Figure 56:
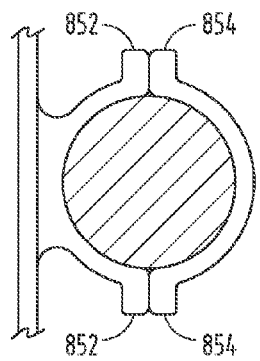
FIG. 56 is a side cross-sectional view of another embodiment of a torque system of the present invention.
Figure 57:
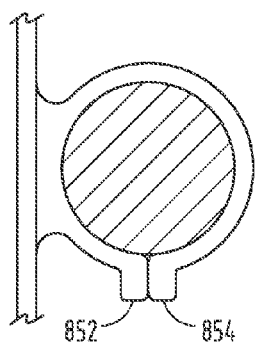
FIG. 57 is a side cross-sectional view of another embodiment of a torque system of the present invention.
Figure 58:
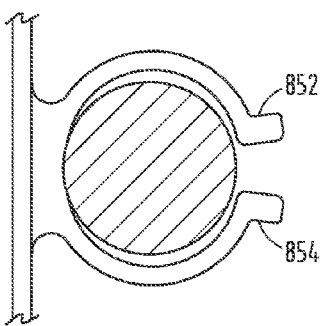
FIG. 58 is a side cross-sectional view of another embodiment of a torque system of the present invention.

Referring now to FIG. 55, in yet another embodiment of the present invention, a bearing member 850 includes first and second flanges 852, 854 that define mechanical fastener apertures 856 adapted to receive a mechanical fastener 858, such as a screw, a heat stake, a rivet, etc. In the event that the mechanical fastener 858 is removable, the mechanical fastener 858 may be tightened or loosened to change the frictional resistance of the bearing member 850 around a secondary support 860. It is contemplated that the first and second flanges 852, 854 may be disposed at any of a variety of locations on the bearing member 850 including top and bottom positions (FIG. 56), a bottom position (FIG. 57), a rear position (FIG. 58), intermediate positions, or a combination thereof.

Figure 59:
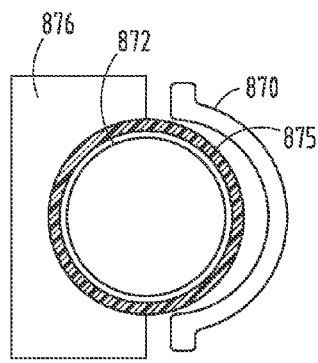
FIG. 59 is a side cross-sectional view of another embodiment of a torque system of the present invention.
Figure 60:
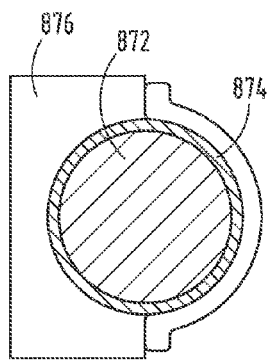
FIG. 60 is a side cross-sectional view of another embodiment of a torque system of the present invention.
Figure 61:
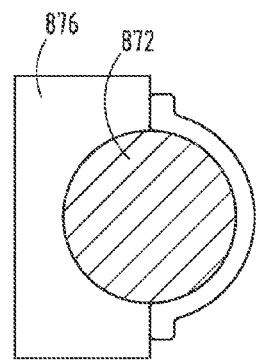
FIG. 61 is a side cross-sectional view of another embodiment of a torque system of the present invention.

Referring now to FIGS. 59-61, it is also contemplated that a bearing member 870 may be supplied over a hollow secondary support 872 (FIG. 59) or a solid secondary support 872. The bearing member 870 is connected with a rearview device assembly, as disclosed herein and in relation to FIGS. 46-52. A bushing 874 (FIG. 60) may be provided that extends around the secondary support 872 and contacts the bearing member 870, as well as a housing 876 of a rearview device assembly. The bushing 874 may be constructed from any material known in the art, such as bronze, nylon, metal, plastic, etc. It will be understood that bushings 874 made of different materials will impact the amount of torque or frictional resistance that may be desired such that an O-ring or a bushing is unnecessary (FIG. 61). Alternatively, an O-ring 875 (FIG. 59) may be positioned around the secondary support 872 to increase or decrease the frictional resistance of the bearing member 870 and housing 876 on the secondary support 872.

Figure 62:
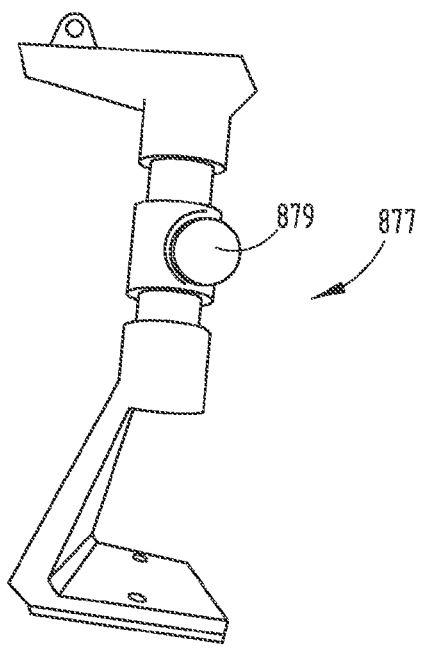
FIG. 62 is a side elevational view of one embodiment of an accessory support attached to a mounting assembly above a secondary support of the mounting assembly.
Figure 63:
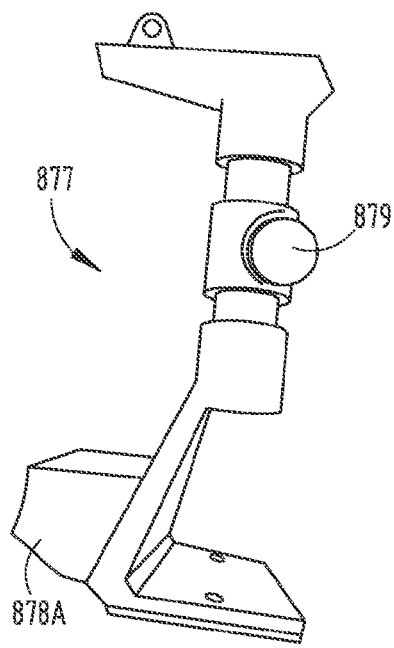
FIG. 63 is a side elevational view of a mounting assembly with an accessory support connected below a secondary support of the mounting assembly.
Figure 64:
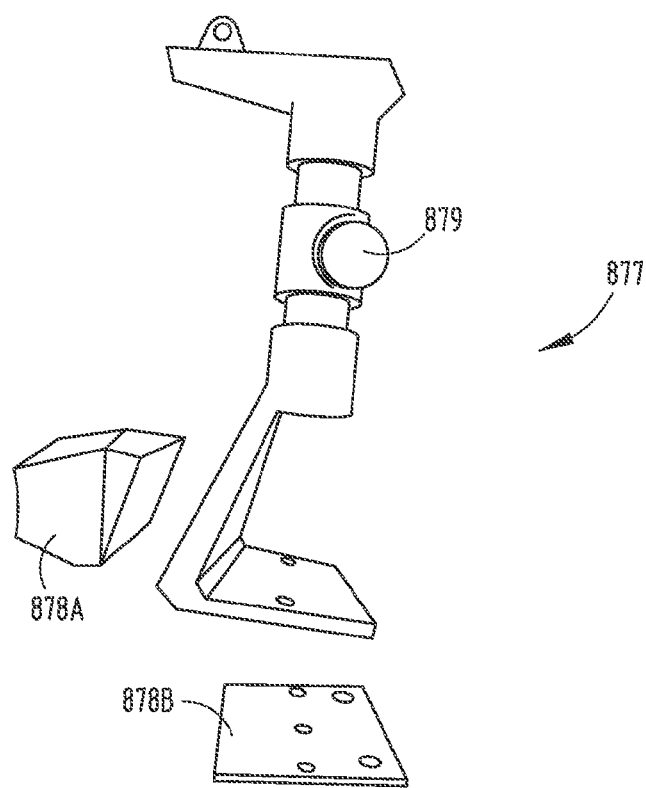
FIG. 64 is a side elevational exploded view of the mounting assembly of FIG. 63.

As mentioned herein, and with reference to the embodiment illustrated in FIGS. 1-6, a lower portion of a secondary support 877 may include a variety of electronics assemblies, including cameras or light sensor devices 878A and lighting systems 878B, such as those shown in FIGS. 62-64. It is also contemplated that systems may be integrated into a single unit, such as shown in FIGS. 63 and 64. As noted herein, a pivot 879 defined by the secondary support 877 may be positioned above or below the electronics assembly. In addition, no electronics assembly may be present.

Referring now to FIG. 61A, a secondary support 1000 has a T-shaped construction that includes an engagement member 1002 adapted for coupling with a primary support. The secondary support 1000 also includes a carrier in the form of first and second extension members 1008, 1010, extending in approximately opposite directions relative to one another. The first and second extension members 1008, 1010 and the engagement member 1002 connect with a central hub 1012. The first and second extension members 1008, 1010 and the engagement member 1002 may be connected in any of a variety of ways. In the illustrated embodiment, the first and second extension members 1008, 1010 and the engagement member 1002 are integrally formed with the central hub 1012 and define a wire channel 1018 for relaying wires 1020. In addition in the illustrated embodiment, the engagement member 1002 extends in a direction substantially orthogonal to the first and second extension members 1008, 1010. The secondary support 1000 is designed for insertion into an aperture of a primary support that is in turn connected with a mount that supports the secondary support 1000 inside the vehicle. The secondary support 1000 includes a plurality of O-rings 1014 formed from a high compression low durometer elastomer and disposed on the engagement member 1002, as well as the first and second extension members 1008, 1010. The O-rings 1014 provide a desired amount of torque so that a rearview device mounted to the secondary support 1000 can be rotated vertically by a user while maintaining the rearview device in a desired angle, and also be rotated horizontally by a user, but have sufficient torsional resistance to maintain a position set by the user.

Referring now to FIG. 61B, in another embodiment of the present invention, a secondary support 1050 includes an L-shaped construction having an engagement member 1052 and a carrier in the form of an extension member 1054 extending substantially orthogonally from the engagement member 1052 at a central hub 1055. The engagement member 1052 generally forms a post that is received inside an internal region of a primary support. Both the engagement member 1052 and the extension member 1054 define an inner wire channel 1056 adapted to receive and relay wires 1058 therethrough. A plurality of O-rings 1060 are positioned around the engagement member 1052 and extension member 1054.

In the illustrated embodiment shown in FIGS. 61A and 61B, the ratio of dynamic torque to peak torque is more than 90 percent (Td/Tp>0.9). The average torque of the secondary supports 1000, 1050 when connected with a rearview device and a primary support is approximately 2.0 N-m. Further, the torque variation of the secondary supports 1000, 1050 varies by no more than 10 percent over the manufacturing tolerance range, the temperature range (−40° C. to 65° C.), the high temperature storage range (105° C.), the afterlife cycle testing, and the full motion range. The device as disclosed herein does not squeak and is designed to accommodate a 3.3 inch rear camera display with less than 25 mm of housing depth. The lateral resonant frequency of the secondary supports 1000, 1050 is above 60 Hz with a 650 gram rearview device.

The construction of the secondary supports 1000, 1050 is generally contemplated to be by way of injection molding. Specifically, the secondary supports 1000, 1050 is injection molded between two mold cavities and cooled to provide the formed end product. High compression low durometer elastomeric O-rings are then positioned on the engagement members 1002, 1052, as well as the extension members 1008, 1010, 1054. Alternatively, the secondary supports 1000, 1050 may be constructed using a two-shot injection molding process. In this instance, a first mold cavity is used to form the hard elastomeric material that makes up the secondary supports 1000, 1050. A second mold cavity, which includes voids positioned at predetermined points about the engagement members 1002, 1052 and extension members 1008, 1010, 1054 are provided such that introduction of a second material, in this case a high compression low durometer elastomeric material, to the mold cavity forms a plurality of torque controlling rings on the secondary supports 1000, 1050. It is generally contemplated that the torque may also be controlled by including an axial loading construction, a cylindrical loading construction, or a combination thereof.

Referring now to FIG. 61C, the illustrated embodiment is a cross-section of one embodiment of a secondary support 1100 having various torque controlling features. A primary support 1102 includes a threaded aperture 1104 designed for engagement with a mount. A curable chemical compound may be used to secure the primary support 1102 with the mount. The secondary support 1100 includes an engagement member 1107 having a chamfered top portion 1106 adapted for abutting engagement with an upper chamfered surface 1108 on the primary support 1102. A lower portion of the primary support 1102 includes an O-ring 1110, as well as a tapered ring 1112, that is molded in place on the primary support 1102. The tapered ring 1112 is pressure-molded around the primary support 1102. It is contemplated that the O-ring 1110 can be replaced with a wave washer or a wave washer stack. A pressure ring 1116 is disposed below the O-ring 1110 and the tapered ring 1112. A retaining ring 1120 is disposed below the O-ring 1110. The engagement member 1107 of the secondary support 1100 also includes a chamfered lower portion 1122 that abuts a tapered surface 1124 of the tapered ring 1112.

The pressure ring 1116 can be used to apply longitudinal force on the engagement member 1107 of the secondary support 1100. More specifically, the pressure ring 1116 can be positioned on the primary support 1102 so that pressure is applied on the engagement member 1107 from below by the tapered ring 1112 and from above by the upper chamfered surface 1108 of the primary support 1102, thus effecting the torque needed to rotate the secondary support 1100 relative to the primary support 1102. The O-ring 1110 can be used to increase the amount of torque by providing frictional resistance between the secondary support 1100 and the primary support 1102.

An extension member 1130 protrudes orthogonally relative to the engagement member 1107 of the secondary support 1100 and includes a wide portion 1132 that narrows to a neck 1134. The extension member 1130 has a similar construction to the engagement member 1107 of the secondary support 1100, however, it is juxtapositioned orthogonally relative to the longitudinal extent of the engagement member 1107. The extension member 1130 is designed for engagement with a coupler 1140 that extends about at least a portion of the periphery of the extension member 1130. The coupler 1140 includes a contact portion 1141 designed to fit inside the neck 1134 of the extension member 1130. A tapered ring 1142 is molded in abutting contact with an outside chamfered surface 1144 of the coupler 1140. An inside chamfered surface 1146 of the coupler 1140 abuts an inside chamfered surface 1148 on the extension member 1130. An O-ring, a wave washer, or a wave washer stack 1150 is disposed next to the tapered ring 1142, and a pressure ring 1152 is molded adjacent to the O-ring 1150. An outside portion of the extension member 1130 includes a molded cap 1154 that is held in place by friction fit or by mechanical fasteners 1156. The O-ring 1150 works in much the same way as the O-ring 1110 to provide frictional resistance between the extension member 1130 and the coupler 1140. In addition, the pressure ring 1152 can be used to apply longitudinal force on the coupler 1140. More specifically, the pressure ring 1152 can be positioned on the extension member 1130 so that pressure is applied on the coupler 1140 as the coupler 1140 is sandwiched between the wide portion 1132 of the extension member 1130 and tapered ring 1142.

It is contemplated that various modifications of this design may be utilized without departing from the structure shown and described in FIG. 61C. For example, any of the secondary supports disclosed above may have various contact areas that provide torsional resistance during adjustment of the rearview device by a user. In addition, the diameter of the secondary support and the primary support, as well as the coupler, may be modified to provide additional surface area, which in turn can add additional torsional resistance. Various elastomers may be used that include frictional characteristics that provide controlled torque characteristics. In addition, concentric force, wherein forces applied around the primary support or the extension member, may be applied by the engagement member or the coupler, respectively. Alternatively, end force may be applied, wherein the primary support and the engagement member are compressed longitudinally. The same may be true of the extension member and the coupler. The primary support and secondary support may be constructed from a metal, glass-filled nylon, aluminum, or an acetyl material. In addition, it is contemplated that slippage may occur on an external portion of the primary support, or an internal portion of the engagement member of the secondary support, or both. Similarly, slippage may occur on an inside portion of the coupler, or an outside circumference of the extension member, or both.

Prism Mount Mirror Interface

Figure 65:
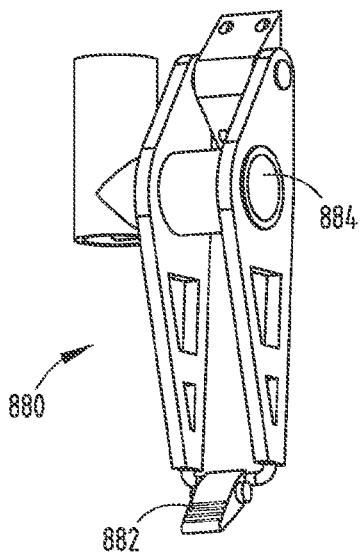
FIG. 65 is a front perspective view of one embodiment of a prism mirror interface of the present invention.
Figure 66:
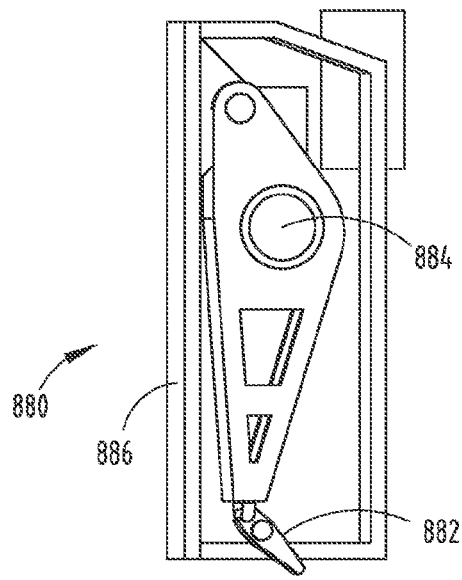
FIG. 66 is a side elevational view of the prism mirror interface of FIG. 65.
Figure 67:
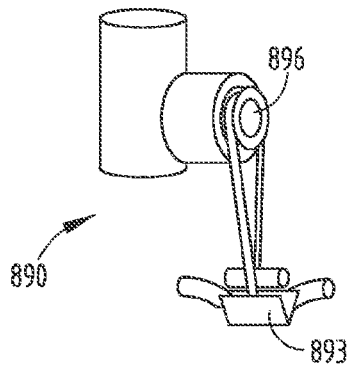
FIG. 67 is a front perspective view of another embodiment of a prism mirror interface of the present invention.

In the event that a prism mirror construction is utilized in conjunction with one of the various mounting assemblies of the present invention, different prism mechanisms 880 may be utilized, such as shown in FIGS. 65-71. As shown in FIGS. 65 and 66, a flipper mechanism 882 is rotatably secured to a secondary support 884 and allowed to rotate between approximately 1 and 10 degrees, which conveniently rotates the angle of a reflective surface 886 (FIG. 66) of a rearview device assembly to which the prism mechanism 880 is attached. Consequently, the rearview device assembly can be positioned between daytime and nighttime positions.

Figure 68:
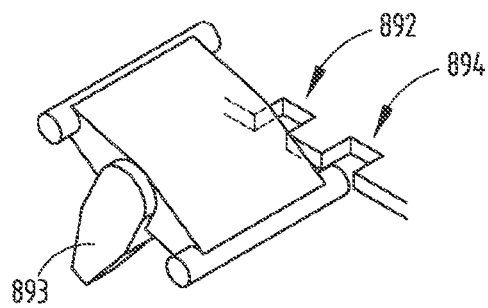
FIG. 68 is a top perspective view of a portion of the prism mirror interface of FIG. 67, illustrating the daytime and nighttime positions.
Figure 69:
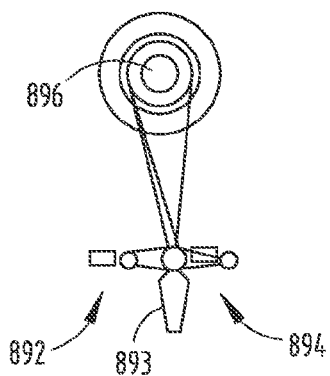
FIG. 69 is a side elevational view illustrating the prism mirror interface of FIG. 67.
Figure 70:
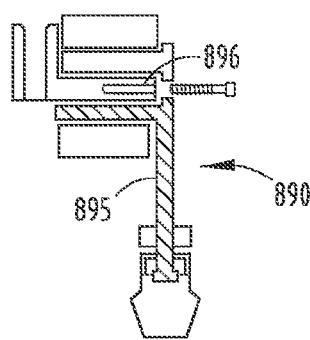
FIG. 70 is a front partial cross-sectional view of the prism mirror interface of FIG. 67.
Figure 71:
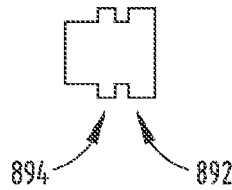

Another embodiment, as shown in FIGS. 67-71, includes a prism mechanism 890 movable between first and second set positions 892, 894 (FIGS. 68 and 69). The prism mechanism 890 is moved between the first and second set positions 892, 894 by a small lever 893 (FIGS. 67-69) disposed below a rearview device housing. The prism mechanism 890 is engaged with a secondary support 896 (FIGS. 67, 69, and 70) and rotated or moved between a daytime position 892 (first set position) and a nighttime position 894 (second set position). Movement of the small lever 893 is translated through an arm 895 (FIG. 70) connected to a rearview device housing.

In-Housing Light Sensor Device

Figure 72:
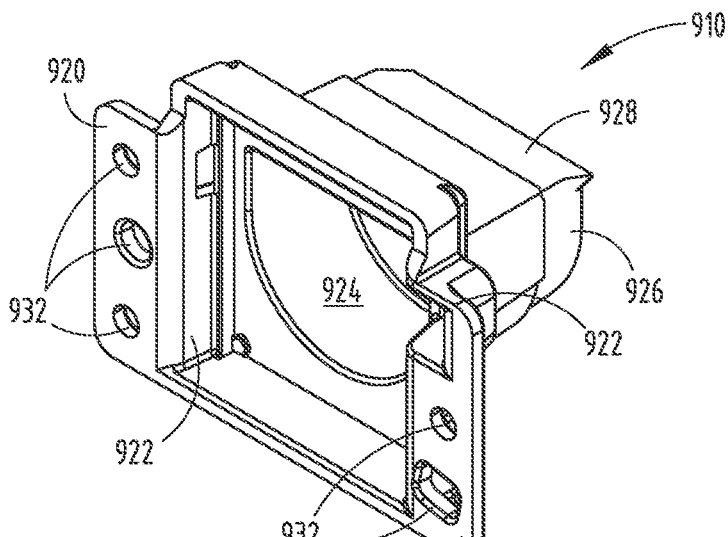
Figure 73:
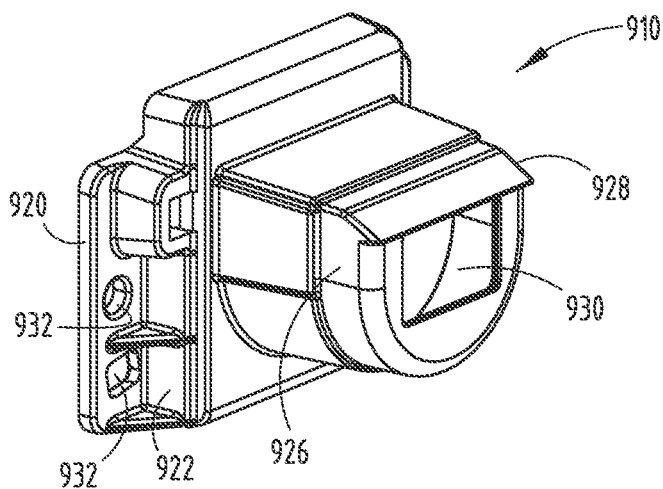
Figure 74:
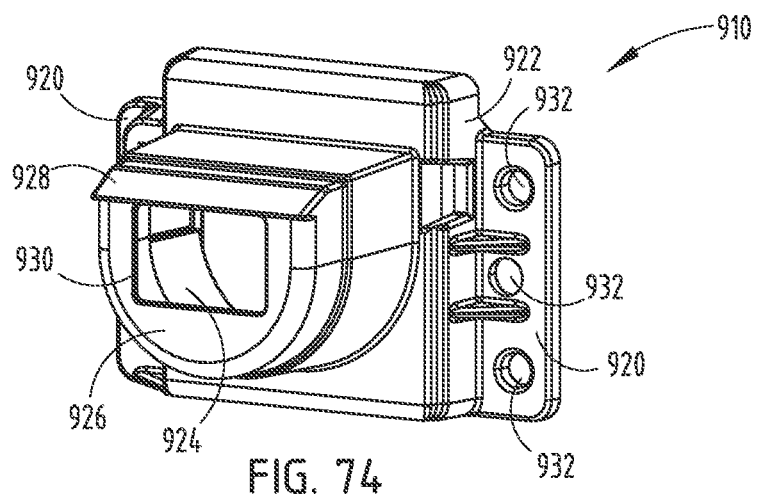
Figure 75:
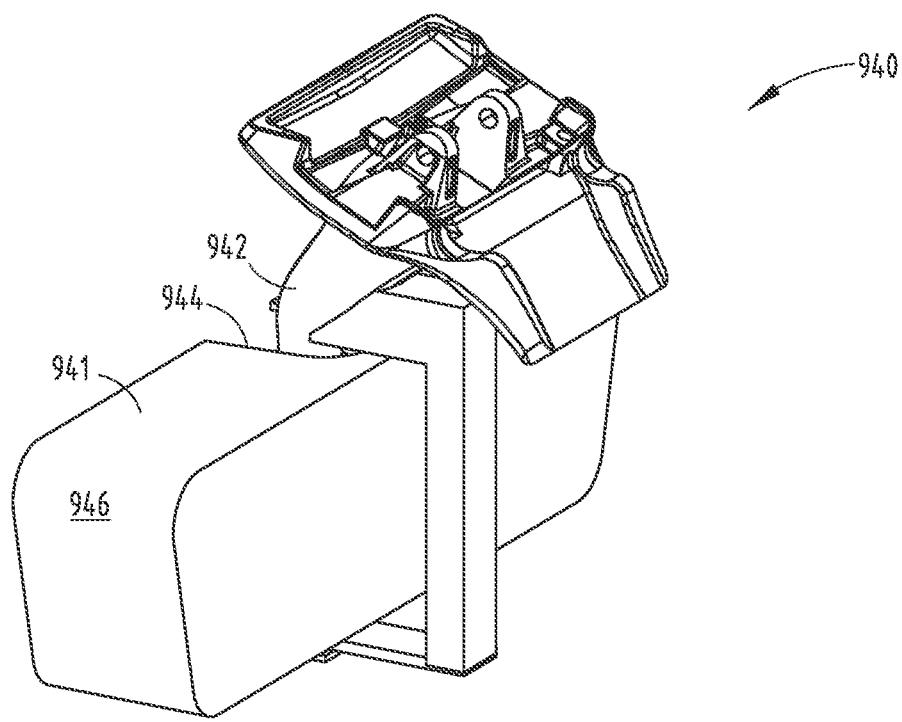
Figure 76:
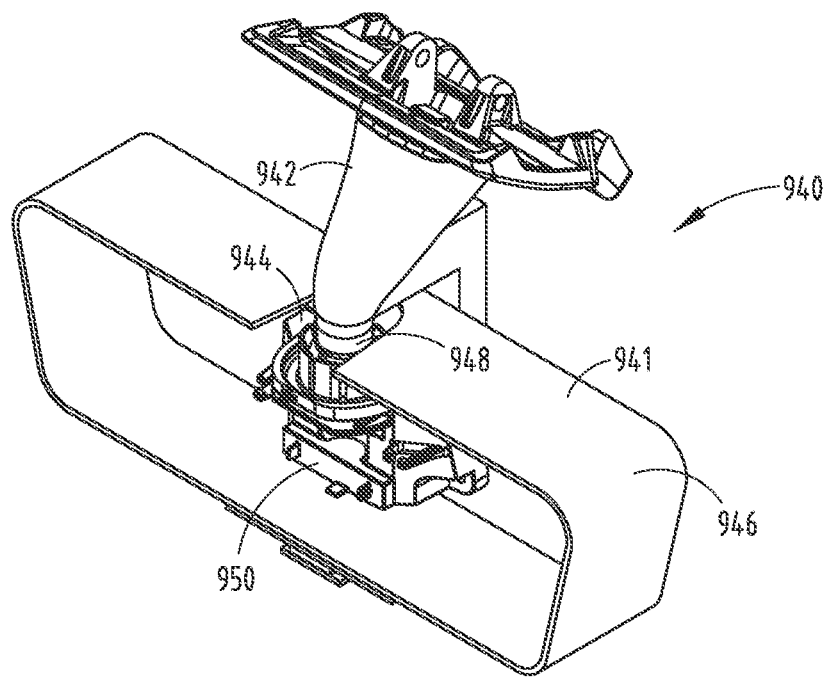
Figure 77:
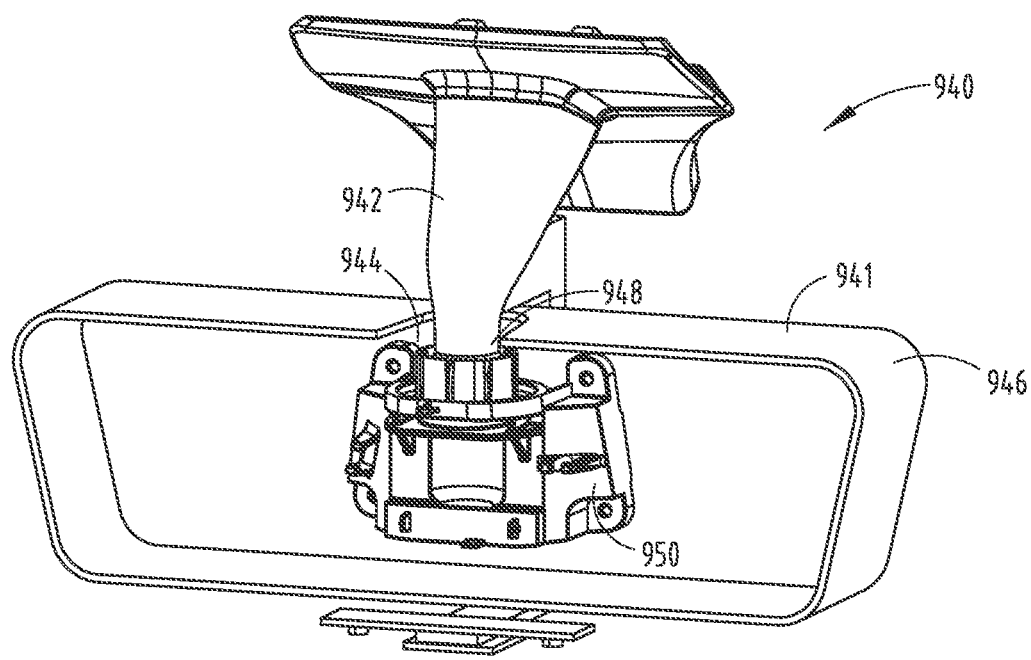
Figure 78:
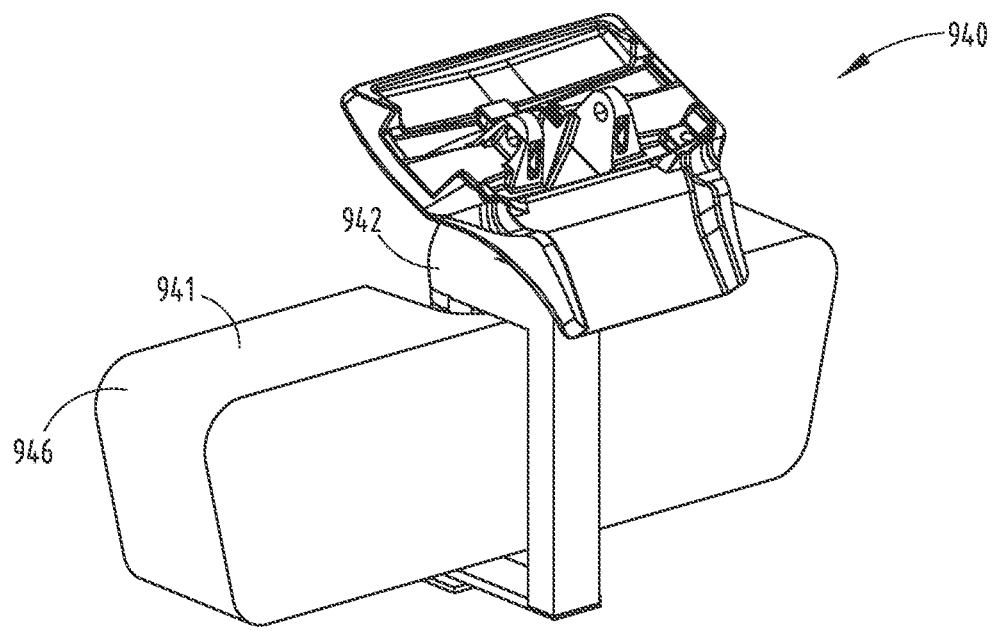

Referring now to FIGS. 72-74, a light sensor device housing 910 is adapted to receive a small light sensor device prior to insertion of the light sensor device housing 910 into a housing of one of the embodiments of a rearview device assembly. The light sensor device housing 910 includes connection flanges 920 on sides 922 of the light sensor device housing 910, as well as a forward device compartment 924 (FIGS. 72 and 74) defined by the light sensor device housing 910 adapted to protect and secure the light sensor device disposed therein. A forward portion 926 of the light sensor device housing 910 includes a top angled deflector 928 that deflects light from overhead lights, such as street lights, frequently seen on roadways and which can be sometimes misinterpreted by the light sensor device and electronic systems of the relative rearview device assembly. The light sensor device housing 910 includes a forward window 930 (FIGS. 73 and 74) that is set back from the deflector 928 a predetermined distance. However, it is contemplated that the deflector 928 could extend in front of the forward window 930 of the light sensor device housing 910 and could also be flush with a front surface of the light sensor device housing 910. Thus, the field of view of the light sensor device can be based upon the distance between the light sensor device and the forward window 930 and/or a windshield, the angle and length of the deflector 928, or a combination thereof. Mechanical fastener apertures 932 are defined by and extend through the connection flanges 920 to secure the light sensor device housing 910 in place inside the rearview device assembly.

Referring now to FIGS. 75-78, the illustrated embodiment includes a mounting assembly 940 in a top mounted position on a rearview device assembly 941. A support member 942 extends through a slot 944 in a housing 946 of the rearview device assembly 941. A ball joint 948 at an end of the support member 942 allows for pivotal movement of the rearview device assembly 941 relative to the support member 942. A light sensor device 950 (FIGS. 76 and 77) is positioned below the ball joint 948 and does not move relative to the support member 942.

Figure 79:
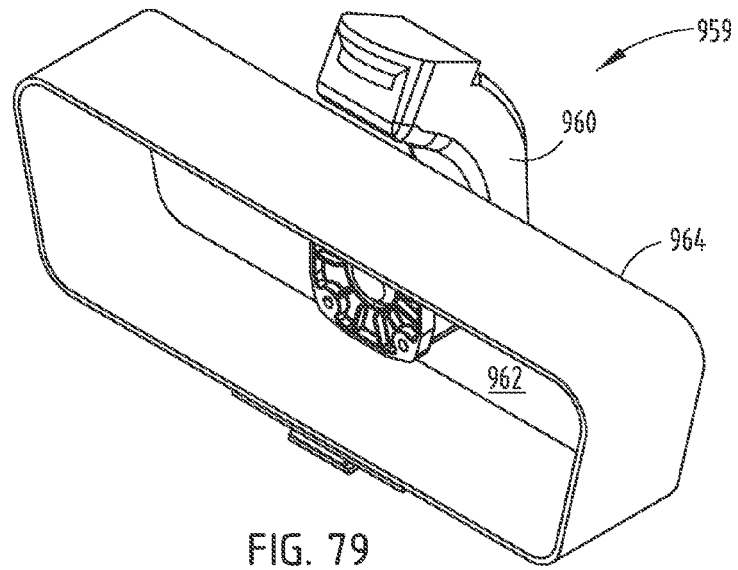
Figure 80:
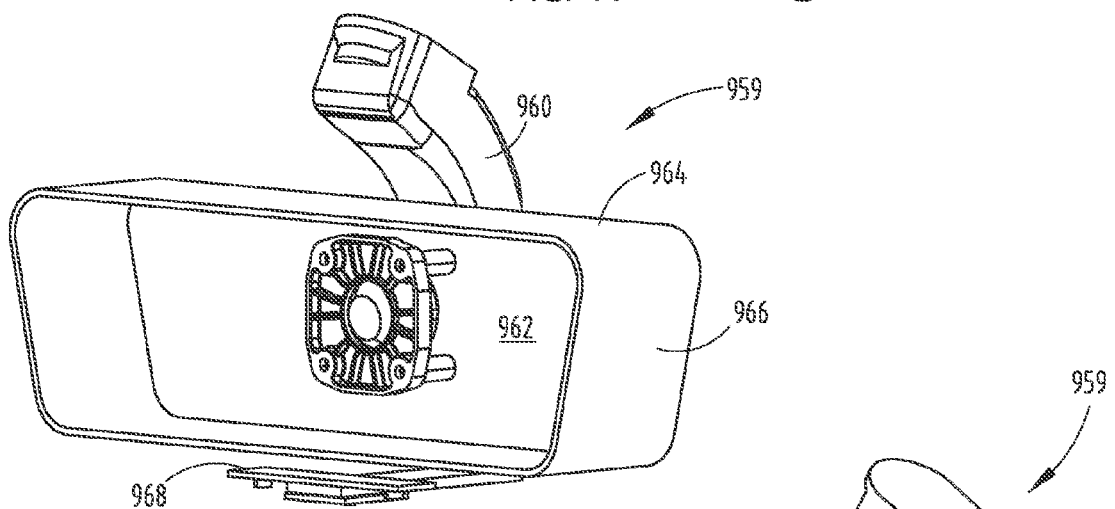
Figure 81:
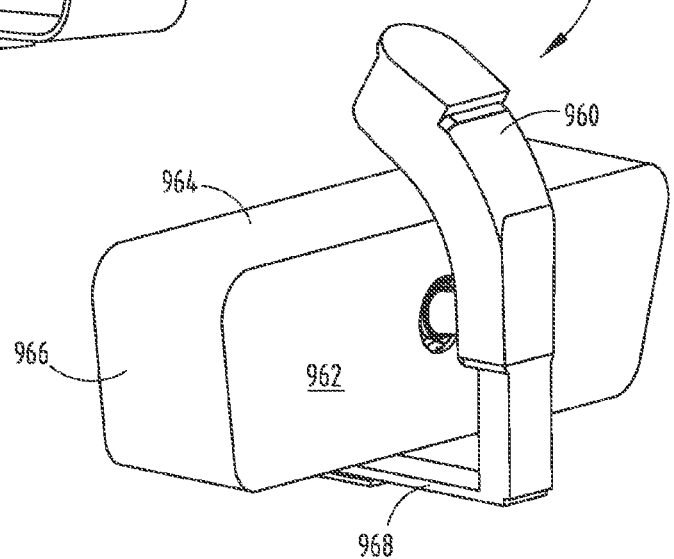

Referring now to FIGS. 79-81, yet another embodiment of the present invention includes a mounting assembly 959 having a support member 960 adapted for connection with a rear wall 962 of a housing 964 of a rearview device assembly 966 (FIGS. 80 and 81). The support member 960 is rotatably coupled with the rear wall 962 of the housing 964 of the rearview device assembly 966. At the same time, the support member 960 is fixedly attached to a device supporting platform 968 adapted to support a light sensor device, for example (FIGS. 80 and 81). Accordingly, when the housing 964, and consequently the rearview device assembly 966, is moved to a position by a user, the device supporting platform 968 supporting the light sensor device maintains the same position and does not move.

Referring now to FIGS. 82-84, in yet another embodiment of the present invention, a mounting assembly 970 includes a support member 971 (FIGS. 82 and 83) that is adapted for connection with a rear wall 972 (FIG. 82) of a rearview device assembly and a housing 973 (FIG. 82) includes an interchangeable mount interface bracket 974. The mount interface bracket 974 is adapted to be angled at a required angle for a predetermined windshield of a given vehicle. When the same rearview device assembly is installed in a different vehicle, the mount interface bracket 974 may be changed to accommodate a different angle of a windshield of a different vehicle. The support member 971 can also include a light sensor device 975 (FIG. 82) and/or an accessory support 976.

Header Assembly

Referring now to FIGS. 85-87, a header assembly 980 is designed to support any of the mounting assemblies discussed herein or illustrated. The header assembly 980 may be connected to an A-pillar of a vehicle, a headliner of a vehicle, a roof of a vehicle, or a combination thereof, to support a rearview device assembly 982. The header assembly 980 is designed to allow support of the rearview device assembly 982 without connecting any portion of the rearview device assembly 982, including a mounting assembly, to the windshield. Accordingly, the changing of a windshield in a vehicle becomes an easier feat as the rearview device assembly 982 does not need to be disconnected from the broken windshield and reconnected to a new windshield. Rather, the rearview device assembly 982 maintains its connection with the header assembly 980 during the removal of an old windshield and installation of a new windshield. At the same time, an electronics system, such as a light sensor device 984 (FIGS. 82 and 83) that is shown, maintains a static position, regardless of a user's adjustments to the rearview device assembly 982.

It will be understood for each of the aforementioned embodiments illustrated in FIGS. 1-87 that other constructions could also be utilized. It will also be understood that features of every embodiment disclosed herein may be used in conjunction with other embodiments disclosed herein or incorporated by reference and not specifically discussed. The disclosed embodiments are to be construed as examples and are not to be construed as limiting.

It will also be understood that the words "primary," "first," and "main" are inter-changeable, as these words relate to a support. Likewise, it will be understood that the words "second" and "secondary" are interchangeable, as they relate to a support operably coupled with a primary support.

Further, it will be understood by one having ordinary skill in the art that construction of the described invention and other components is not limited to any specific material. Other exemplary embodiments of the invention disclosed herein may be formed from a wide variety of materials, unless described otherwise herein.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview device mounting assembly comprising:
a mount configured to be operably coupled to a vehicle;
a first support extending downward from the mount;
a second support rotatably connected with the first support about a first axis of rotation, the second support including a carrier that extends substantially orthogonal to the first axis of rotation;
a rearview device assembly operably connected to the carrier, the rearview device assembly being substantially vertically rotatable about the carrier and substantially horizontally rotatable about the first support;
a coupler that rotatably connects the carrier with a housing of the rearview device assembly; and
wherein the coupler is configured to rotate relative to the carrier about only the second axis of rotation, which is substantially perpendicular to the first axis of rotation.

2. The rearview device mounting assembly of claim 1, wherein the carrier includes first and second extension members disposed on opposing sides of the first support.

3. The rearview device mounting assembly of claim 1, further comprising:
an offset extension that is disposed between and operably connects the first support to the mount.

4. The rearview device mounting assembly of claim 1, further comprising:
a light sensor device operably connected with the first support and disposed inside the housing.

5. A rearview device mounting assembly comprising:
a first support;
a second support operably connected with the first support and rotatable about a first axis of rotation, the second support including a carrier and a coupler that is rotatable relative to the carrier only in a second axis of rotation substantially perpendicular to the first axis of rotation; and a rearview device assembly operably connected to the coupler.

6. The rearview device mounting assembly of claim 5, wherein the carrier includes first and second extension members.

7. The rearview device mounting assembly of claim 5, wherein the second support includes first and second downwardly extending arms that support the carrier.

8. The rearview device mounting assembly of claim 7, further comprising:
 a housing having a rear wall with an engagement member adapted to engage a distal end of each of the first and second downwardly extending arms.

9. The rearview device mounting assembly of claim 5, wherein the second support includes an engagement member that extends around at least a portion of an outer circumference of the first support.

10. The rearview device mounting assembly of claim 5, wherein the mount is configured to be operably connected to a header assembly.

11. The rearview device mounting assembly of claim 5, further comprising:
 an accessory support operably connected to the second support.

12. A rearview device mounting assembly comprising:
 a first support rotatable about a substantially vertical axis;
 a second support operably coupled with the first support;
 a carrier extending from the second support and operably connected to a rearview device assembly, wherein the rearview device assembly is rotatable relative to the carrier about a substantially horizontal axis;
 a coupler that rotatably connects the carrier with a housing of the rearview device assembly; and
 wherein the coupler is configured to rotate relative to the carrier about only the second axis of rotation, which is substantially perpendicular to the first axis of rotation.

13. The rearview device mounting assembly of claim 12, wherein the second support includes first and second downwardly extending arms, and wherein the carrier extends between the first and second downwardly extending arms.

14. The rearview device mounting assembly of claim 13, wherein the first and second downwardly extending arms are substantially arcuate.

15. The rearview device mounting assembly of claim 12, wherein the carrier includes an extension member that extends in a substantially horizontal direction.

16. The rearview device mounting assembly of claim 12, wherein the second support includes an engagement member that operably connects with the first support, and wherein the carrier forms an extension member that supports the rearview device assembly.

17. The rearview device mounting assembly of claim 16, wherein a width of the engagement member is approximately equal to a length of the extension member.

18. The rearview device mounting assembly of claim 12, wherein the rearview device assembly is substantially covered by a housing, and wherein the first support extends into a top portion of the housing.

19. The rearview device mounting assembly of claim 12, wherein the rearview device assembly is substantially covered by a housing, and wherein the first support extends into a rear portion of the housing.

* * * * *

UNITED STATES PATENT AND TRADEMARK OFFICE
CERTIFICATE OF CORRECTION

PATENT NO. : 8,646,924 B2  
APPLICATION NO. : 13/405697  
DATED : February 11, 2014  
INVENTOR(S) : Roth et al.

Page 1 of 1

It is certified that error appears in the above-identified patent and that said Letters Patent is hereby corrected as shown below:

In the Specification

Col. 7, line 16, delete "of";

Col. 9, line 66, replace "seconds" with --second--;

Col. 13, line 7, after "330" insert --and--;

Col. 13, line 65, replace "halfY-shaped" with --Half Y-shaped--;

Col. 13, line 67, replace "halfY-shaped" with --Half Y-shaped--;

Col. 14, line 56, replace "effects" with --affects--;

Col. 15, line 3, replace "effects" with --affects--;

Col. 15, line 19, replace "effects" with --affects--;

Col. 16, line 27, replace "effects" with --affects--;

Col. 16, line 45, replace "effects" with --affects--;

Col. 18, line 29, replace "halfY-shaped" with --half Y-shaped--;

Col. 20, line 19, replace "800" with --800'--;

Col. 22, line 23, replace "is" with --are--.

Signed and Sealed this  
Tenth Day of February, 2015

Michelle K. Lee  
*Deputy Director of the United States Patent and Trademark Office*